(12) United States Patent
Alikiaamiri et al.

(10) Patent No.: US 11,954,444 B2
(45) Date of Patent: Apr. 9, 2024

(54) SYSTEMS AND METHODS FOR MONITORING TECHNOLOGY INFRASTRUCTURE

(71) Applicant: ROYAL BANK OF CANADA, Toronto (CA)

(72) Inventors: Seyedramin Alikiaamiri, Toronto (CA); Mehdi Rostamiforooshani, Whitby (CA); Morteza Mashayekhi, Richmond Hill (CA); Frank Liu, Markham (CA); Martin Mendoza, Mississauga (CA); Keerthi Ningegowda, Burnaby (CA); Chuhang Liu, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 330 days.

(21) Appl. No.: 17/461,583

(22) Filed: Aug. 30, 2021

(65) Prior Publication Data
US 2022/0067295 A1 Mar. 3, 2022

Related U.S. Application Data

(60) Provisional application No. 63/072,001, filed on Aug. 28, 2020.

(51) Int. Cl.
| | |
|---|---|
| *G06F 40/30* | (2020.01) |
| *G06F 3/04847* | (2022.01) |
| *G06F 18/21* | (2023.01) |
| *G06F 18/231* | (2023.01) |

(Continued)

(52) U.S. Cl.
CPC .......... *G06F 40/30* (2020.01); *G06F 3/04847* (2013.01); *G06F 18/2178* (2023.01);
(Continued)

(58) Field of Classification Search
CPC .. G06F 40/30; G06F 3/04847; G06F 18/2178; G06F 18/2193; G06F 18/231;
(Continued)

(56) References Cited

U.S. PATENT DOCUMENTS

| | | | |
|---|---|---|---|
| 8,630,975 B1 * | 1/2014 | Guo | G06N 20/00 707/726 |
| 8,996,350 B1 * | 3/2015 | Dub | G06F 16/24578 707/673 |

(Continued)

*Primary Examiner* — Michael Colucci
(74) *Attorney, Agent, or Firm* — Norton Rose Fulbright Canada LLP

(57) ABSTRACT

Systems and methods of monitoring technology infrastructure using alerts indicative service events and tickets indicative of incidents reported to the support system, including transmitting, to a client via a network, structured support data including issue data and correlation data. The issue data represents issues, which are fewer than the number of tickets, generated by processing textual data of the tickets through a clustering engine implementing a generative probabilistic model and generating the correlation data by associating alerts and tickets by correlating alert-specific identifiers and ticket-specific identifiers. The identifiers are of least one of identifier times, locations, names, or descriptions. A prioritization engine is also disclosed.

20 Claims, 43 Drawing Sheets

(51) Int. Cl.
  *G06F 40/284*  (2020.01)
  *G06N 7/02*   (2006.01)
(52) U.S. Cl.
  CPC ........ *G06F 18/2193* (2023.01); *G06F 18/231* (2023.01); *G06F 40/284* (2020.01); *G06N 7/02* (2013.01)
(58) Field of Classification Search
  CPC ..... G06F 40/284; G06F 3/04817; G06N 7/02; G06N 7/01
  See application file for complete search history.

(56) References Cited

U.S. PATENT DOCUMENTS

| | | | |
|---|---|---|---|
| 10,474,967 B2* | 11/2019 | Akkiraju | G06F 16/3329 |
| 10,515,379 B2* | 12/2019 | Gupta | G06Q 30/0201 |
| 10,558,657 B1* | 2/2020 | Cheng | G06F 16/93 |
| 11,501,233 B2* | 11/2022 | Sabharwal | G06N 3/045 |
| 11,650,996 B1* | 5/2023 | Daianu | G06N 20/00 |
| | | | 707/771 |
| 2015/0044659 A1* | 2/2015 | Basu | G09B 7/00 |
| | | | 434/350 |
| 2016/0110428 A1* | 4/2016 | Vasenkov | G06F 16/367 |
| | | | 707/803 |
| 2017/0270096 A1* | 9/2017 | Sheafer | G06F 40/295 |
| 2018/0365417 A1* | 12/2018 | Wu | G06N 20/00 |
| 2019/0026663 A1* | 1/2019 | Homeyer | G06Q 10/0633 |
| 2019/0164054 A1* | 5/2019 | Lee | G06N 20/00 |
| 2020/0034689 A1* | 1/2020 | Andrassy | G06N 3/044 |
| 2020/0097389 A1* | 3/2020 | Smith | G06F 11/0793 |
| 2020/0126533 A1* | 4/2020 | Doyle | G10L 15/063 |
| 2020/0410028 A1* | 12/2020 | Shaabani | G06F 21/564 |

* cited by examiner

Incident Tickets 2500

| | _id | @timestamp | app code | description |
|---|---|---|---|---|
| 0 | 05f1f651bdb0050b8c1fd15cc4bcb93 | Jun 25, 2020 @ 13:22:43.300 | 3D00 | user need to decommissioned Unix server and ne... |
| 1 | 0550758e1b9a4c901a6cdd77cc4bcb54 | Jun 25, 2020 @ 13:22:43.305 | LPT0 | New APP not showing up in senclass DEV environ... |

Service Alerts

| | _id | @timestamp | application_code | custom_info.integration.servicenow.incident.short_description |
|---|---|---|---|---|
| 0 | 472921832 | Jan 1, 2020 @ 15:18:01.000 | DD00 | SCOM Agent MaintMode Request from User Initiat... |
| 1 | 472921841 | Jan 1, 2020 @ 15:18:01.000 | DD00 | EventLog Server Reboot Microsoft.Windows.Opera... |

Incident Correlated Alerts (_id, similarities, time differences from incident)

[ ((472832366, 0.28319904, datetime.timedelta(days=176)), (472997042, 0.5075238, datetime.timedelta(days=176)) ],
[ ((472832366, 0.28319904, datetime.timedelta(days=176)), (472832366, 0.40465814, datetime.timedelta(days=176)) ] ]

FIG. 25

| Date | Short Description | Description | Caused By CI |
|---|---|---|---|
| 2020-06-19T16:59:31.000Z | User is unable to access Citrix – stuck on Black Screen | Server XSSCB600 Virtual Environment: Branch BCCCIP: 10.209.143.177 TAC Performed with sign out and sign in from Citrix session was taking a long time. | myXvirtual - Prod |

| Business Resolve Time | Affected User HR Title | Urgency | Escalations | Batch Job Id |
|---|---|---|---|---|
| 480 | Banking Advisor | 3 | 0 | 88 |

FIG. 31

SYSTEMS AND METHODS FOR MONITORING TECHNOLOGY INFRASTRUCTURE

CROSS-REFERENCE

This application is a non-provisional of, and claims all benefit, including priority to, U.S. Application No. 63/072,001, filed Aug. 28, 2020, entitled "SYSTEMS AND METHODS FOR MONITORING TECHNOLOGY INFRASTRUCTURE", incorporated herein by reference in its entirety.

FIELD

This application relates to technology infrastructure support systems for monitoring operational incidents in technology infrastructure and, in particular, artificial intelligence-enabled support systems adapted for automatic cluster identification and labelling of operational incident data sets.

INTRODUCTION

Financial institutions with a retail presence, such as retail banks, deploy a wide variety of technologies to service customers as part of a computing infrastructure environment. Examples of information technology (IT) systems that customers direct interact with, include mobile banking applications, ATMs, and online banking systems. Examples of IT systems involving indirect interaction with customers include hardware (computers, printers, scanners, routers) and software (PoS applications, database systems) deployed at physical branches, credit card authorization systems, and transaction notification systems.

Banks need to setup extensive IT support systems to ensure their technologies work as seamlessly as possible. Thus, IT support systems reactively work towards quick resolution of problems as they rise and also to proactively anticipate problems before they arise or become significant.

For example, according to industry standards, an IT support system may include 3, 4, or more hierarchical levels, labelled L0 (self-help by a customer), L1 (basic help desk resolution and service desk delivery), L2 (in-depth technical support), L3 (expert product and service support), and so on. IT support staff is also often geographically separated, with IT support teams often located strategically to support local branches and clusters of customers.

In a typical scenario, a customer will contact the IT support system and report an issue, e.g., a banking customer sending an email about online banking not allowing them to login. In some cases, a problem may be autonomously detected and automatically sent to the IT support system, e.g., a cash dispensing machine may send a "paper jam" message to the IT support system. Following receipt of the report/support request, an incident ticket is issued (an incident would be an event where support is requested). L0 support attempts to resolve the issue, and if they cannot, the issue is elevated to L1 support, and so on. At the same time, the IT support system may receive other types of intelligence and incoming information regarding the state of the technology infrastructure. Incoming information streams may be large and difficult to process. Improvement is desired.

SUMMARY

A technical challenge arises in an enterprise-scale deployment of the support system, namely that a very large volume of issue ticket data objects can be submitted, each having inconsistencies in the issue descriptions and summaries. When thousands or tens of thousands of issue tickets are received, it may be useful to attempt to triage or classify the issue tickets such that approaches for resolution can be efficiently deployed, or backend issues can be identified. For example, when a networking issue raises, it may impact a large number of end users, who then all submit issue tickets describing the networking issue, but using different words. Similarly, triaging issue tickets by system components or applications can also be helpful to identify particularly problematic components or applications (e.g., low uptime on a database server that could be indicative of issues relating to heat management).

Proposed herein are various embodiments of systems and methods adapted to automatically categorize tickets and alerts of a support system for technology infrastructure using machine learning for monitoring operational incidents in technology infrastructure—with no human input vis-à-vis how to categorize tickets (there may not be an a priori categorization)—and then transmit them as structured support data to a client (e.g., a remote client over a network) so the resulting categorized information may be available via a single sign-on system or a dashboard based graphical user interface, rendered on a display. These are then transmitted to a client which uses the categorized data to provide a system-level view of the of the technology infrastructure. As described herein, a multi-level approach for clustering is proposed that supports a dynamic re-clusterization of the data sets on the generated dashboard.

The automatic clustering and categorization approach may combine different approaches for clustering (DLA clustering combined with hierarchical clustering) to provide additional granularity in analysis, including, for example, a two-level clustering approach and an ability to tune, in real or near real-time, a number of clusters in the second level of clusters. Furthermore, the system is configured to automatically generate labels for the automatically identified clusters and sub-layers of clusters based on text extracted from the underlying information, and to tune these labels based on feedback received from a user (e.g., suggested labels for a particular cluster or sub-layer of clusters). An additional challenge with real or near-real time tuning of clusters and feedback incorporation is that there is reduced processing time available for re-generating clusters and/or labelling (e.g., it would be difficult to have the system run as a batch process overnight).

The tickets may have information which contained therein human-generated (e.g., a user writes a brief description and a more complicated description of the issue) or otherwise non-standardized such that a priori categorization is not possible. Other content in the issues may include error messages (e.g., error codes, core dumps) and alerts that may have been raised as part of exception handling by various IT systems. The alerts may only generally be associated with the tickets, e.g., alerts may be predictive of the tickets rather than a summary of the tickets. In some embodiments, the structured support data includes issue data, which represents the collection of incidents categorized under "issues", and the correlation data which allows each alert to be categorized under at least one issue. Thus, all tickets of an issue and their related alerts may be exposed to the IT ticket handling system. Generating useful system-level categorizations from two distinct input collections or streams depend much more on the context and the nature of the inputs unlike for single inputs. For example, monitoring technology infrastructure where alerts and tickets are both inputs is such a technical problem.

A technical solution for automatic categorizing the input data to cluster and/or classify related tickets is described in various embodiments herein through performing separate natural language processing and machine learning steps. First, the tickets are grouped together using clustering to generate an issue, and then the issues are associated with alerts. In development, Applicants found that incident ticket data is more useful than alert data for generating issues (collections of tickets) and descriptions (topics) of the issues.

To group tickets together to generate issues, in some embodiments, the choice of machine learning approach is found to be important, e.g., K-means clustering does provide useful clustering—clusters may contain overlapping incidents, which makes them less useful. A probabilistic clustering approach to cluster tickets based on text descriptions of the incidents (provided in the associated tickets) is found to be particularly effective because soft clustering is more amenable to clustering tickets than hard clustering. The class of applicable models are "generative probabilistic models" which model both the input and output probabilistically, e.g., Latent Dirichlet Allocation (LDA) models or Gaussian mixture models (GMM). In various embodiments, there is therefore no need to specify issues beforehand (no "supervised learning") and no hard clustering so a ticket may belong to multiple issues with respective probabilities. Alerts may be correlated with incident tickets if they have the same name ("app ID"), same location, close to each other in time, or have similar descriptions (determined via cosine similarity).

A "category" may be the end user's object of interested: it is composed of a machine-generated issue and alerts associated with tickets of the issue.

Aspects of the present disclosure help automatically consolidate an IT support system, or a particular IT support level's, day-to-day incoming work to facilitate system level problem solving and allow reflective analysis of the technology infrastructure.

Aspects disclosed herein are directed to approaches to have alerts generated by analytics solutions automatically integrated with incident tickets, and delivered to a remote user (IT staff) as support information. The support information is cohesive and coherent to allow rapid association of incident tickets and alerts and to glean insights into broader topics or categories of issues being faced by the technology infrastructure.

Aspects disclosed herein facilitate methods of monitoring technology infrastructure using data representative of a collection of alerts indicative of one or more service events of a support system of the technology infrastructure and a collection of tickets indicative of one or more incidents reported to the support system.

A specific technical solution is described in various embodiments herein that utilizes natural language processing approaches along with machine learning-based clustering methods using a generative probability model. The solution can be encapsulated as a special purpose machine, such as a specially configured server or server appliance that can reside within a data center, coupled to a message bus to receive one or more data sets representative of service tickets, and to generate one or more output data structures indicative of common clusters which can then be utilized to generate various alerts upon satisfaction of a triggering condition.

In various embodiments, the method comprises: transmitting, to a client via a network, structured support data including issue data and correlation data, the issue data representing the collection of tickets categorized under a collection of issues and the correlation data specifying categorization of each alert of the collection of alerts under at least one issue of the collection of issues. The issue data and correlation data may each comprises one or more arrays, vectors, containers or other forms of data structures.

In various embodiments, the method may comprise receiving structured data including alert data representative of the collection of alerts and ticket data representative of the collection of tickets, each alert of the collection of alerts having an alert-specific identifier, each ticket of the collection of tickets having a ticket-specific identifier, the ticket data including textual data representing non-standardized strings, each string associated with a ticket of the collection of tickets; processing the textual data through a clustering engine implementing a generative probabilistic model configured to generate the collection of issues by probabilistically clustering the non-standardized strings, each issue of the collection of issues defined by an issue-specific sub-collection of the collection of tickets; and processing the alert data and the ticket data to generate the correlation data by correlating each of the alert-specific identifiers with at least one of the ticket-specific identifiers, the correlation data representing for each ticket in the collection of tickets, associated alerts of the collection of alerts, wherein a number of issues in the collection of issues is less than a number of tickets in the collection of tickets, and the correlation engine is configured to correlate each alert-specific identifier with a ticket-specific identifier based on at least one of identifier times, locations, names, or descriptions.

In some embodiments, processing the textual data through a clustering engine includes: using natural language processing to generate corpus data using the collection of incident tickets; pruning the corpus data to remove proper nouns associated with technology infrastructure; and generating topic data using the generative probabilistic model and the corpus data, the topic data representing a collection of textual descriptions, each textual description of the collection of textual descriptions associated with an issue of the collection of issues.

In some embodiments, processing the alert data and the ticket data to generate the correlation data, includes at least one of: correlating an alert-specific time-stamp with a ticket-specific time-stamp if a time difference between the alert-specific time-stamp and the ticket-specific time-stamp is below a time-correlation threshold; using a machine learning clustering engine to generate one or more common clusters of alert-specific time-stamps and ticket-specific time-stamps, the machine learning clustering engine configured to cluster based at least partially on time-proximity, each common cluster defining a set of inter-correlated alert-specific time-stamps and ticket-specific time-stamps; or correlating an alert-specific description with a ticket-specific description if a cosine similarity between the alert-specific description and the ticket-specific description is above a description-correlation threshold.

In some embodiments, the time-correlation threshold depends on a technology associated with an incident ticket having the ticket-specific time-stamp.

In some embodiments, the time-correlation threshold is determined based on historical time-correlation between alerts and tickets.

In some embodiments, the time-correlation threshold is a characteristic time of a service alert-specific cluster generated by a machine learning clustering engine, the machine learning clustering engine configured to generate clusters of inter-correlated alert-specific time-stamps and ticket-specific time-stamps.

In some embodiments, the generative probabilistic model is based on a Latent Dirichlet Allocation (LDA) model. LDA is a natural language processing (NLP) tool that uses a generative statistical model allowing sets of observations to be explained by unobserved groups that explain why some parts of the data are similar. For example, if observations are words collected into documents, LDA posits that each document is a mixture of a small number of topics and that each word's presence is attributable to one of the document's topics. In various embodiments, the generative probabilistic model is may be a topic model other than LDA.

In some embodiments, a Gaussian Mixture Model (GMM) may be used.

In some embodiments, the one or more tickets of the collection of tickets include non-standardized information generated from customer communications.

In various embodiments, a cosine similarity threshold lies between 0.7 and 1.0 (for description similarity), e.g., it may be 0.7, 0.8, or 0.9.

In some embodiments, the method further comprises: storing the first structured support data on one or more network-based non-transitory storage devices.

In some embodiments, the method further comprises: transmitting a request triggered by an interaction of an end user with a graphical user interface of the client; and displaying the structured support data to the end user on the graphical user interface to allow interaction of the end user with displayed information, wherein the step of transmitting, to a client via a network, structured support data is executed in response to receiving the request, and a prioritization engine prioritizes at least one of the issues, tickets, or alerts.

Aspects disclosed here include one or more non-transitory computer-readable media for a monitoring system for monitoring technology infrastructure using data representative of a collection of alerts indicative of one or more service events of a support system of the technology infrastructure and a collection of tickets indicative of one or more incidents reported to the support system, the one or more non-transitory computer-readable media storing instructions thereon that, when executed by at least one processor, direct the at least one processor to: transmit, to a client via a network, structured support data including issue data and correlation data, the issue data representing the collection of tickets categorized under a collection of issues and the correlation data specifying categorization of each alert of the collection of alerts under at least one issue of the collection of issues; receive structured data including alert data representative of the collection of alerts and ticket data representative of the collection of tickets, each alert of the collection of alerts having an alert-specific identifier, each ticket of the collection of tickets having a ticket-specific identifier, the ticket data including textual data representing non-standardized strings, each string associated with a ticket of the collection of tickets; process the textual data through a clustering engine implementing a generative probabilistic model configured to generate the collection of issues by probabilistically clustering the non-standardized strings, each issue of the collection of issues defined by an issue-specific sub-collection of the collection of tickets; and process the alert data and the ticket data to generate the correlation data by correlating each of the alert-specific identifiers with at least one of the ticket-specific identifiers, the correlation data representing for each ticket in the collection of tickets, associated alerts of the collection of alerts, wherein a number of issues in the collection of issues is less than a number of tickets in the collection of tickets, and the correlation engine is configured to correlate each alert-specific identifier with a ticket-specific identifier based on at least one of identifier times, locations, names, or descriptions.

Aspects disclosed herein include a monitoring system for monitoring technology infrastructure using data representative of a collection of alerts indicative of one or more service events of a support system of the technology infrastructure and a collection of tickets indicative of one or more incidents reported to the support system, the monitoring system comprising: at least one processor; one or more non-transitory computer-readable media storing instructions thereon that, when executed by the at least one processor, direct the at least one processor to: transmit, to a client via a network, structured support data including issue data and correlation data, the issue data representing the collection of tickets categorized under a collection of issues and the correlation data specifying categorization of each alert of the collection of alerts under at least one issue of the collection of issues; receive structured data including alert data representative of the collection of alerts and ticket data representative of the collection of tickets, each alert of the collection of alerts having an alert-specific identifier, each ticket of the collection of tickets having a ticket-specific identifier, the ticket data including textual data representing non-standardized strings, each string associated with a ticket of the collection of tickets; process the textual data through a clustering engine implementing a generative probabilistic model configured to generate the collection of issues by probabilistically clustering the non-standardized strings, each issue of the collection of issues defined by an issue-specific sub-collection of the collection of tickets; and process the alert data and the ticket data to generate the correlation data by correlating each of the alert-specific identifiers with at least one of the ticket-specific identifiers, the correlation data representing for each ticket in the collection of tickets, associated alerts of the collection of alerts, wherein a number of issues in the collection of issues is less than a number of tickets in the collection of tickets, and the correlation engine is configured to correlate each alert-specific identifier with a ticket-specific identifier based on at least one of identifier times, locations, names, or descriptions.

Corresponding methods and non-transitory computer readable media storing machine-interpretable instructions, which when executed on a processor cause the processor to perform the corresponding methods are also contemplated.

BRIEF DESCRIPTION OF THE DRAWINGS

FIG. 25 illustrates information representative of incident tickets, service alerts, and incident tickets correlated with alerts in accordance with an embodiment;

FIG. 31 shows a GUI example of an issue and associated details;

In FIG. 39, a dashboard is shown before running any cleaning, text processing and steps explained before using pure LDA model, and it is important to note that the specific words being automatically generated as labels for the second layer of clustering are duplicative and do not appear to be particularly useful.

FIG. 40 is a screenshot showing an improved dashboard is shown whereby the process is conducted after the cleaning, text processing, and one can observe that the clusters have changed and the words chosen for the automatic labels has improved.

FIG. 41 is a screenshot showing an example two layer dashboard is shown whereby a slider element (e.g., slider widget bar) is provided that can be interacted with by the user to modify clustering granularity. In this example, as the slider is moved from left to right, it is able to transition between states having a granularity level of 2 to a granularity level of 10. As the granularity level increases, the numbers of layers in the second layer, represented as L2, can be increased.

FIG. 42 is a two layer dashboard which has 7 sub-layers at the second level, with their corresponding numbering listed in the second concentric circle. The outer concentric circle shows the label words automatically generated for the particular sub-layer cluster. For example, cluster 1 (L2:1.0) has the label words message, get, and client.

DETAILED DESCRIPTION

Figure 1:
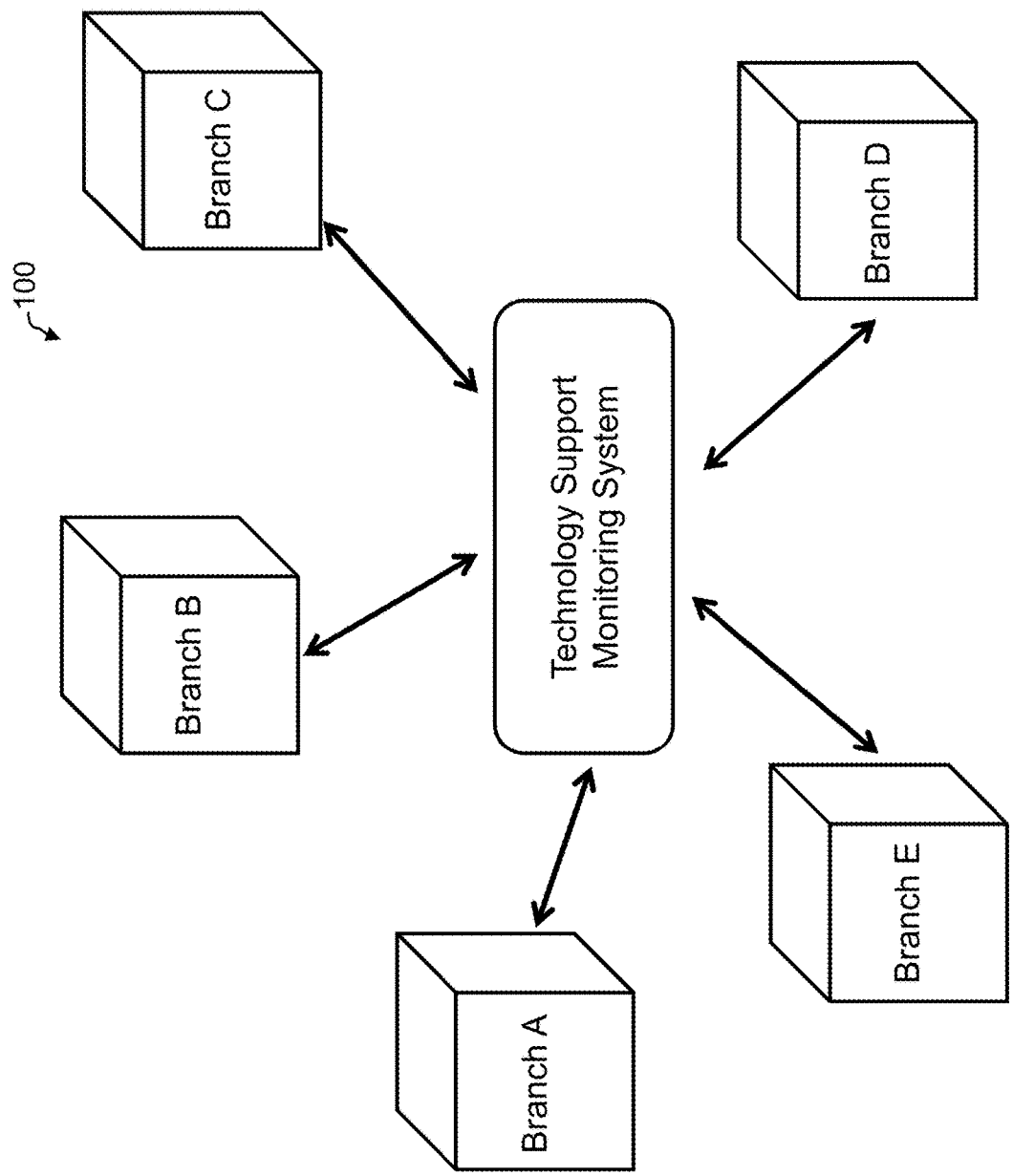
FIG. 1 a schematic diagram of an exemplary bank (information) technology support and monitoring system for support bank branches.

Bank technology infrastructure includes mobile and desktop applications, point-of-sale systems (PoS), hardware (ATMs, printers), and any other technologies that require support and maintenance, as-needed or on-going. Required support or maintenance may be reported or communicated to the IT support system and lead to the generation of incident tickets.

IT support systems at banks have to support a wide variety of platforms (information technologies, or simply technologies), including both software such as mobile applications and hardware such as ATM machines, as part of a technology infrastructure. Banks handle millions of transactions daily across a plurality of platforms and thus it is critical that problem be resolved quickly and if possible anticipated beforehand. Oftentimes problems may be duplicated across platforms, e.g., PoS systems may fail at hundreds of branches around the same time, which can lead to a proliferation of IT support requests and drop in efficiency, or may be predicted, e.g., by monitoring usage patterns and flagging potential signs of customer frustration. As referred to herein, a customer includes a user of a bank technology, and may include bank employees, e.g., in bank branch technology infrastructure.

To increase operational efficiency, bank IT support systems deploy solutions to help analyze and predict technology support incidents, e.g., provide "system-level" insight.

These solutions issue service alerts accessible to one or more levels of the IT support system and may often be associated with incident tickets logged by a customer or a device in the IT support system. For example, a prediction engine may issue a service alert predicting an impending problem with a technology, e.g., by flagging unusually long client dwell time on a particular screen in an application. This service alert may soon be followed by incident tickets communicated to the IT support system by the customer complaining about the application not working. In other solutions, such solutions may monitor IT incident tickets and their historical patterns. For example, a machine learning algorithm may parse cycle through a variety of support requests to generate a single service alert or provide an anticipated problem alert.

Thus, IT support systems are inundated by alerts and tickets. An alert is indicative of a service event, e.g., as mentioned earlier, they may be an alert generated by data analytics software predicting a potential problem arising with the ATM in a bank branch. Tickets are indicative of incidents that are reported to the IT support system, e.g., as mentioned earlier, an incident may be an actual ATM failure which is then reported by a customer.

Since tickets can be user-generated (but may be device generated) they are non-standardized and often informal. Several tickets can be closely related, and/or may be related to an alert (or one or more). With banks dealing with millions of transactions, the IT support staff may be unable to group related tickets together efficiently (manually or use unsuitable algorithms) and also may not be able to relate alerts to tickets and are thereby may be unable to achieve a system-level view and troubleshooting of the state of the IT support system.

Interoperability issues may also arise as multiple solutions may be employed or existing solutions may be configured to track specific types of issues, e.g., IT support requests submitted electronically, by logging an issue with a basic IT help desk (L0 support), and/or machine-generated requests (such as a jammed printer or ATM pinging IT support). A bank IT support system will include many ways a customer can approach to ensure flexibility and the ability to resolve difficult issues quickly. For example, branch employees may contact higher level support directly (L2-L3) to resolve a complex problem (without serial elevation through L0) by telephone or physically approach an IT technician. Such IT support requests are not all necessarily tracked by analytics software and are often entered into the IT system in a haphazard, fragmented, or informal manner. This leads to loss of efficiency, due to duplication of efforts, and lack of insight to proactively resolve problems.

Furthermore, in an IT support system, L1/L2/L3 support levels are meant to be cascaded support, where each level pushes issues to the next level. Thus, L1 are primary contact for customers (branch technology staff) and handle small issues directly. L2 and L3 handle nuanced and ambiguous issues. The motivation behind such cascaded IT support system is at least partially to encourage higher levels of support staff to adopt a systems-level approach to solving technology problems, in order to gain efficiency and prevent problems from proliferating or arising in the first place, e.g., by fix systemic issues. In contrast, the lower levels of support staff (e.g., L1) will be more technology or application-focused, with little focus on the broader picture.

However, often-times, a particular IT support level (e.g., L2) takes on a disproportionate amount of the work-load for providing support since it may be best-situated ("just close enough") to address problems reported as incident reports and used to generate incident tickets (typically by the L1 level), i.e., problems receive pushed IT support requests from L1.

At the same time, the same IT support level may also be best suited to system level thinking to proactively or more efficiently solve issues but may not be able to because it may be engaged in "fire-fighting mode", i.e., excessively technology or application focused. Additionally, the geographically disparate nature of IT support staff often leads to inconsistent system-level perceptions of technology infrastructure needs. Occasionally, the IT support systems may also be separated, e.g., incident tickets may be generated via a plurality of methods and may or may not be integrated.

FIG. 1 a schematic diagram 100 of an exemplary bank (information) technology support and monitoring system for support bank branches.

The bank branches or technology situated therein may transmit support information to a remote client. The support system supports the bank's technology infrastructure, which may include non-bank related infrastructure. In some embodiments, the technology support system tests technologies situated within branches against manually set experience thresholds to ensure well-functioning of the technologies.

The technology support and monitoring system can include one of more computer processors (e.g., microprocessors) which operate in conjunction with computer memory (e.g., RAM, ROM) to provide an improved ticket clustering system as described in various embodiments herein.

The technology support monitoring system, in some embodiments, can be a computer server or a special purpose computer appliance, which resides within a data center and can couple to a message bus to receive various data sets from upstream IT service ticket systems, and generate one or more output data structures based on clustered information derived from conducting natural language processing operations.

Figure 2:
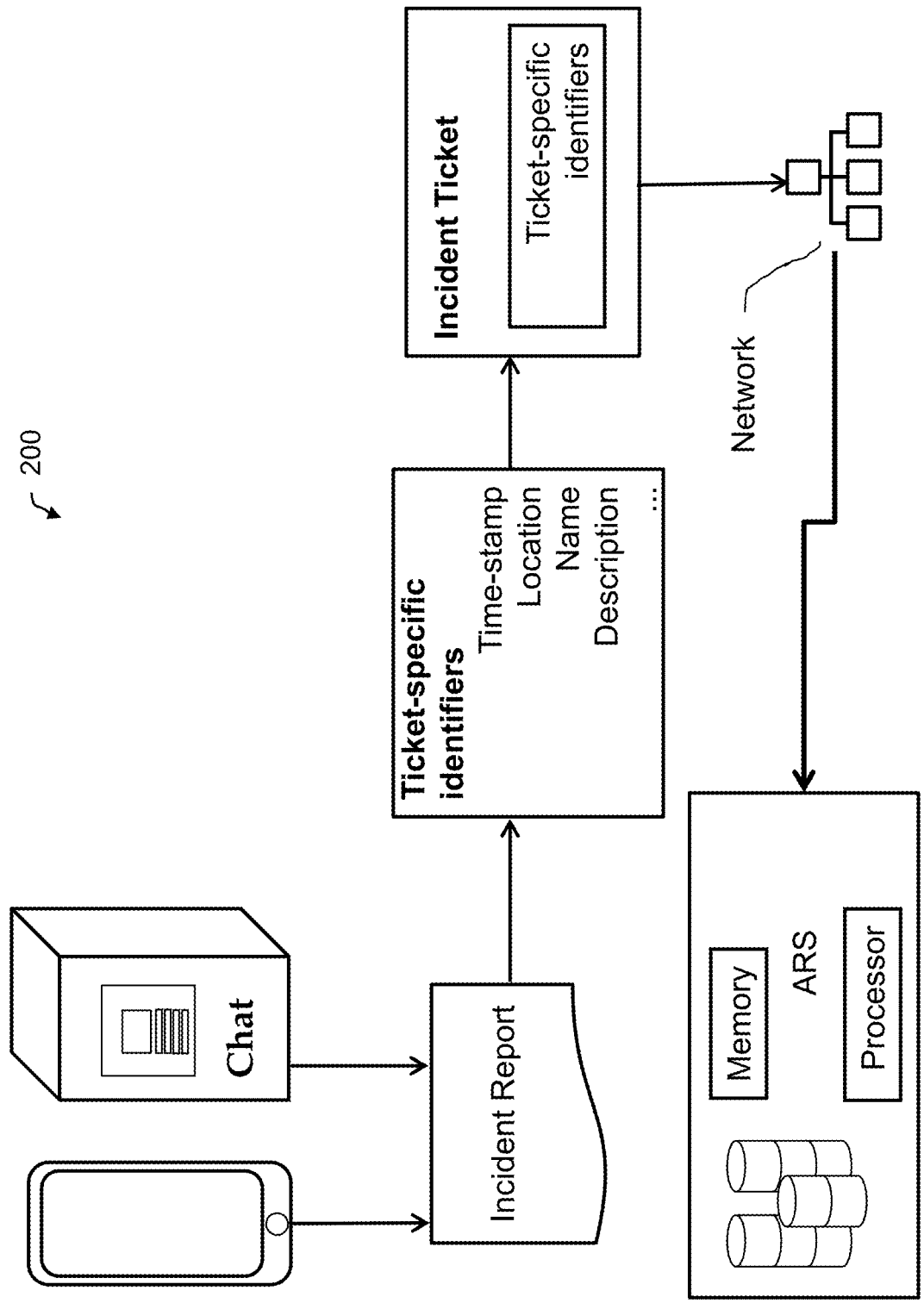
FIG. 2 shows schematic examples of incident tickets (tickets)

FIG. 2 shows schematic examples 200 of incident tickets (tickets).

Incident reports are generated and can include incident tickets that are represented in the form of data objects that have underlying data fields and data values. These fields, include, for example, a textual brief description of the issue (e.g., a subject line of the incident report), followed by a longer full description of the issue (e.g., reproducibility steps, error codes, core dumps, additional explanation by the user).

Incident tickets are generated from reported incidents. The incidents may be reported by a customer or end user. For example, incidents may be report using a chat system or via phone call. The reported incidents a collection of (incident) tickets. Each ticket of the collection of tickets includes a ticket identifier. Each ticket identifier includes at least one of a ticket-specific time-stamp, location, name, or description.

The incident tickets may include non-standardized information generated from customer communications and/or standardized information, e.g., generated via a device submitting an auto-triggered maintenance request. Customer communications may be non-standardized (e.g., informal or not in accordance with a predefined definition or standard). In some embodiments, incident ticket identifiers are collected and consolidated via the contact center agent while on call with an individual user submitting the issue.

Figure 3:
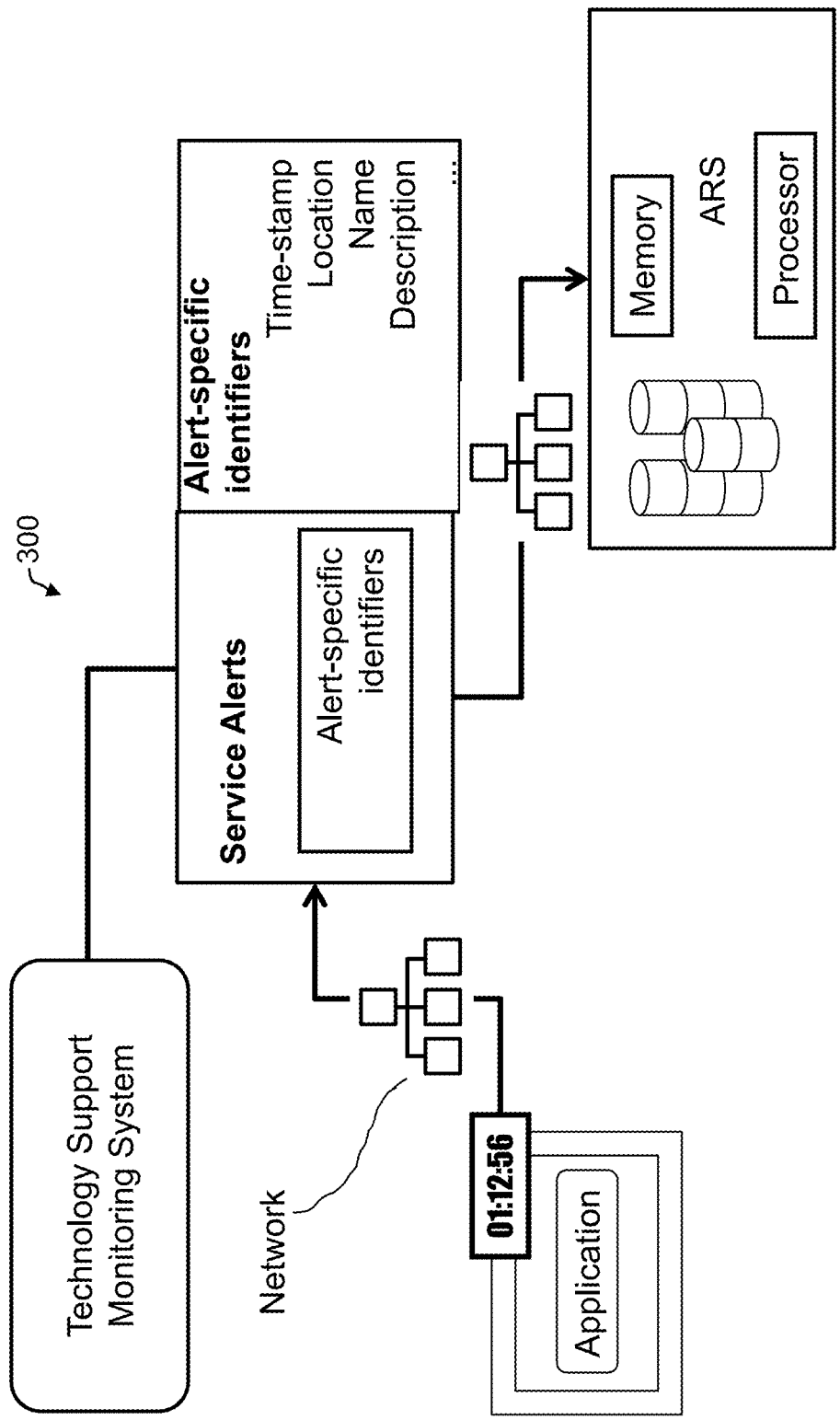
FIG. 3 shows schematic examples of service alerts (alerts)

FIG. 3 shows schematic examples 300 of service alerts (alerts).

Each service alert of the collection of service alerts includes an alert identifier. Each alert identifier includes at least one of an alert-specific time-stamp, location, name, or description. In some embodiments, other alert identifiers may be available as well. Service alerts may be standardized or include standardized information, e.g., generated by analytics software. Service alerts are generated via the technology monitoring system. Applications under monitoring will occasionally breach experience thresholds, prompting a service alert to be autonomously created with service alert identifiers. Service alerts, can include automatically generated error reports and core dumps that are generated automatically from applications, such as error log of crash error signatures.

Figure 4:
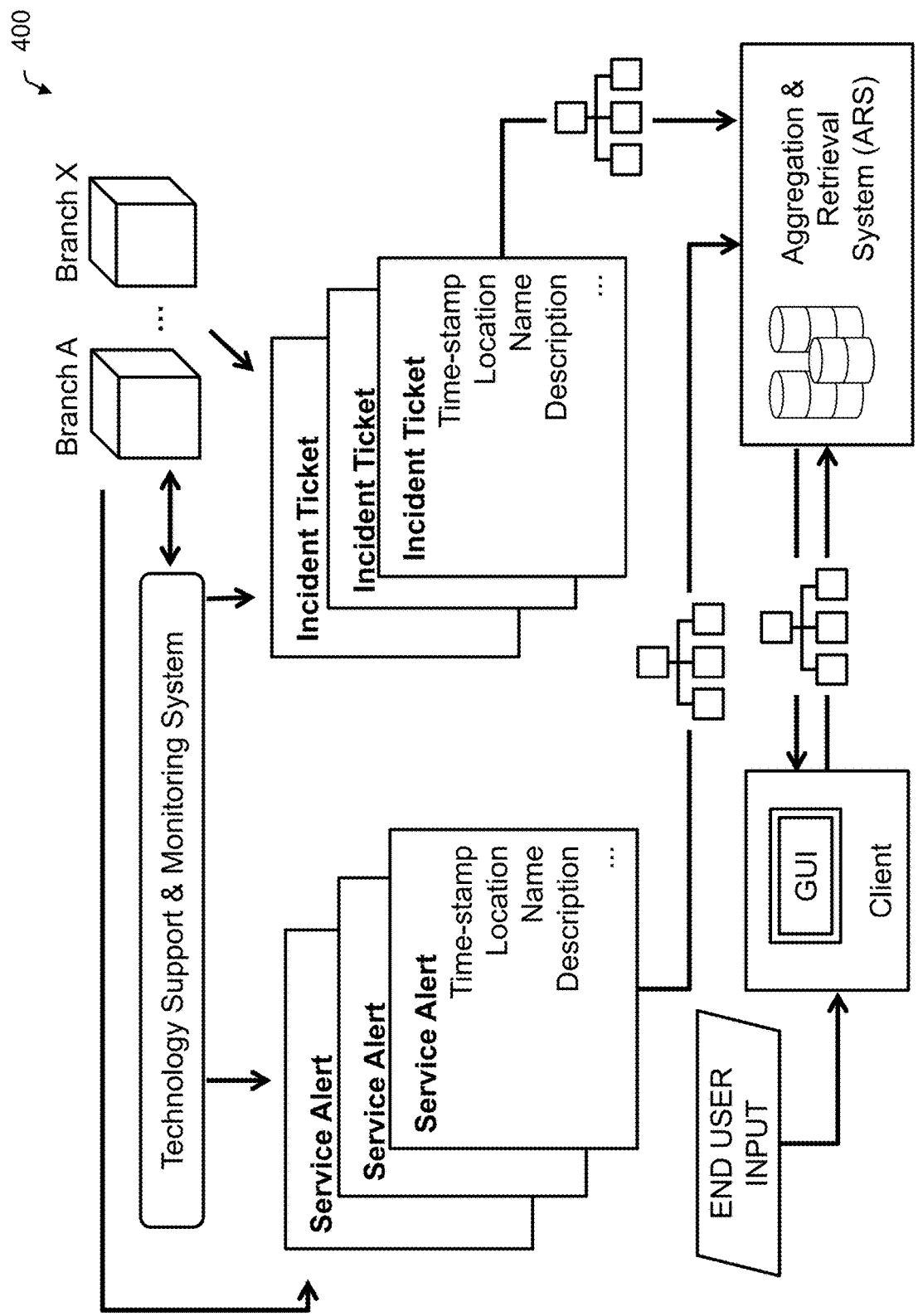
FIG. 4 is a schematic of an exemplary IT support architecture 500, including an aggregation and retrieval system (ARS) for monitoring.

FIG. 4 is a schematic of an exemplary IT support architecture 400, including an aggregation and retrieval system (ARS) for monitoring.

The ARS may consolidate information generated via the two or more input streams of the technology monitoring system (e.g., human generated from contact center related to incident tickets, and machine generated from MoogSoft™ software related to service alerts).

One or more bank branches communicate with the technology support and monitoring system, e.g., over a network, including geographically remote branches. The branches transmit service alert and incident ticket information to the technology support and monitoring system. Data representing service alerts and incident tickets are transmitted to the ARS over network(s). The ARS processes this data and transmits processed data over a network to a client, which may be a remote client (geographically or otherwise). The client may include a GUI, which may interact with an end user. The ARS may also store the processed data in non-transitory computer readable memory (storage device(s)).

Figure 5:
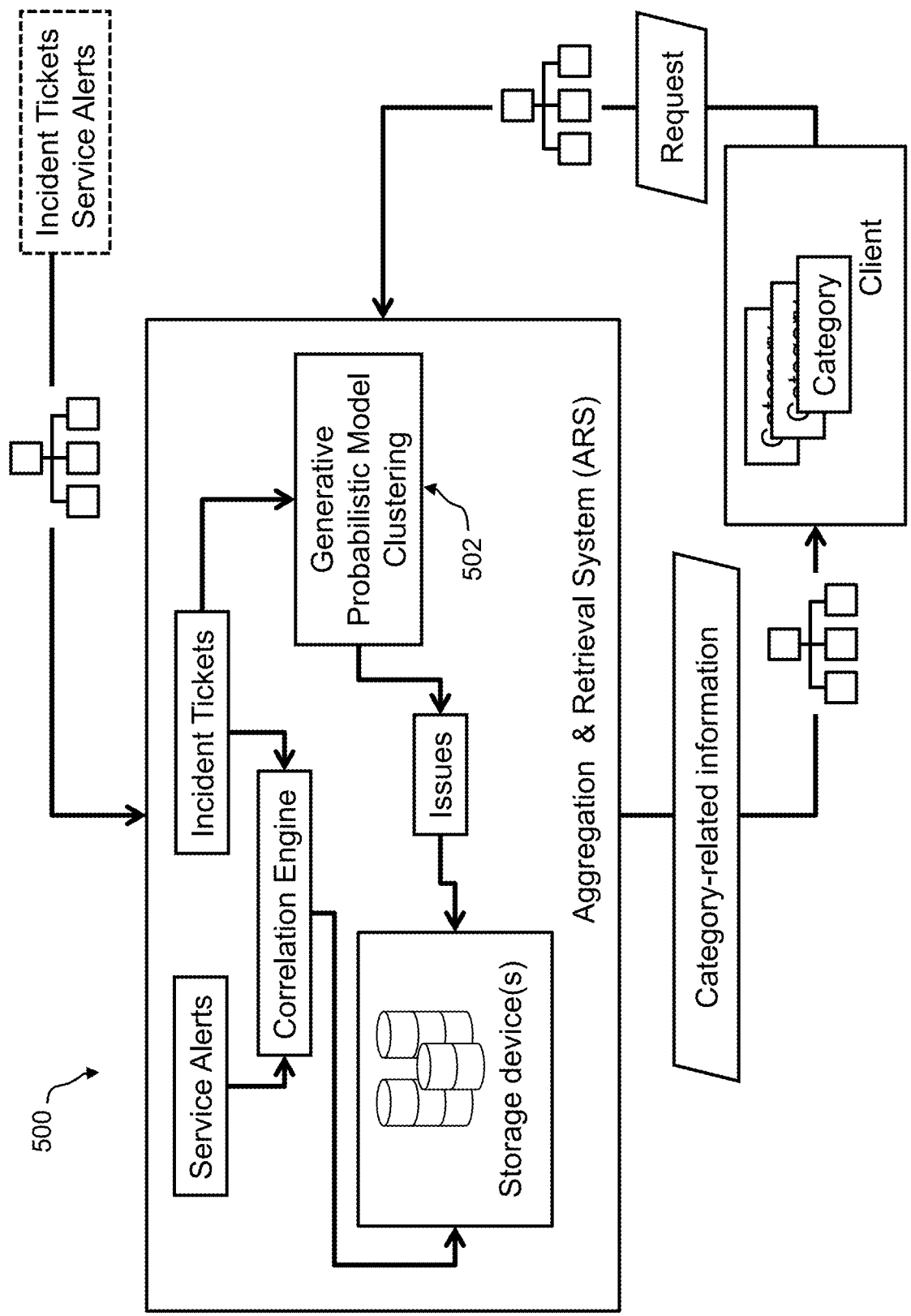
FIG. 5 is a schematic of an ARS and its connection to an IT support architecture, in accordance with an embodiment.

FIG. 5 is a schematic 500 of an ARS and its connection to an IT support architecture, in accordance with an embodiment.

The ARS is configured to transmit support information to a remote client. The support information is generally related to supporting the bank's technology infrastructure.

The ARS system receives data representative of a collection of service alerts and a collection of incident tickets. A correlation engine of the ARS correlates alert identifiers with ticket identifiers, to thereby correlate the associated service alerts with incident tickets, in a correlation engine.

A generative probabilistic model clustering engine 502 of the ARS clusters the collection of incident tickets using a generative probabilistic model. The clustering generates data representative of a collection of issues, wherein each issue includes one or more incident tickets.

The ARS system then transmits, to the client, data representative of a data structure (a "category") comprising an issue and service alerts correlated with incident tickets of the issue. Since the ARS system is typically configured to serve a plurality of end users in geographically disparate regions, this transmission occurs over a network, e.g., in response to a request, received, over the network, the remote client.

In some embodiments, the request is triggered by an interaction of an end user with a graphical user interface of the remote client. In some cases, the collection of issues and service alerts as correlated with one or more incident tickets are storing on one or more network-based non-transitory storage devices to be made available later or in real-time. For example, the data stored may be periodically updated.

Figure 6:
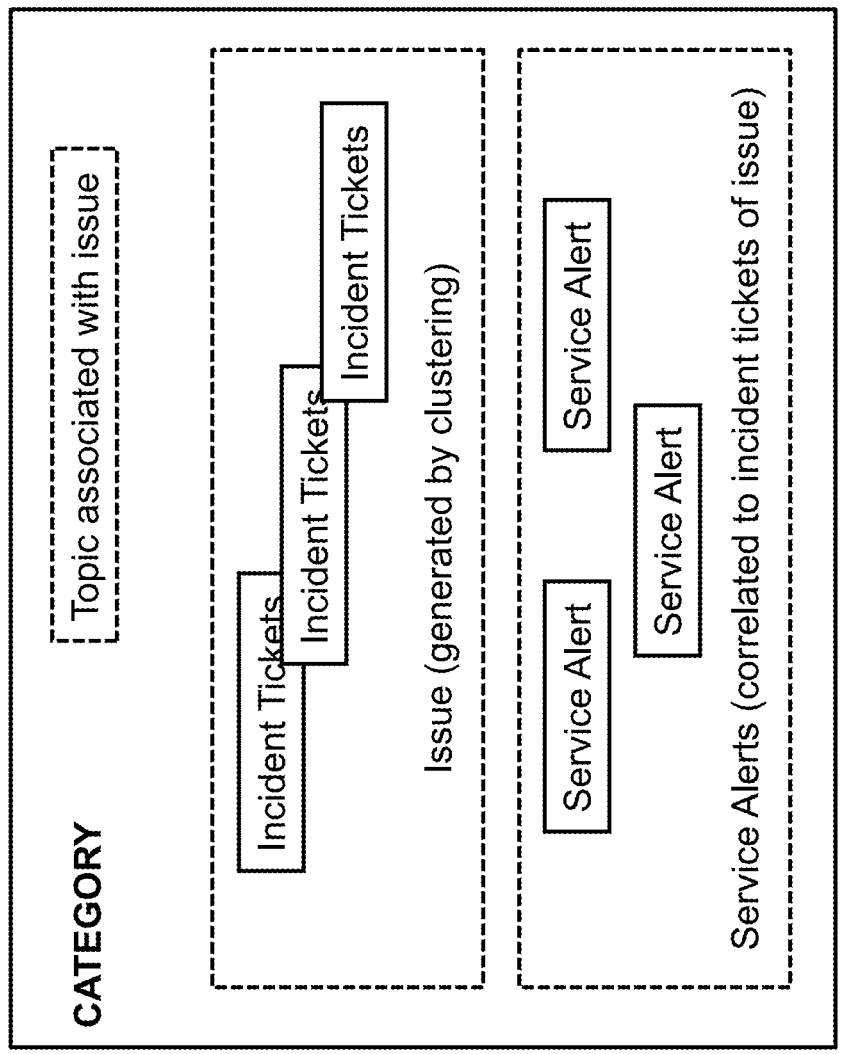
FIG. 6 shows an exemplary data structure on storage device(s) of the ARS for storing incident tickets and service alerts.

FIG. 6 shows an exemplary data structure 600 on storage device(s) of the ARS for storing incident tickets and service alerts. The storage device(s) may include non-transitory computer readable memory. The data structure may comprise a category containing an issue including one or more tickets, alerts associated with tickets of the issues, and a topic (e.g., description) generated by the probabilistic generative model. These data structures are shown as examples, and different data fields or object schemas may be utilized.

Figure 7:
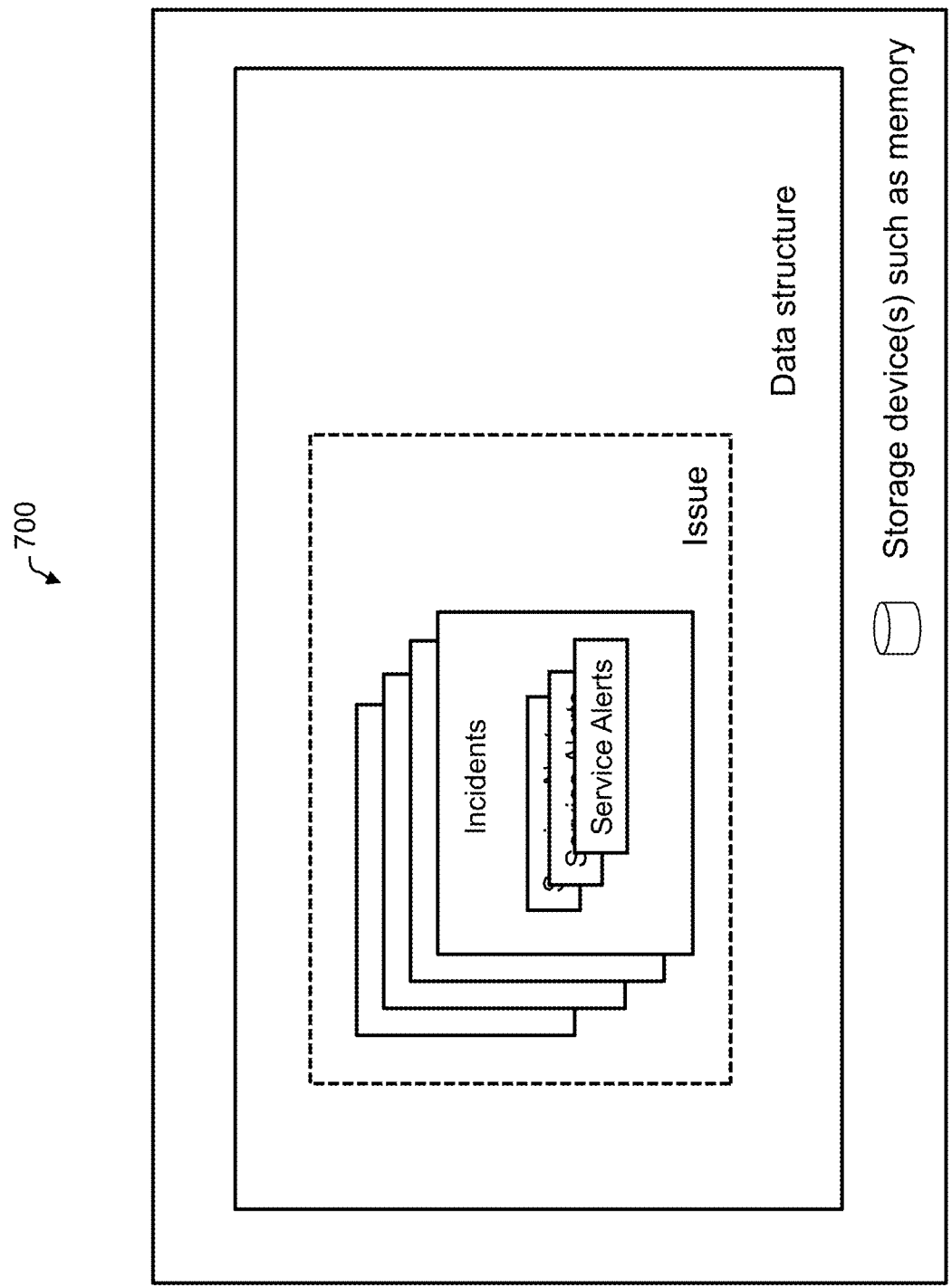
FIG. 7 shows another exemplary data structure on storage device(s) of the ARS for storing incident tickets and service alerts.

FIG. 7 shows another exemplary data structure 700 on storage device(s) of the ARS for storing incident tickets and service alerts. The data structure may be cascaded, with each subpart of the data structure containing an issue, the issue containing incidents, each incident containing one or more service alerts.

Figure 8:
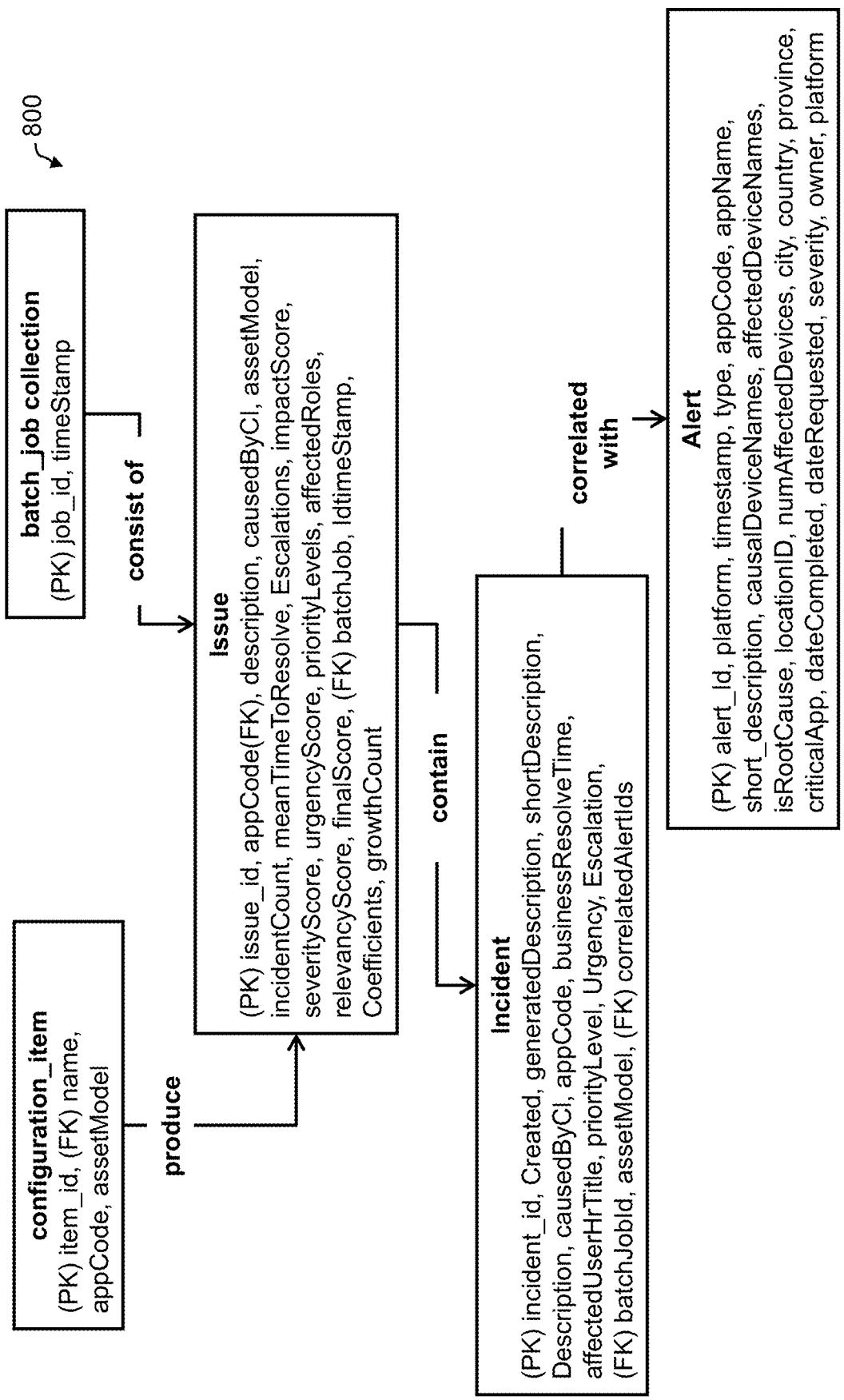
FIG. 8 is an exemplary entity relationship diagram 800 that shows how collections or documents are stored in a NoSQL database.

FIG. 8 is an exemplary entity relationship diagram 800 that shows how collections or documents are stored in a NoSQL database.

In some embodiments, each "document" may be stored as a JSON object in a MongoDB™ database. The schematic shows the one-to-many relationship between documents, e.g., each issue may have a one-to-many relationship with incident tickets.

A batch job collection document may specify when the issues were generated or are to be generated.

The issue document may include several fields, e.g., an issue identification number (issue_id), application code (appCode), mean time to resolve (meanTimeToResolve), escalations between support levels (escalations), a measure of impact (impactScore), a measure of severity (severityScore), a measure of urgency (urgencyScore), priority level(s) (priorityLevels), user (types) affected by the problem (affectedRoles), time-stamp (timeStamp), coefficients such as those used for prioritization (coefficients), and other fields shown in FIG. 8.

The incident ticket document may include several fields, e.g., an ticket identification number (incident_id), when the ticket was created (created), description (description), a short or generated description (shortDescription or generatedDescription), escalation details (escalation), urgency of the incident ticket (urgency), time to resolve (businessResolveTime), details of affected users (affectedUserHrTitle), and other fields shown in FIG. 8.

The alert document may include several fields, e.g., an alert identification number (alert_id), platform associated with alert (platform), when the alert was created (timestamp), application name (appName), a short description (short_description), location (city, country, province), number of end user devices affected (numAffectedDevices), severity of predicted problem (severity), location identification number (locationID), and other fields shown in FIG. 8.

Figure 9:
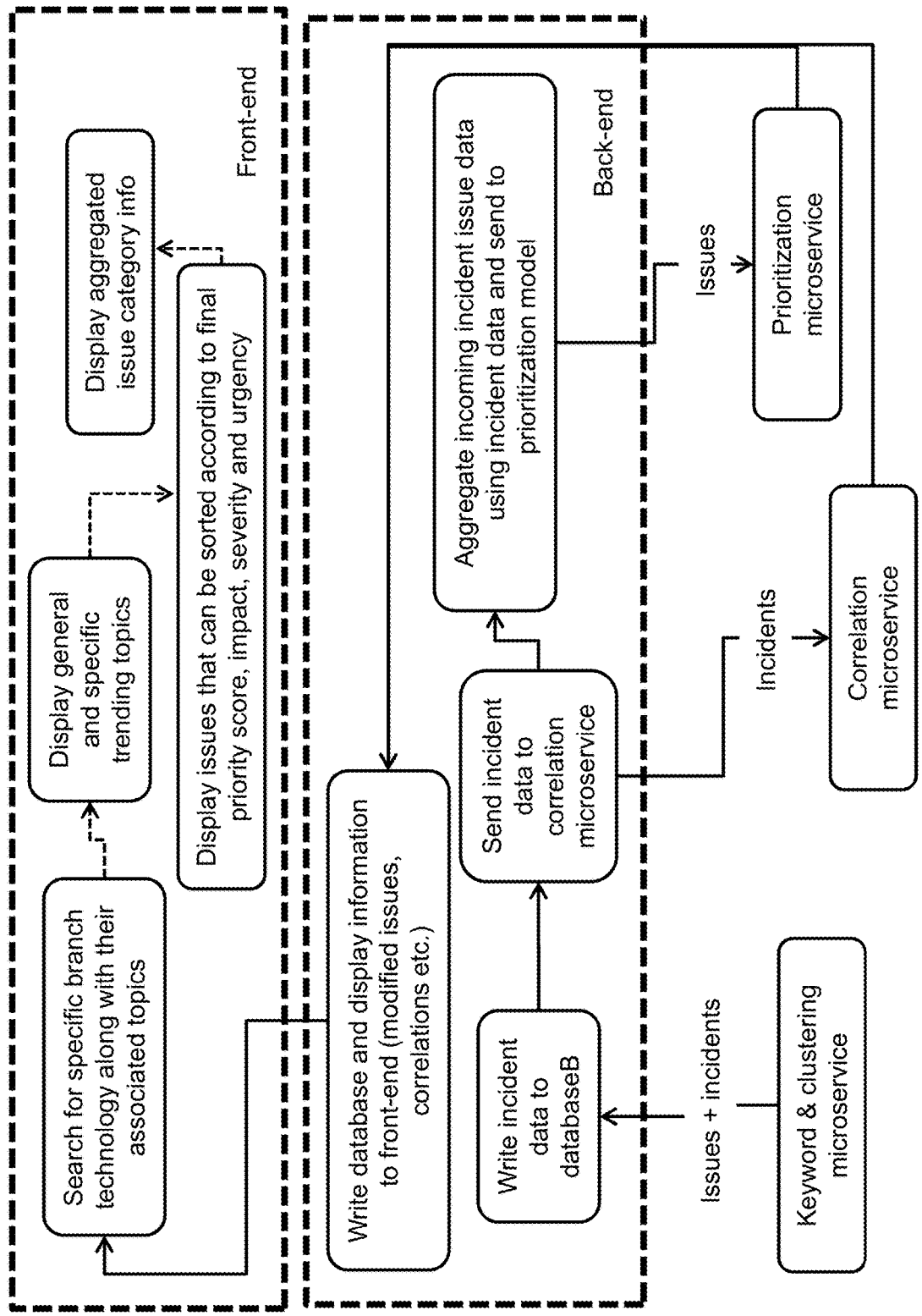
FIG. 9 is schematic 900 of an exemplary data creation process of issue categories and correlated incidents to alerts.

FIG. 9 is schematic 900 of an exemplary data creation process of issue categories and correlated incidents to alerts. The process may comprise interaction between front-end, back-end, and microservices, as illustrated.

A keyword and clustering microservice may be configured to cluster incoming incidents into issue categories and send transformed data to the backend, by first pulling incident (ticket) data. The keyword and clustering microservice may be configured to pull ServiceNow™ incident data from ECE Cluster on a daily basis (or another time duration)

A correlation microservice may be configured to pull two weeks (or another duration) of Moogsoft™ Alert data and may correlate with the incoming incident (ticket) data. The correlation microservice then sends the incident data with Moogsoft™ alert identification tags or other identification (identifiers), appended as fields, to the back-end to be written into the database.

A prioritization microservice may be configured to perform priority score calculations on each individual issue and then send modified issues with priority scores to the back-end.

In some embodiments, the process begins at a keyword and clustering microservice where incidents may be pulled on a daily (or first time period) basis from a cloud service, e.g., Elastic Cloud Enterprise (ECE) Elasticsearch™ server. The keywords from these incidents may then be extracted and used to cluster similar incidents into issues (using a clustering engine, probabilistic generative model) or "issue categories". The issue categories are then appended as a field into each incident ticket document. Both the modified incidents and issue categories may then be sent to the back-end where they are aggregated and written into the MongoDB™ database.

In some embodiments, a correlation microservice (engine or system) may pull 2 weeks (or second time period) of MoogSoft™ alert data from the ECE Elasticsearch™ server and correlate it with the daily (or first time period) incident data in the MongoDB™ database. The output is sent to the back-end where the incidents are updated in the MongoDB™ database.

In some embodiments, a prioritization microservice (engine or system) may receive aggregated issues from the back-end and perform the prioritization calculations. The results from this process may be sent back to the MongoDB™ database and updated accordingly.

The back-end may communicate with the microservices mentioned above and coordinate between them, and also coordinate/communicate with the front-end. The front-end may communicate with a client or may include a display. The front-end may implement a GUI for interaction with an end user.

Figure 10:
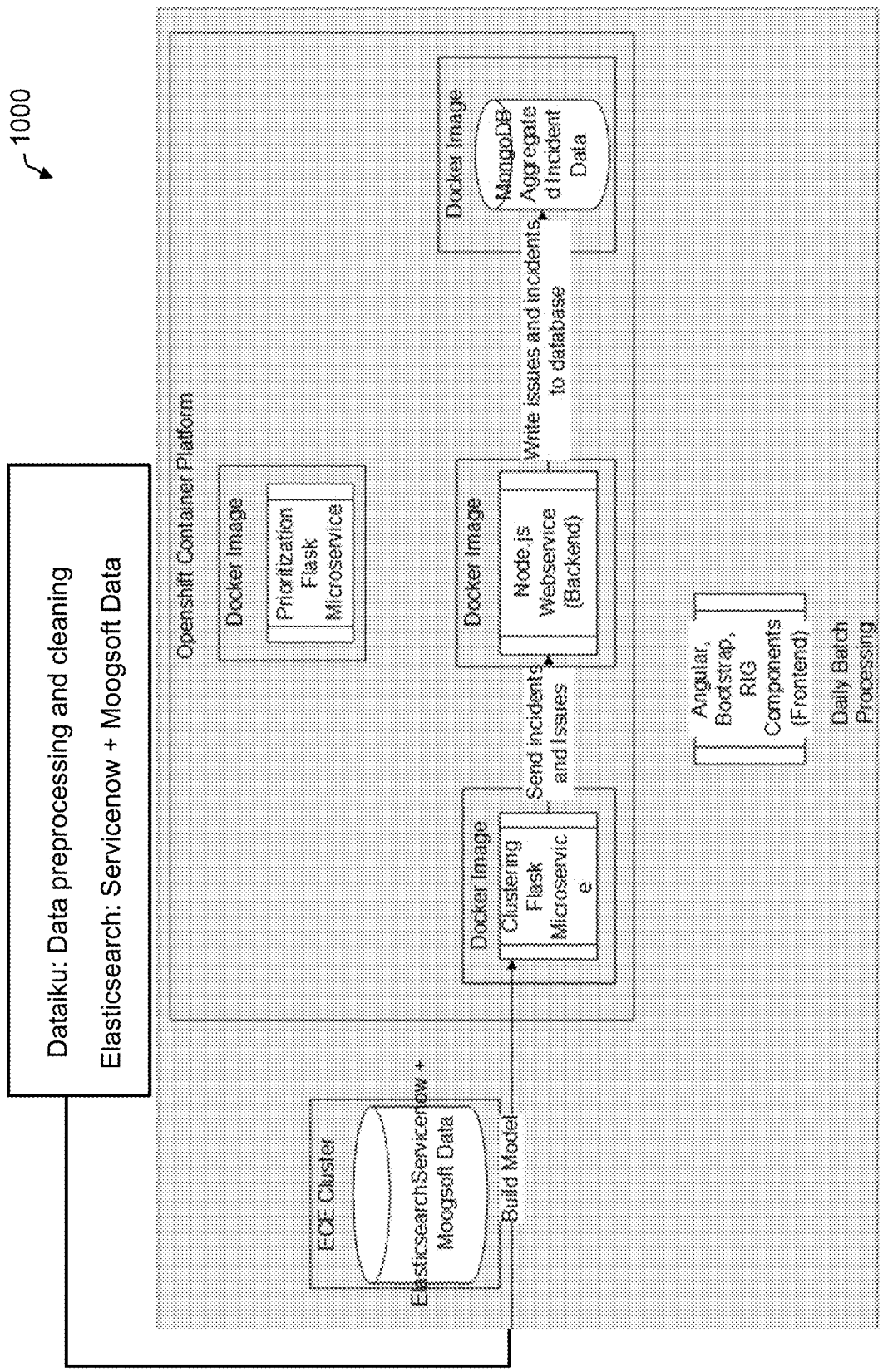
FIG. 10 shows an exemplary state architecture.

FIG. 10 shows an exemplary state architecture 1000.

In some embodiments, clustering microservice pulls data from ECE server and then processes and transforms the data (creates issue categories). The transformed data (issues+incidents) may then sent to the Node.js back-end which further aggregates the data and writes it to the MongoDB database. The newly transformed issue data may then sent to the prioritization system where it is processed and then updated in the MongoDB™ database.

Figure 11:
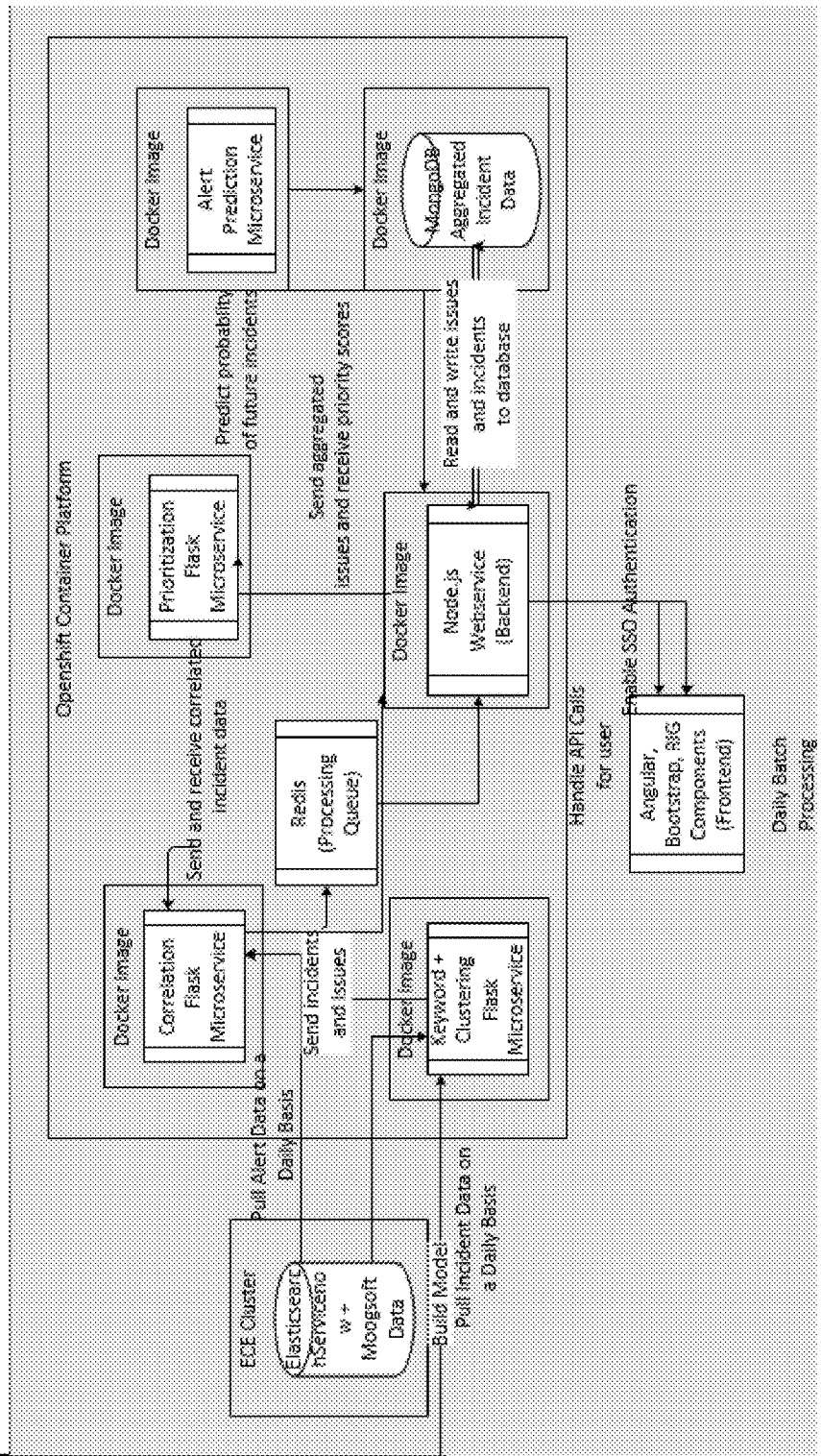
FIG. 11 shows another exemplary state architecture.

FIG. 11 shows another exemplary state architecture 1100.

In some embodiments, the state architecture 1100 may include additional microservices: alert prediction microservice, and (other) correlation microservices. In some embodiments, after the clustering microservice has pulled the incident data, the correlation microservice may use that (current or historical) incident data and correlate it with historical service alert data (e.g., 2 weeks of service alert data) or current service alert data. After this process, the incidents may be sent back to the MongoDB™ database.

Figure 12:
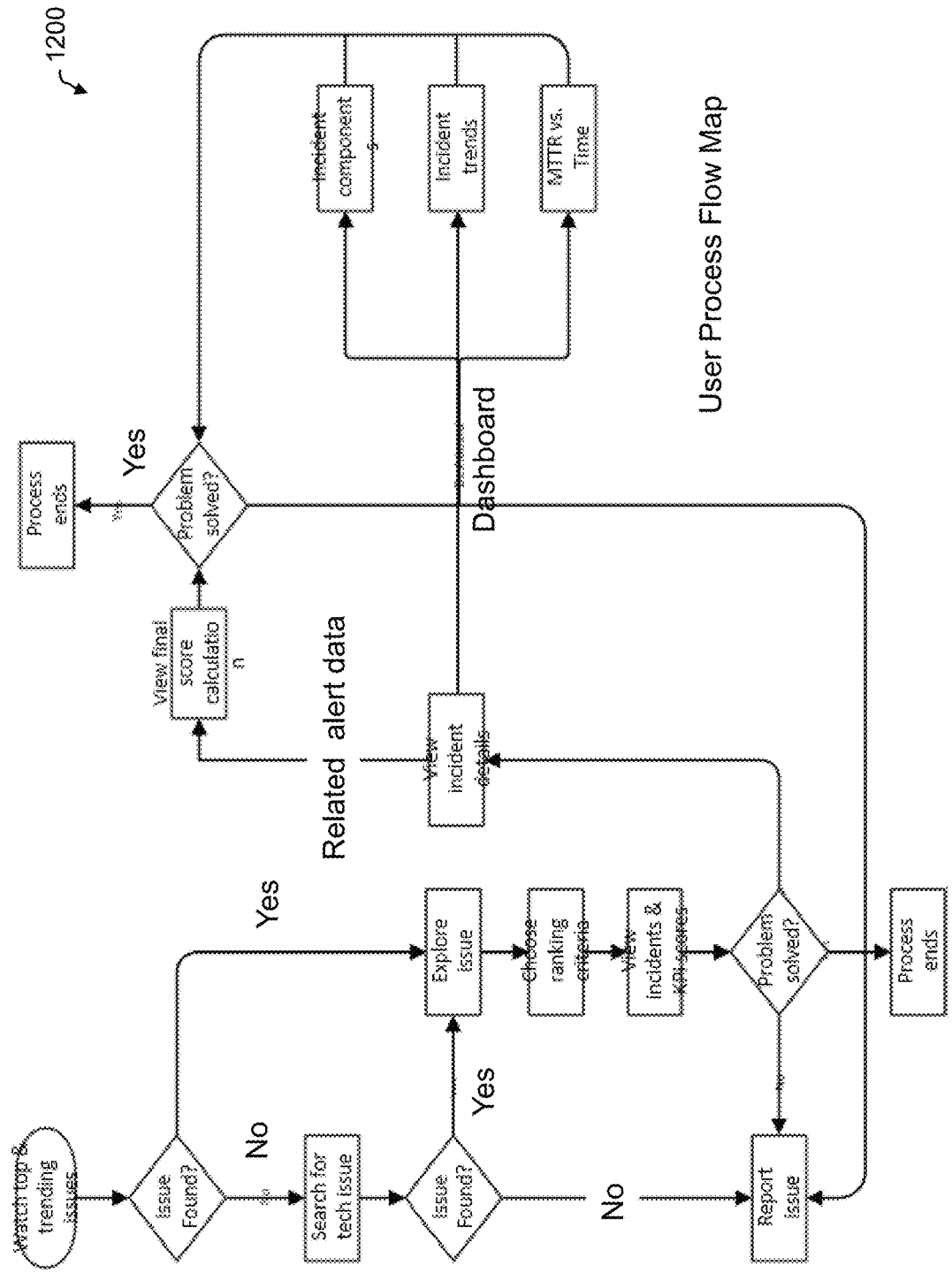
FIG. 12 is an exemplary process flow map of how the user navigates the GUI.

FIG. 12 is an exemplary process flow map 1200 of how the user navigates the GUI.

The process map details how, in some embodiments, the user may navigate a user interface and how the flow may lead the user, e.g., including the use of a dashboard. The diamonds in the diagram shows the navigation decision points of the system in the process.

A user may monitor the system for trending issues, e.g., directly transmitted periodically (batch processed) from the ARS or available upon the user's request. The user may also search for the issues and may also report an issue if not found. The ARS system facilitates exploring issues, evaluate ranking criteria, and view KPI scores. The system may also provide information related to whether problem(s) associated with the issue was solved or not.

Figure 13:
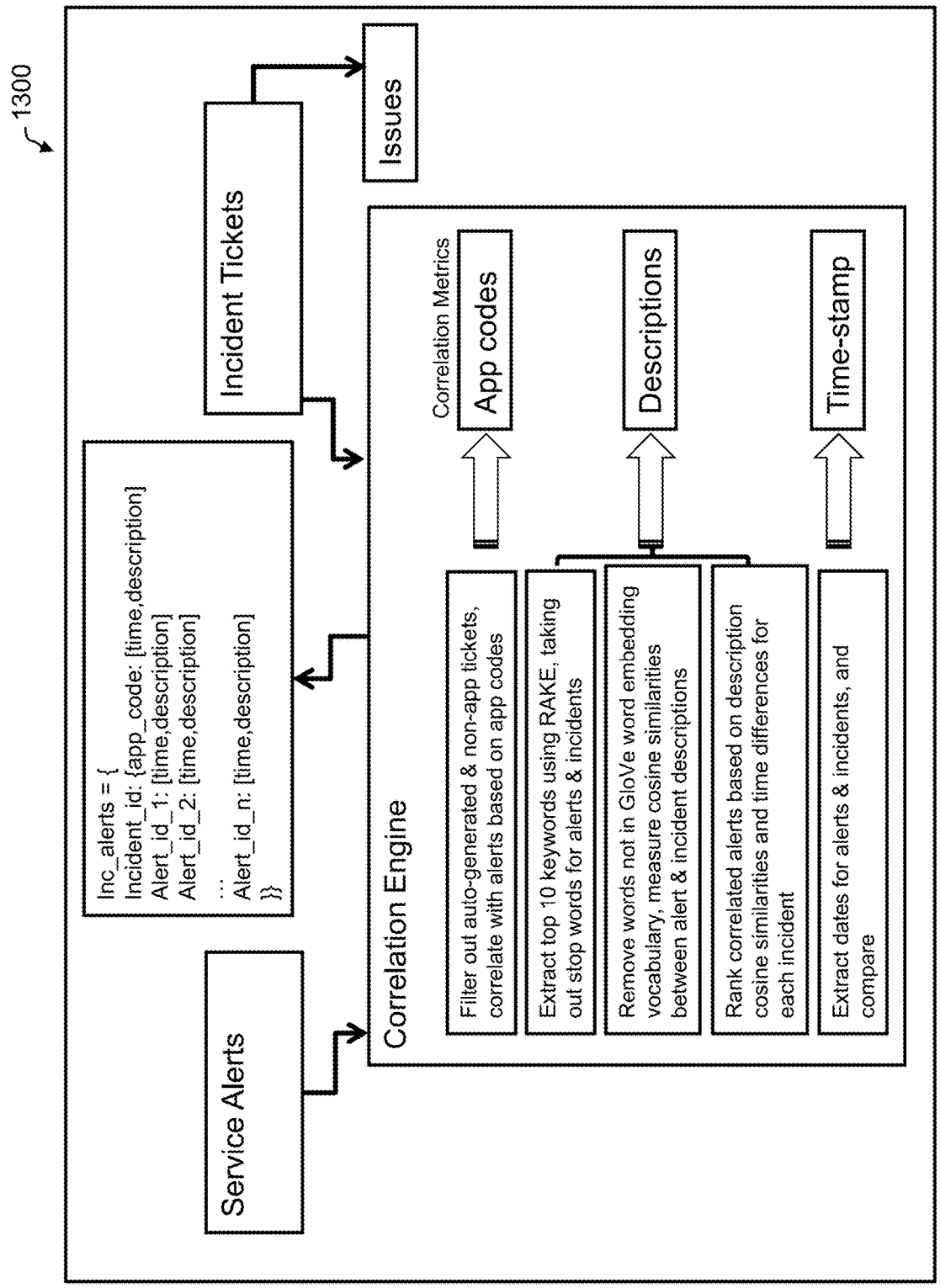
FIG. 13 is a schematic of an exemplary correlation engine, showing correlation metrics being used to rank the alerts correlated to one specific incident.

FIG. 13 is a schematic 1300 of an exemplary correlation engine, showing correlation metrics being used to rank the alerts correlated to one specific incident. The correlation engine is configured to first receive incident data, including incident issue tickets, and conduct an initial processing step to filter out some important columns which has the most important information such as short description, description, resolution note, etc.

Figure 14:
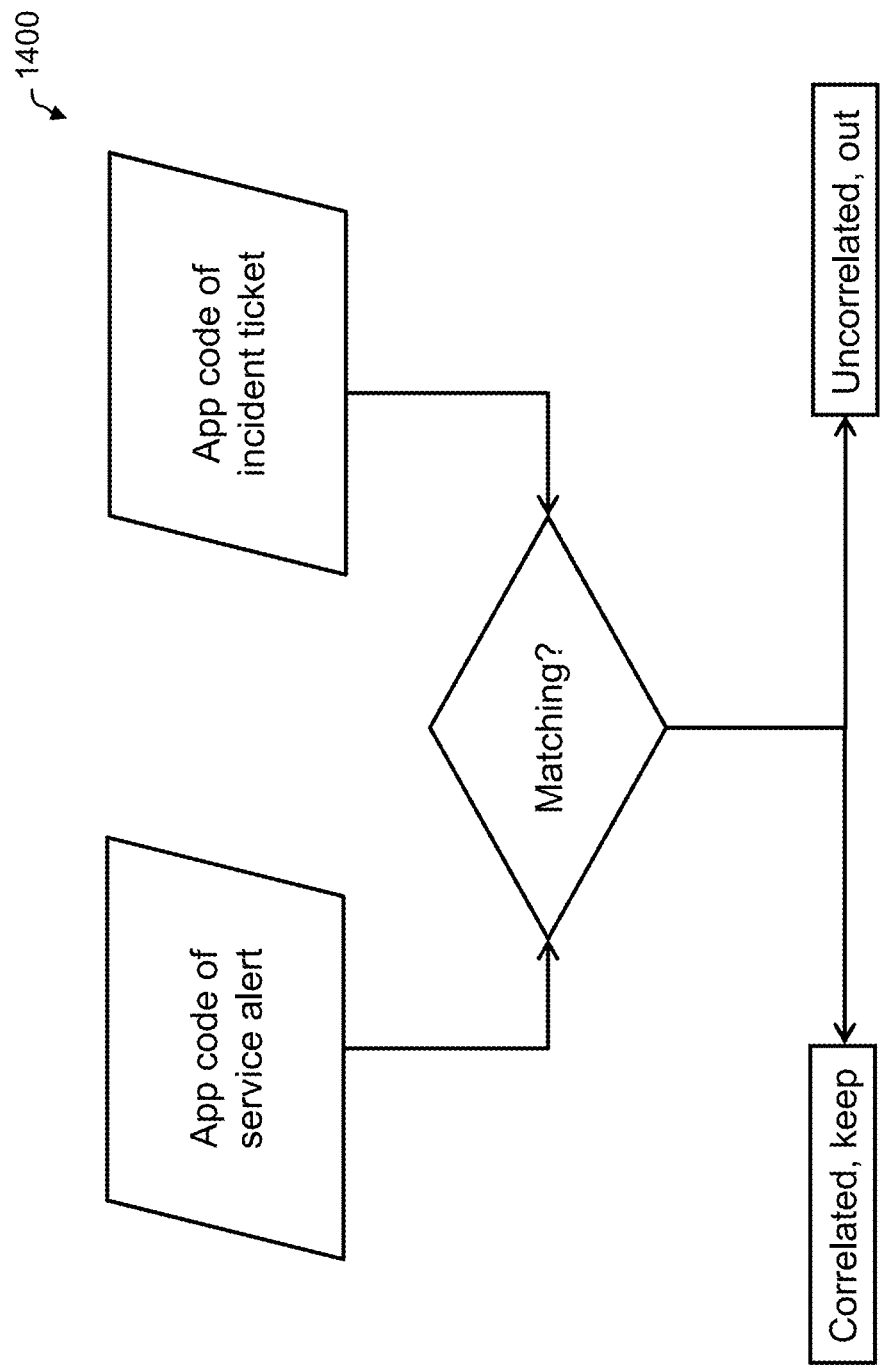
FIG. 14 is an illustration of an exemplary first correlation criteria (app code), showing specifically how app code may be used to filter only relevant alerts.

FIG. 14 is an illustration 1400 of an exemplary first correlation criteria (app code), showing specifically how app code may be used to filter only relevant alerts.

Figure 15:
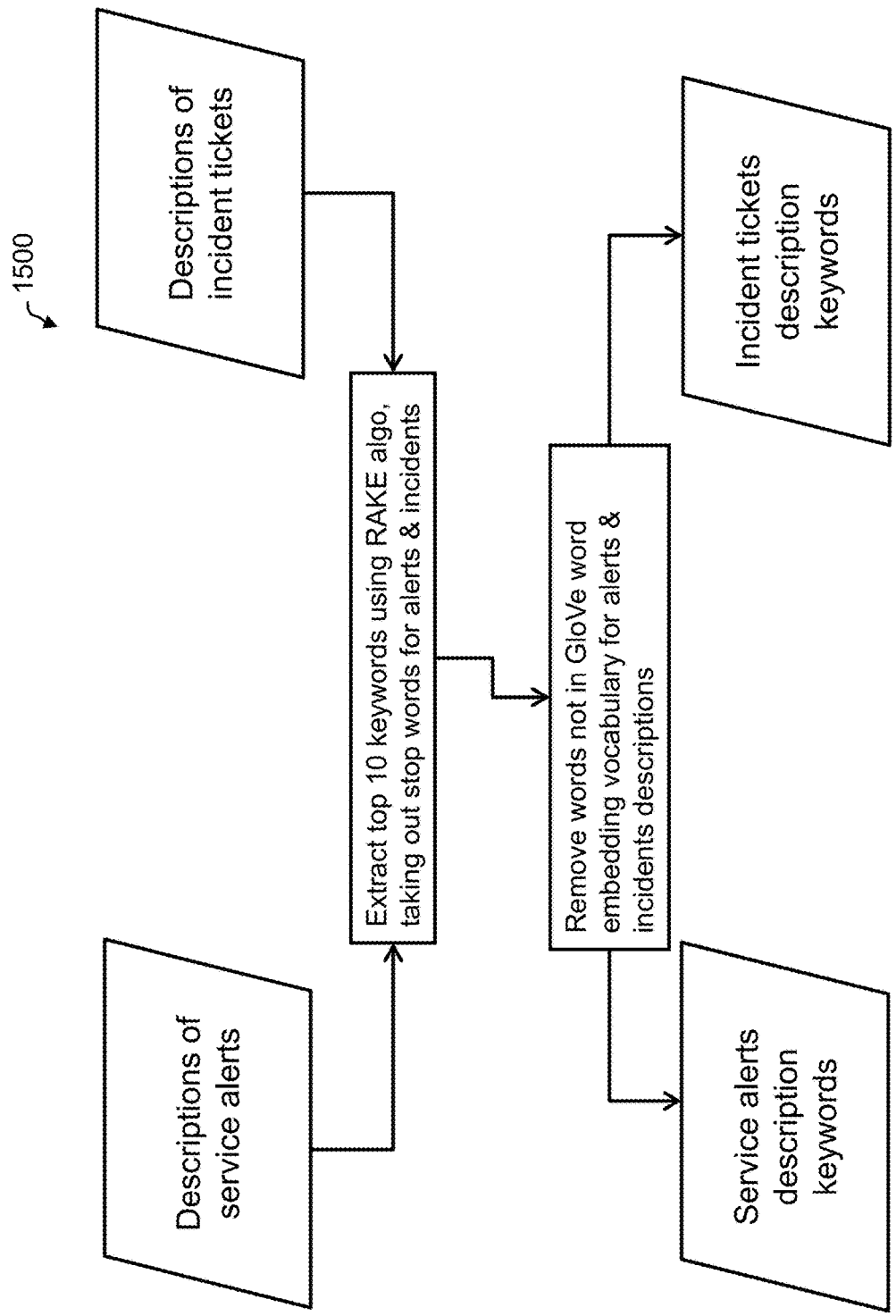
FIG. 15 is an illustration of an exemplary keyword extraction part of the correlation engine.

FIG. 15 is an illustration 1500 of an exemplary keyword extraction part of the correlation engine.

Figure 16:
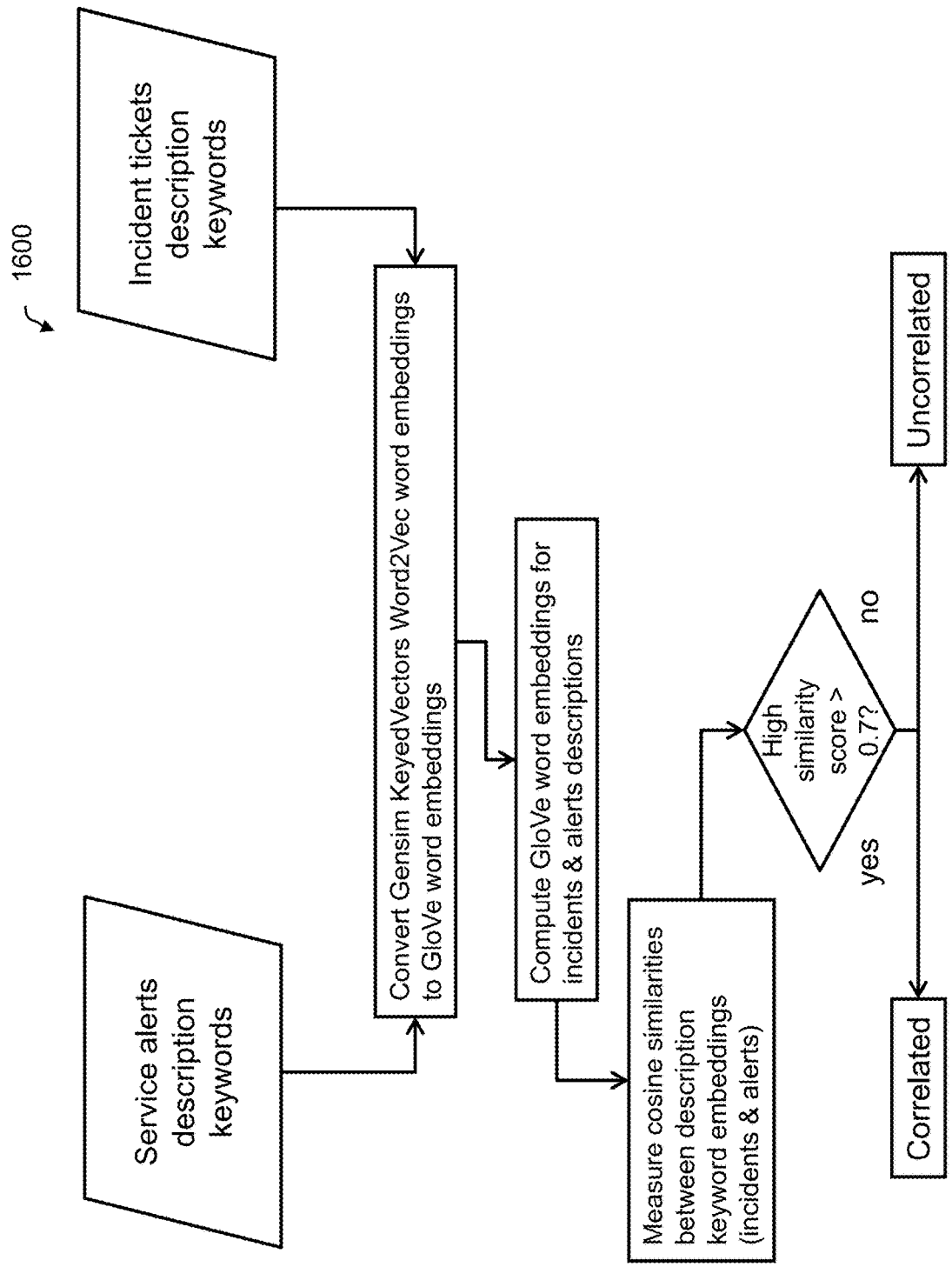
FIG. 16 is an illustration of an exemplary word embedding part of the correlation engine.

FIG. 16 is an illustration 1600 of an exemplary word embedding part of the correlation engine.

In reference to FIGS. 15 and 16, in some embodiments, the correlation engine may correlate descriptions using natural language processing. For example, this may include extracting top 10 keywords using a Rapid Automatic Keyword Extraction (RAKE) process, taking out stop words for alerts & incidents, removing words not in a GloVe (Global Vectors for Word Representation) word embedding vocabulary, measuring cosine similarities between alert & incident descriptions, and ranking correlated alerts based on description cosine similarities and time differences for each incident. GloVe is an unsupervised learning algorithm for obtaining vector representations for words, by mapping words into a vector space where the metric distance between words is related to semantic similarity. Other machine learning algorithms may be utilized as well for natural language processing. Some embodiments may include converting Gensim KeyedVectors and Word2Vec word embeddings to GloVe word embeddings.

Figure 17:
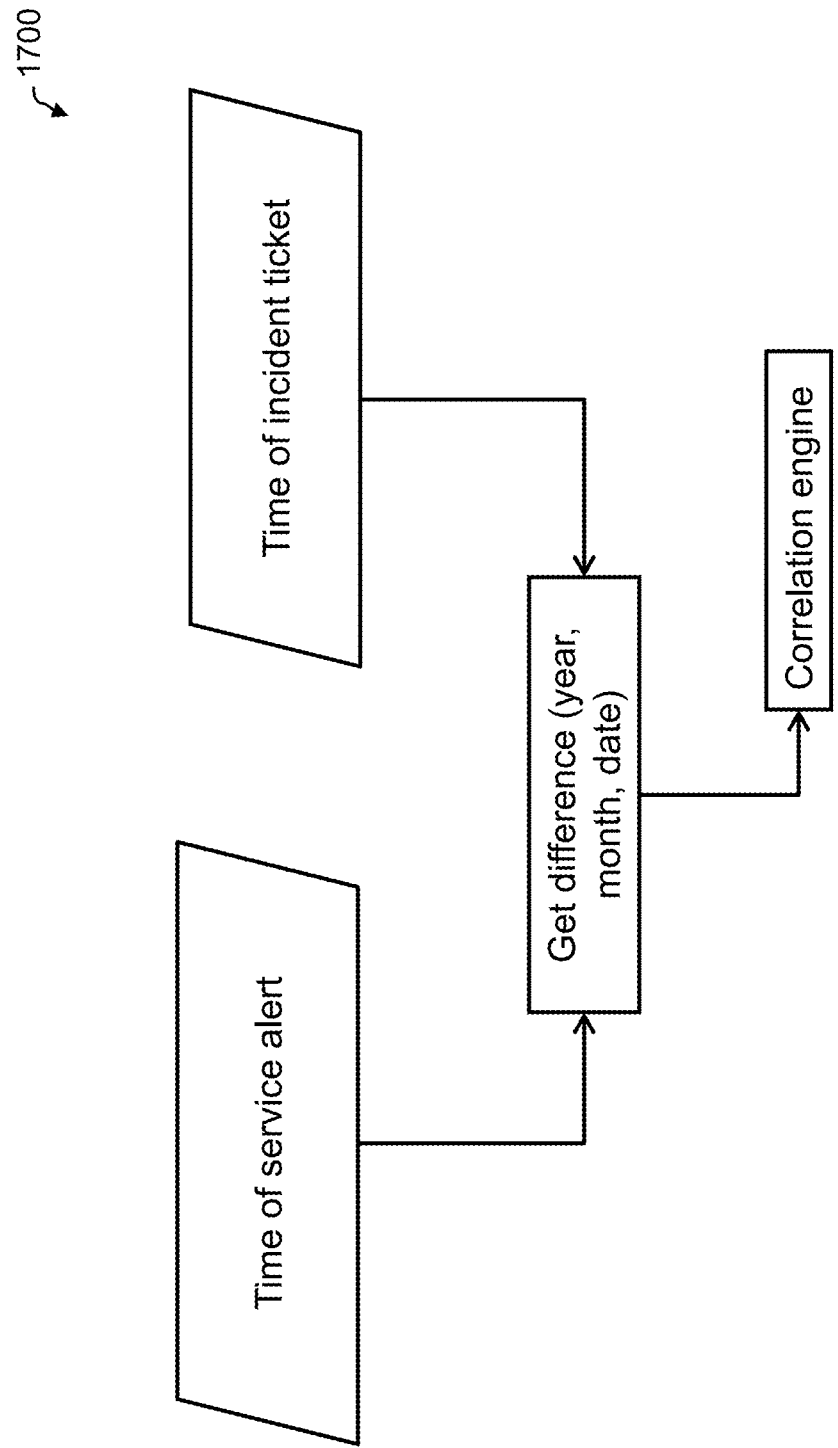
FIG. 17 is an illustration of an exemplary time metric of the correlation engine, to calculate the differences between dates between the incidents and alerts.

FIG. 17 is an illustration 1700 of an exemplary time metric of the correlation engine, to calculate the differences between dates between the incidents and alerts.

In various embodiments, the correlation engine may correlate based on application identification (app code), descriptions, or time-stamps (time). Correlation based on a time-stamp may include filtering out auto-generated & non-app tickets and then correlating with alerts based on app codes.

In some embodiments, the correlation of the description is carried out by associating an alert-specific description with a ticket-specific description if a cosine similarity between the alert-specific description and the ticket-specific description is below a description-correlation threshold.

In some embodiments, the correlation engine may correlate a time-stamp by extracting time and dates for alerts & incidents, and comparing or processing via a clustering algorithm.

In some embodiments, the output of the correlation engine may be in the form of a data structure relating a ticket (or tickets) with alerts, e.g., {Incident_id: {app_code: [time, description], Alert_id_1: [time,description], Alert_id_2: [time,description], Alert_id_n: [time,description]}} where ticket-specific "incident_id" is described by a ticket-specific application identifier ("app_code"), a ticket-specific time-stamp ("time"), ticket-specific description, and one or more associated alerts ("Alert_id_n").

The illustration details an embodiment of the ARS system, where the exact-matching criteria to correlate and store only alerts with the same app codes to the incident dictionary to ensure relevance, before performing future correlation and ranking procedures.

The correlation is carried out by associating an alert-specific time-stamp with a ticket-specific time-stamp if a time difference between the alert-specific time-stamp and the ticket-specific time-stamp is below a time-correlation threshold.

In various embodiments, the time-correlation threshold depends on a technology associated with an incident ticket having the ticket-specific time-stamp.

In other various embodiments, the time-correlation threshold is determined based on historical time-correlation between service alerts and incident tickets.

In some embodiments, the keyword extraction engine may extract the top 10 keywords of both alert and incident descriptions, and only using the keywords existing in the GloVe vocabulary to embed with GloVe word embedding mechanism.

In some embodiments, a common cluster defines a set of inter-correlated alert-specific time-stamps and ticket-specific time-stamps. In some embodiments, the clustering is used indirectly for correlation. The time-correlation threshold is determined based on a characteristic time of a common cluster defining a set of inter-correlated alert-specific time-stamps and ticket-specific time-stamps. Here, as before, the common cluster generated using a clustering algorithm based on time proximity between alert-specific time-stamps and ticket-specific time-stamps.

The characteristic time may indicate a delay between service alert(s) and incident ticket(s). The characteristic time may be width of a common cluster along the time direction.

In some embodiments, to measure the cosine similarities of word vectors from incident and alert descriptions: once the similarity passes the threshold of 0.7 (Cosine similarity is normalized from 0-1), it will not be filtered out as irrelevant. The higher the cosine similarity between the incident and the alert, the closer to the top the alert will rank for the incident.

In some embodiments, is the time metric is the third metric used in the correlation engine, it reads in the year, month, and date of the incidents and alerts before feeding into the correlation engine. The system may only keep the latest 2 weeks' data, therefore only if the time difference is smaller than 2 weeks, it will enter the database as relevant. The smaller the time difference between the incident and the alert, the closer to the top the alert will rank for the incident.

The correlation may be carried out by associating an alert-specific time-stamp with a ticket-specific time-stamp if a time difference between the alert-specific time-stamp and the ticket-specific time-stamp is below a time-correlation threshold; In various embodiments, the time-correlation threshold depends on a technology associated with an incident ticket having the ticket-specific time-stamp. In other various embodiments, the time-correlation threshold is determined based on historical time-correlation between service alerts and incident tickets.

Figure 18:
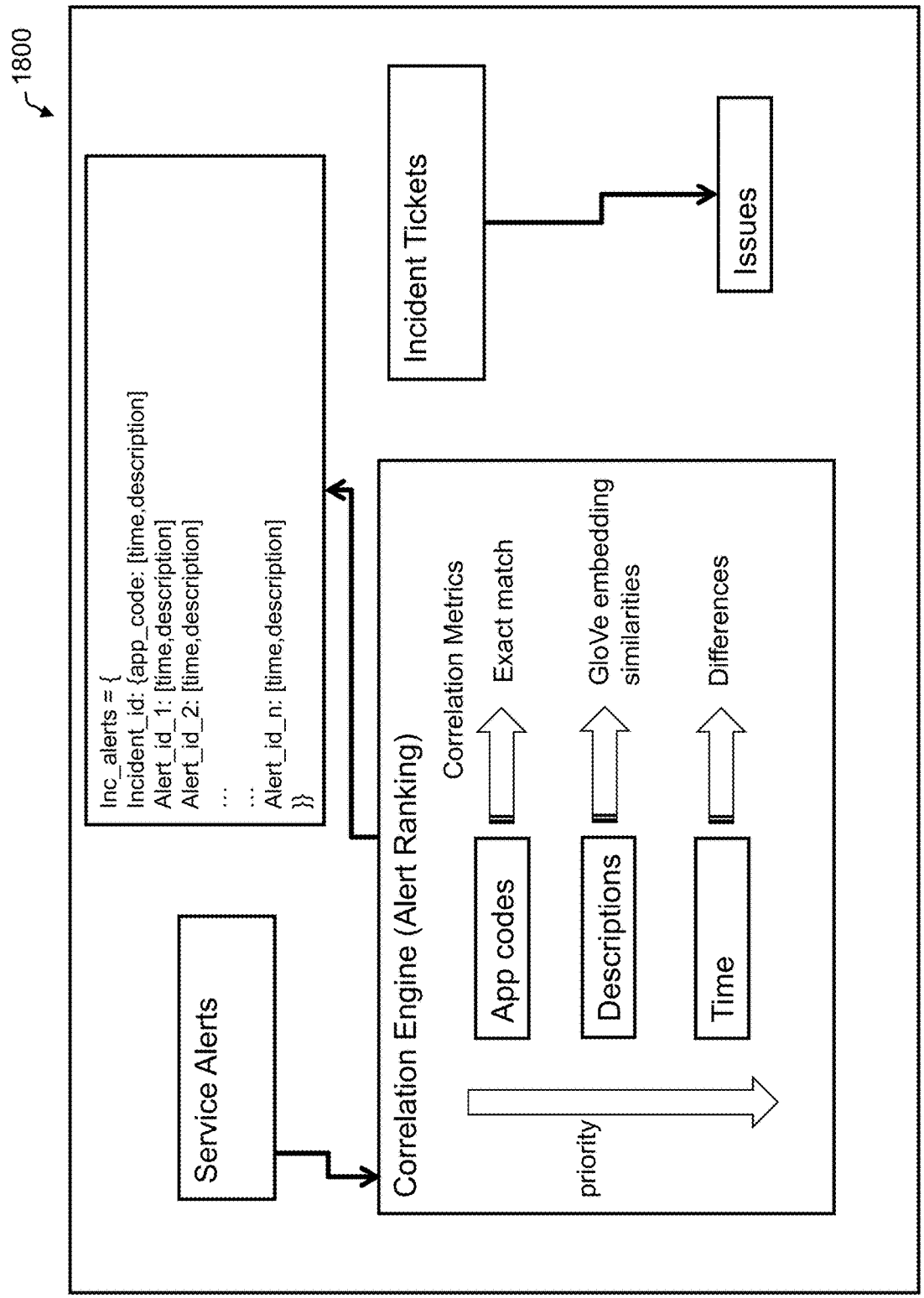
FIG. 18 is a schematic of an exemplary correlation engine simultaneously evaluating multiple identifiers.

FIG. 18 is a schematic 1800 of an exemplary correlation engine simultaneously evaluating multiple identifiers.

Figure 19:
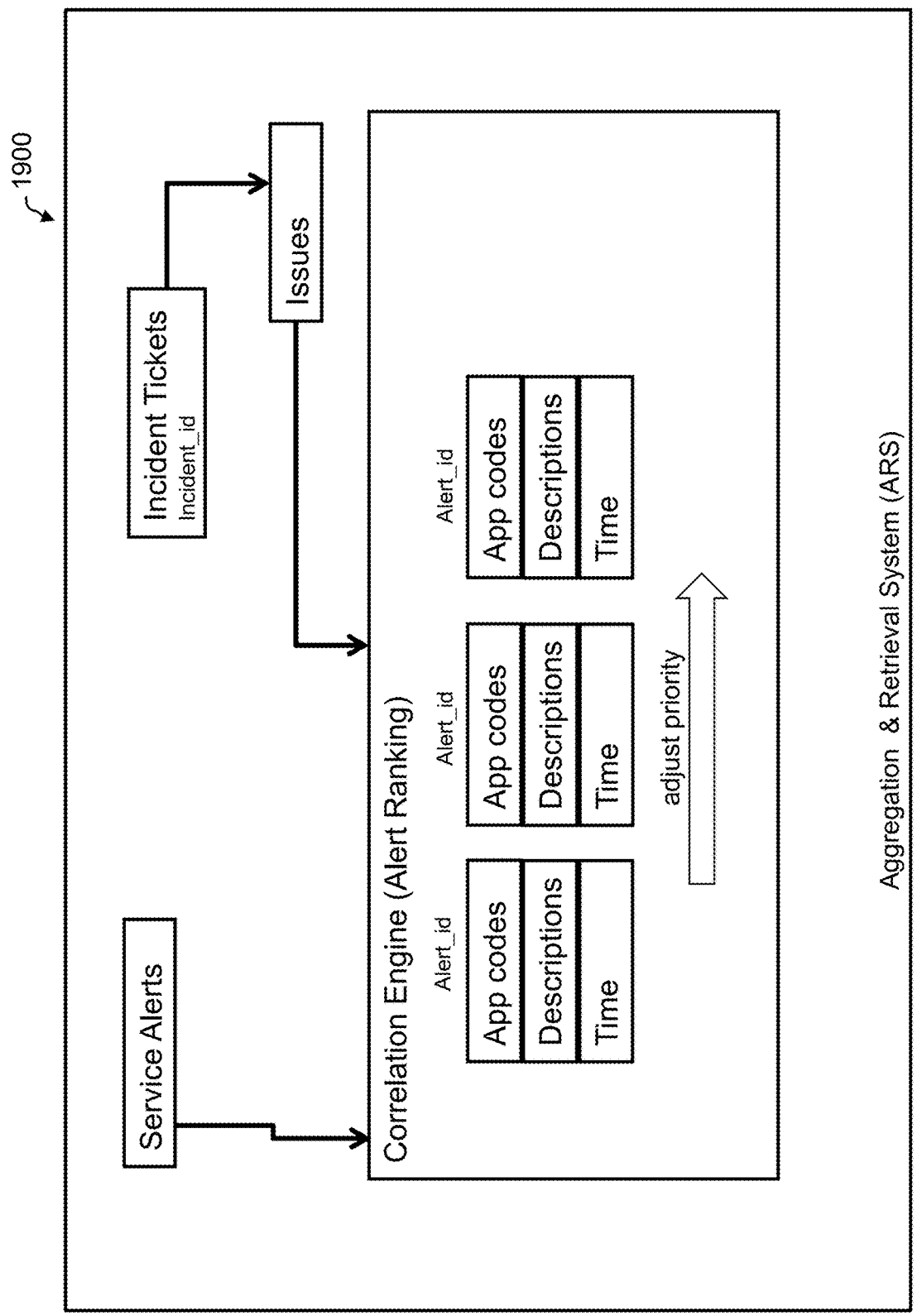
FIG. 19 is a schematic of an exemplary correlation engine that incorporates feedback from the user.

FIG. 19 is a schematic 1900 of an exemplary correlation engine that incorporates feedback from the user.

In reference to FIGS. 18-19, the schematics illustrates the correlation metrics in summarized terms, in accordance with an embodiment, showing the key criteria being used to determine if alerts are correlated with issues, along with the priority ranking of the alerts.

In some embodiments, the correlation engine may rank correlations. For example, correlation based on app codes may have the highest priority, followed by correlation based on descriptions, followed by correlation based on time (time-stamp). In various embodiments, the app codes may be correlated if they match exactly, the descriptions may be correlated based on GloVe embedding (cosine) similarity (being above a predefined threshold), and the time may be correlated based on differences in time (being below a predefined threshold).

As shown in FIG. 19, a feedback system of the correlation engine, in accordance with an embodiment, provides user feedback to influence ranking of priority of the alerts. Alerts (along with their app codes, descriptions, and time) may be able to be adjusted to the correct incident and assigned the correct rankings by the user. The alerts may be ranked according to priority, with priority being adjustable based on user feedback.

Figure 20:
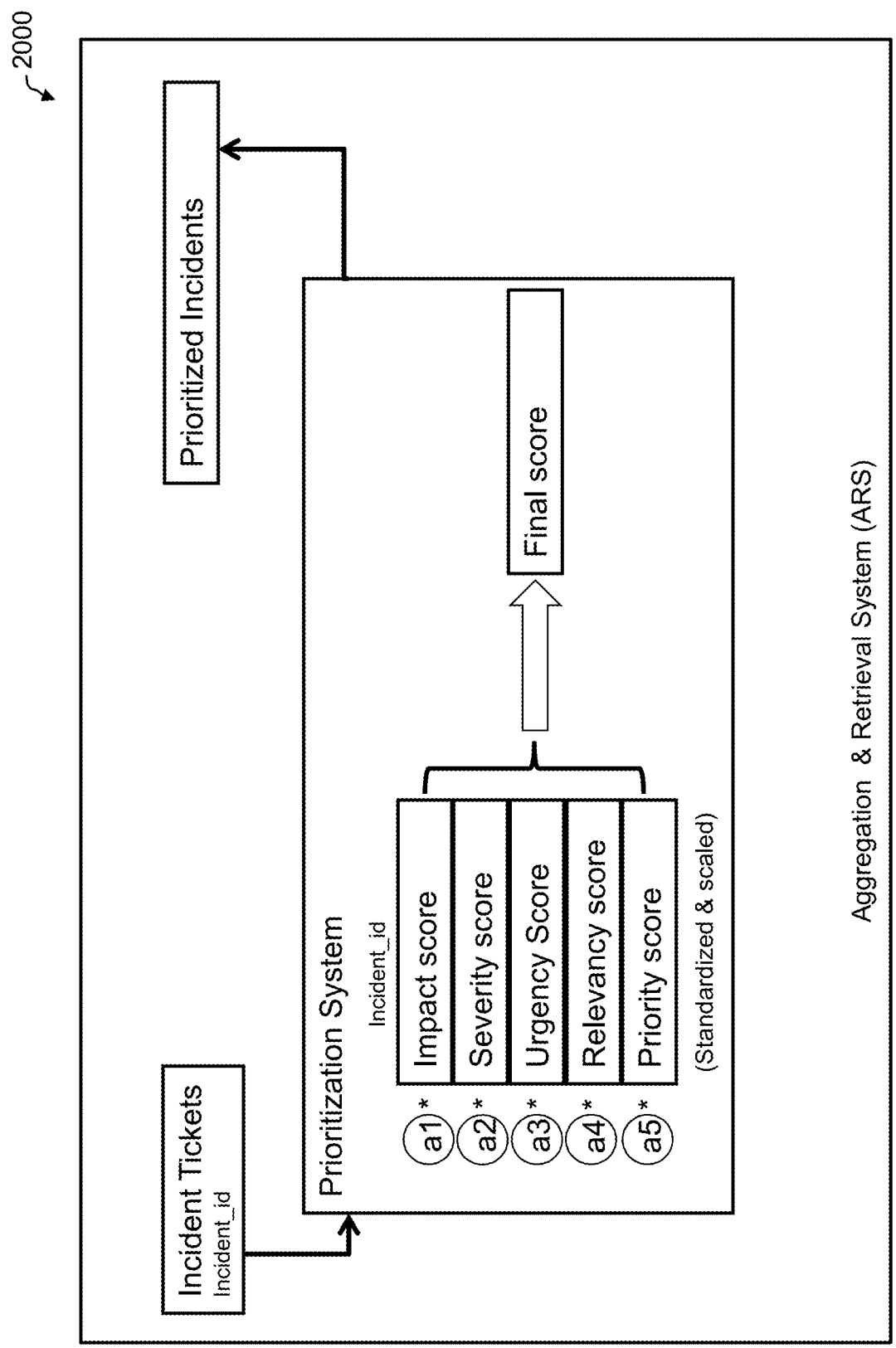
FIG. 20 is a schematic of an exemplary prioritization system. In some embodiments of the prioritization system, the coefficients are manually adjusted by an end user.

FIG. 20 is a schematic 2000 of an exemplary prioritization system. In some embodiments of the prioritization system, the coefficients are manually adjusted by an end user. In some embodiments, final score for prioritization may be calculated based on impact, severity, urgency, relevancy, and priority scores. Urgency score and priority score are computed based on the average of categories and levels of the input "priorityLevels" and "urgency" data (ranging 1-3 and 1-4). The other scores are computed and tuned based on calibration. At the end, all 5 scores are being averaged to compute the final score, and final score is used to prioritize incidents are the default metric. An exemplary prioritization method is described below.

$$\text{Final\_score} = a1*(\text{impact\_score}) + a2*\text{severity\_score} + a3*\text{urgency\_score} + a4*\text{relevancy\_score} + a5*\text{priority\_score, where } a1=a2=a3=a4=a5=0.2 \text{ by default}$$

where $a1=a2=a3=a4=a5=0.2$ by default $$\text{impact\_score} = (\text{standardized } MTTR \text{ score}*\text{standardized incident counts})*100$$

Sk-learn library may be used to normalize MTTR and incident counts.

If the app is labeled advisor-facing by BEAST, the impact score may be multiplied by 1.5.

$$\text{severity\_score} = (\text{Total number of Escalations/Number of Incidents})*50$$

$$\text{average urgency score} = \text{Total urgency score/Number of Incidents}$$

$$\text{urgency\_score} = (5-\text{average urgency score})*10$$

$$\text{relevancy\_score} = (50-\text{BEAST rank})*2$$

BEAST rank may be received from the ranking of apps from BEAST.

$$\text{average priority score} = \text{Total priority score/Number of Incidents}$$

$$\text{priority\_score} = (5-\text{average priority score})*10$$

In various embodiments, a certain level of scaling may be involved in the computation of Final_score, for all the metric scores to be scaled in the range of 0-100.

Figure 21:
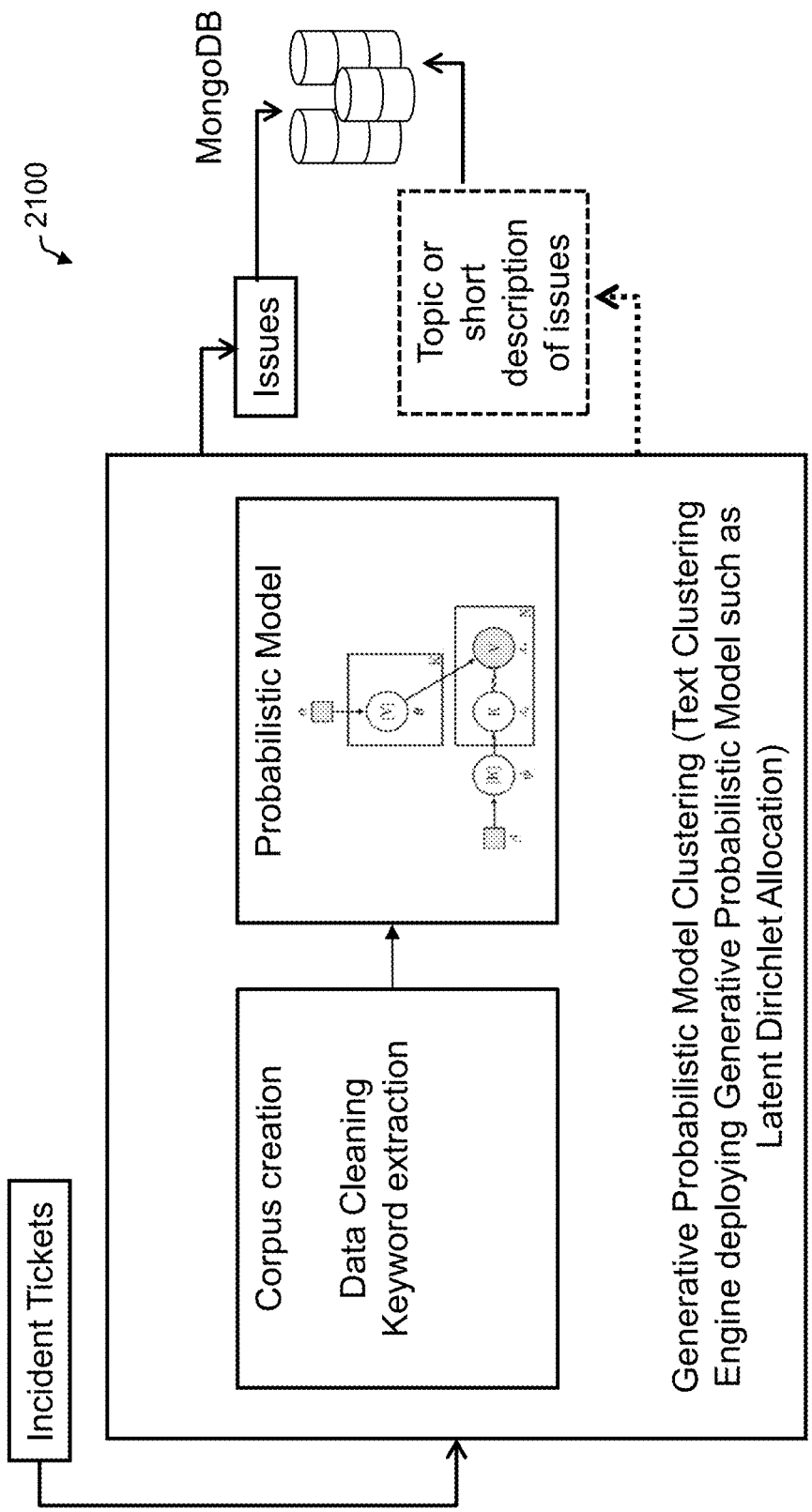
FIG. 21 is a schematic of an exemplary probabilistic generative model clustering engine using Latent Dirichlet Allocation (LDA) based probabilistic generative model clustering engine.

FIG. 21 is a schematic 2100 of an exemplary probabilistic generative model clustering engine using Latent Dirichlet Allocation (LDA) based probabilistic generative model clustering engine.

The schematic shows the clustering engine and may have 2 components:
 1—Natural Language Processing component to clean data
 2—Probabilistic generative module to cluster the cleaned data encoded using Bag of Words (BoW).

The text clustering engine may be used to cluster the collection of incident tickets using a or the generative probabilistic model. The corpus generator may be used to generate a corpus for the text clustering engine using one or more ticket identifiers. In some embodiments, the corpus is pruned to remove one or more proper nouns associated with technology infrastructure.

In some cases, the generative probabilistic model clustering engine (e.g., the text clustering engine part or another part) may be used to generate a collection of topics by clustering the incident tickets. Each of such a generated topic may be associated with a particular issue. The topic associated with a specific issue may be part of the category that is sent or indicated to the remote client.

Latent Dirichlet allocation (LDA) is a natural language processing (NLP) tool that uses a generative statistical model allowing sets of observations to be explained by unobserved groups that explain why some parts of the data are similar. For example, if observations are words collected into documents, LDA posits that each document is a mixture of a small number of topics and that each word's presence is attributable to one of the document's topics. LDA is an example of a topic modelling tool. Other topic modelling tools may be used also.

Figure 22:
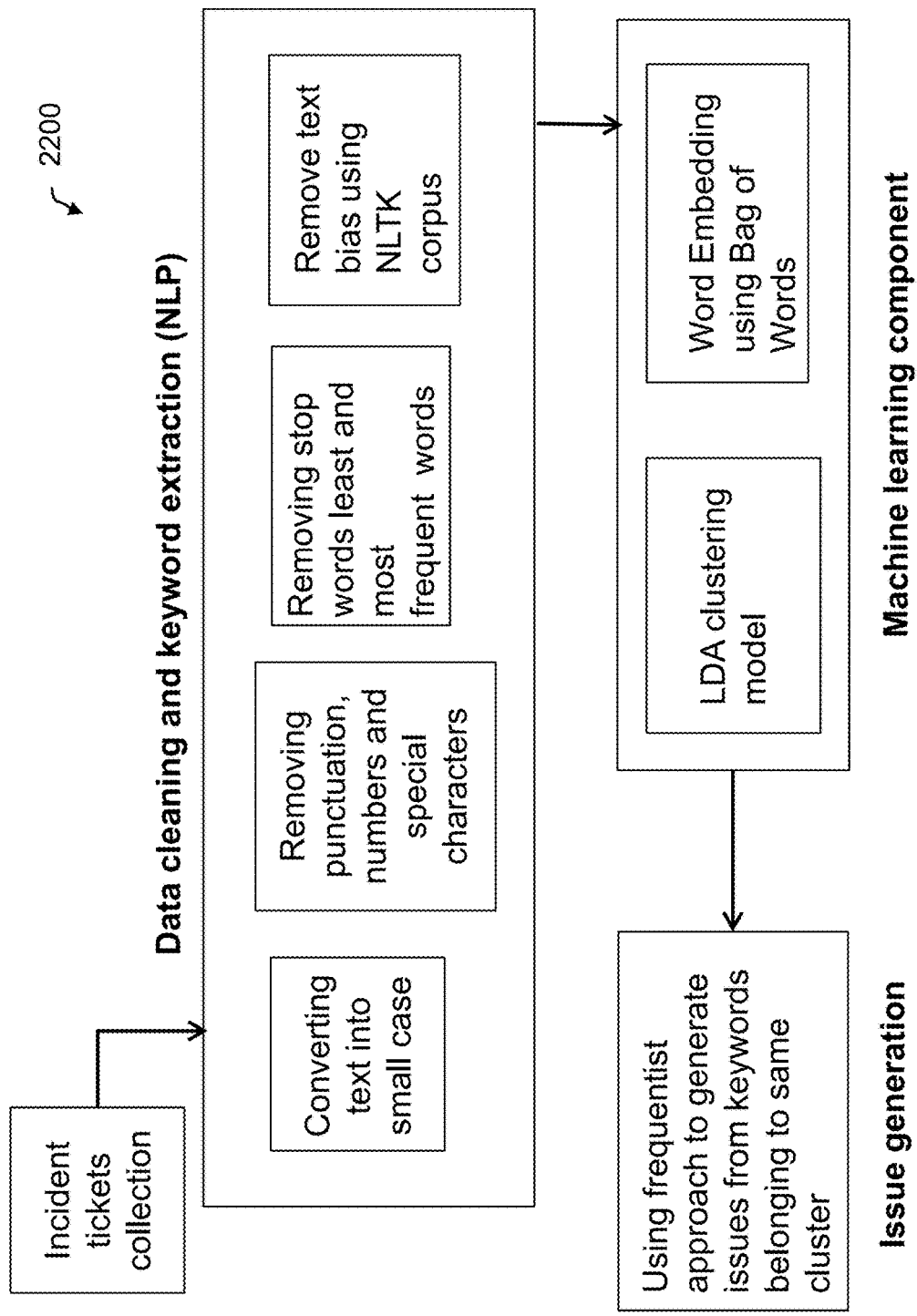
FIG. 22 is a schematic of an exemplary text clustering engine and a natural-language processing corpus generator.

FIG. 22 is a schematic 2200 of an exemplary text clustering engine and a natural-language processing corpus generator. These may be part of the generative probabilistic model clustering engine.

The text clustering engine may be used to cluster the collection of incident tickets using a generative probabilistic model.

Corpus generator may be used to generate a corpus for the text clustering engine using one or more ticket identifiers.

In some embodiments, the corpus is pruned (text bias) to remove one or more proper nouns associated with technology infrastructure, e.g., using a natural language tool kit (NLTK).

In some cases, the generative probabilistic model clustering engine (e.g., the text clustering engine part or another part) may be used to generate a collection of topics by clustering the incident tickets. Each of such a generated topic may be associated with a particular issue. The topic associated with a specific issue may be part of the category that is sent or indicated to the remote client.

Figure 23:
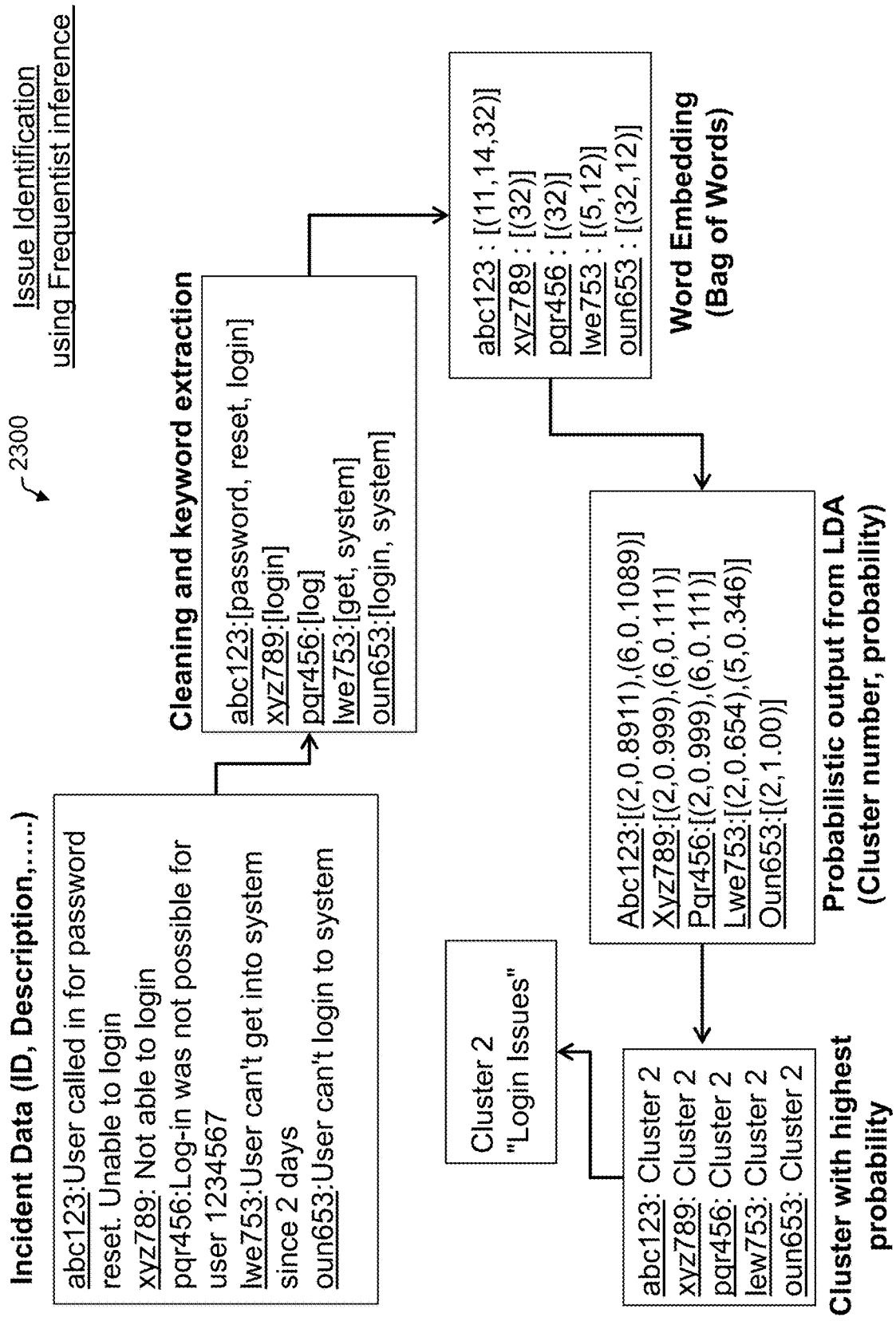
FIG. 23 is illustration of an exemplary text clustering engine using real-time incident data.

FIG. 23 is illustration 2300 of an exemplary text clustering engine using real-time incident data. Examples of real-time incident data and the process of clustering with probability scores are shown.

Figure 24:
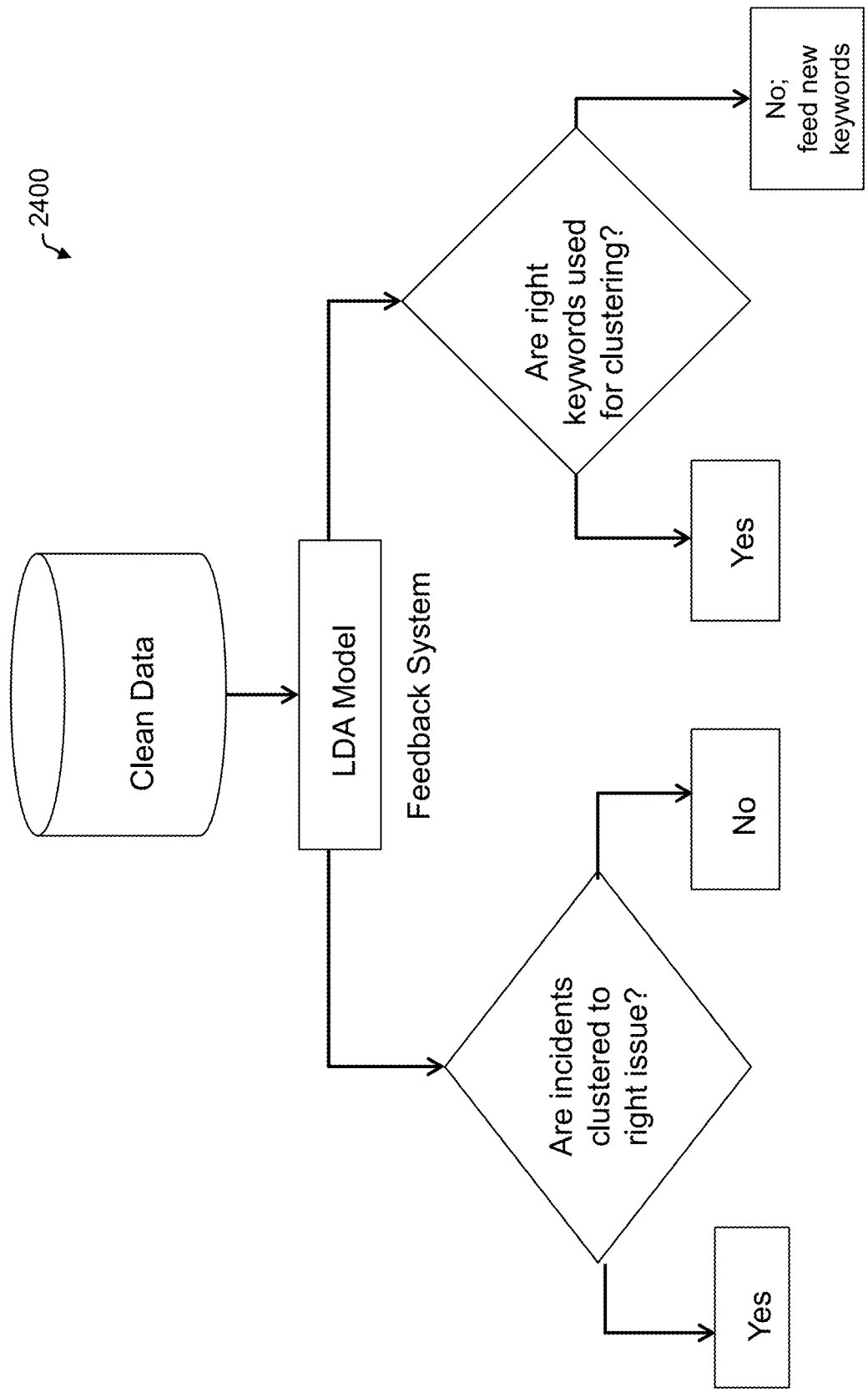
FIG. 24 is a schematic of an exemplary clustering engine that incorporates additional user feedback.

FIG. 24 is a schematic 2400 of an exemplary clustering engine that incorporates additional user feedback.

In various embodiments, a feedback mechanism may tune the performance of the machine learning model. For example, a client may feed the keywords if right keywords are not used for topic identification, or a client may feed the system if the incident tickets are clustered to the right topic or not.

FIG. 25 is a diagram 2500 that illustrates information representative of incident tickets, service alerts, and incident tickets correlated with alerts in accordance with an embodiment.

FIGS. 26-31 show embodiments of a graphical user interface (GUI).

Figure 26:
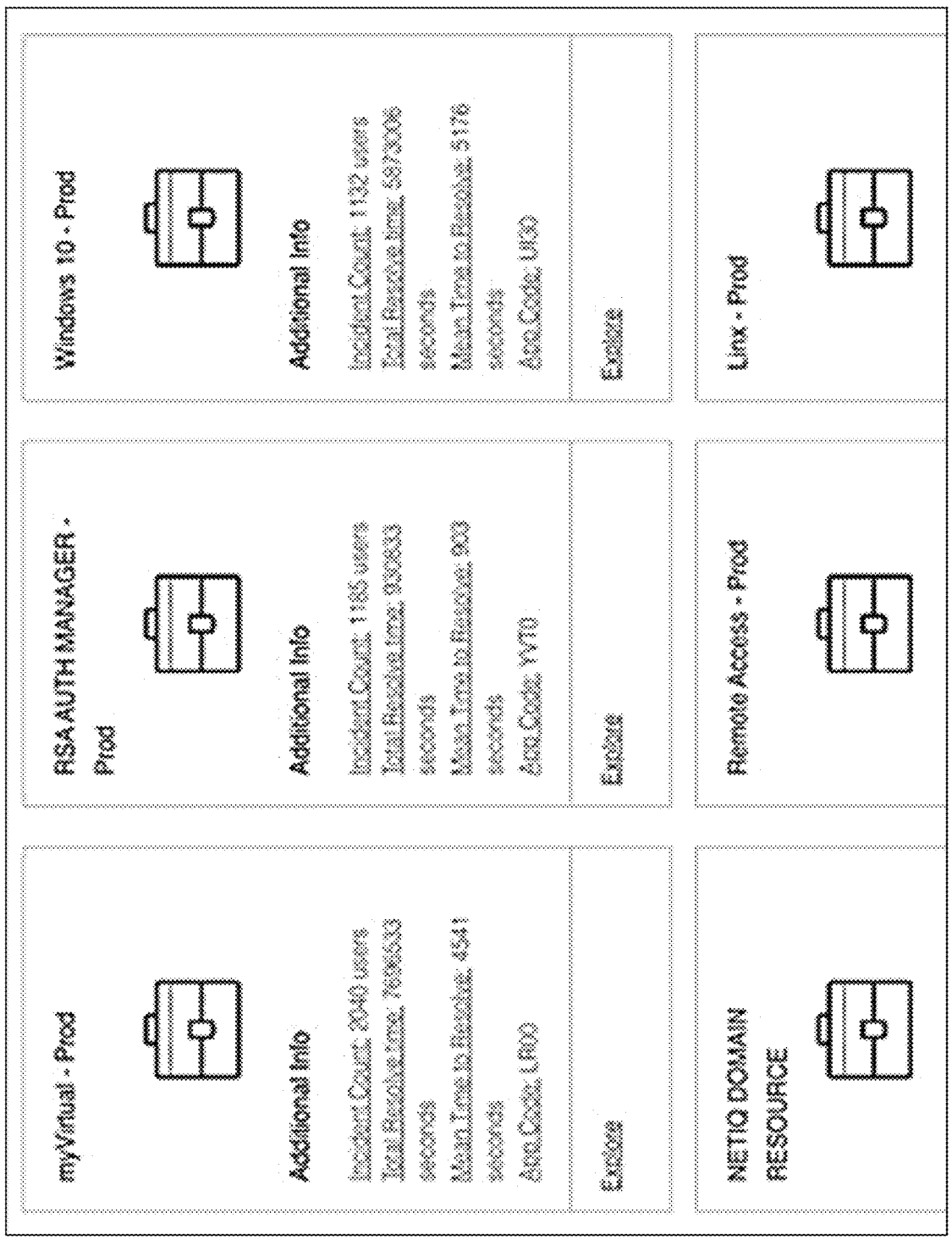
FIG. 26 shows exemplary tiles describing technologies of the technology infrastructure having associated incidents, sorted by incident count.

FIG. 26 shows an automatically generated list 2600 of issues displayed to a user. These issues may be shown at the start page of a GUI. FIG. 26 shows exemplary tiles describing technologies of the technology infrastructure having associated incidents, sorted by incident count. In other embodiments, the exemplary tiles may be sorted by priority score. Each tile may contain weekly aggregated information such as incident count, mean time to resolve and total resolve time.

Figure 27:
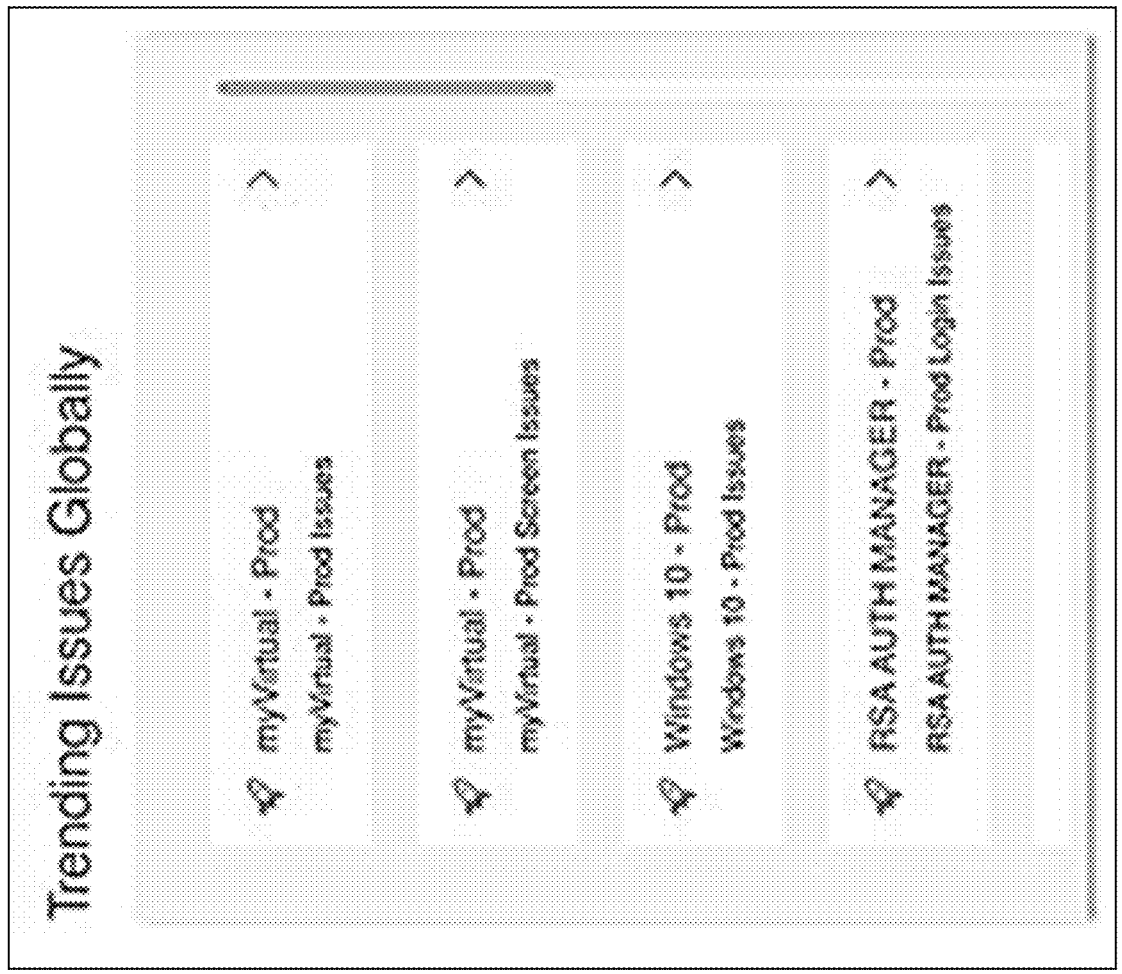
FIG. 27 shows a list of trending issues, which may also appear on the start page of the GUI.

FIG. 27 shows a list of trending issues 2700, which may also appear on the start page of the GUI. In some embodiments, users may view top trending issues that are also currently being sorted by top incident count for the week. In another embodiment, this may be sorted according to the growth of the issue on a weekly basis.

Figure 28:
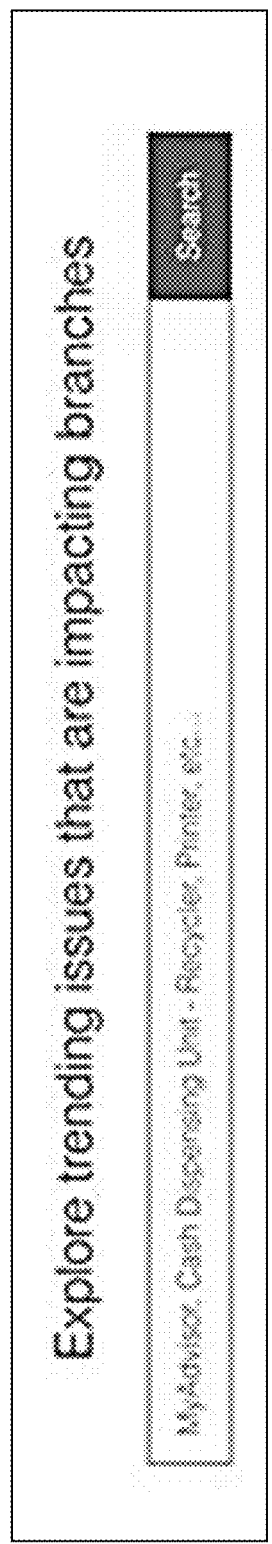
FIG. 28 shows a search bar interface for searching for issues using the GUI.

FIG. 28 shows a search bar interface 2800 for searching for issues using the GUI. In some embodiments, the search bar may be provided in case a user does not issues on the start screen.

Figure 29:
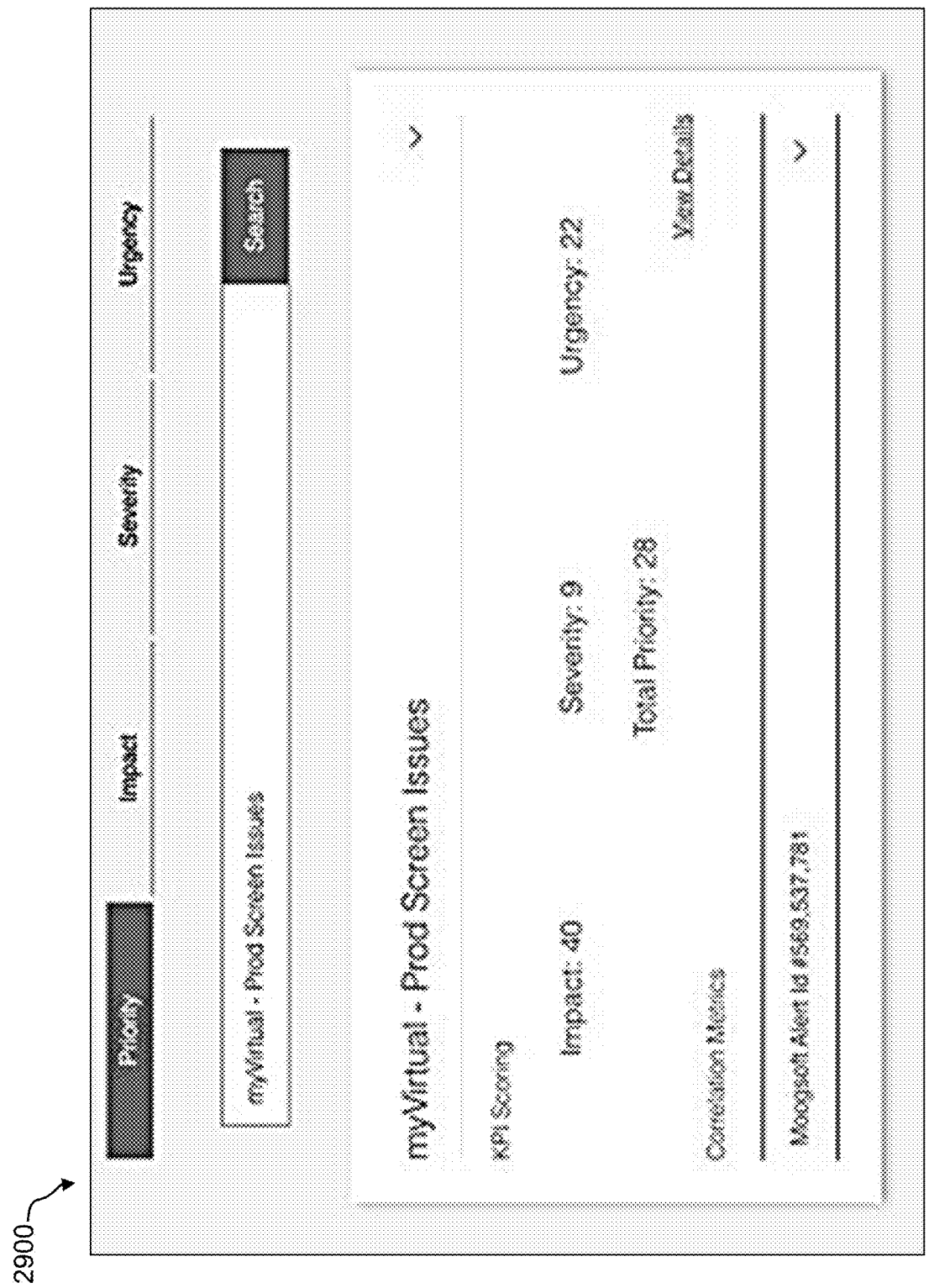
FIG. 29 shows a selected issue window, showing the issue and all its associated details.

FIG. 29 shows a selected issue window 2900, showing the issue and all its associated details. The selected issue window shows exemplary scoped issues that allow the user to sort issues according to calculated key performance indicator (KPI) metrics: impact, severity and urgency. Upon expanding on an issue, a user may view the correlated alerts as well as the KPI scoring for the specific issue.

Figure 30:
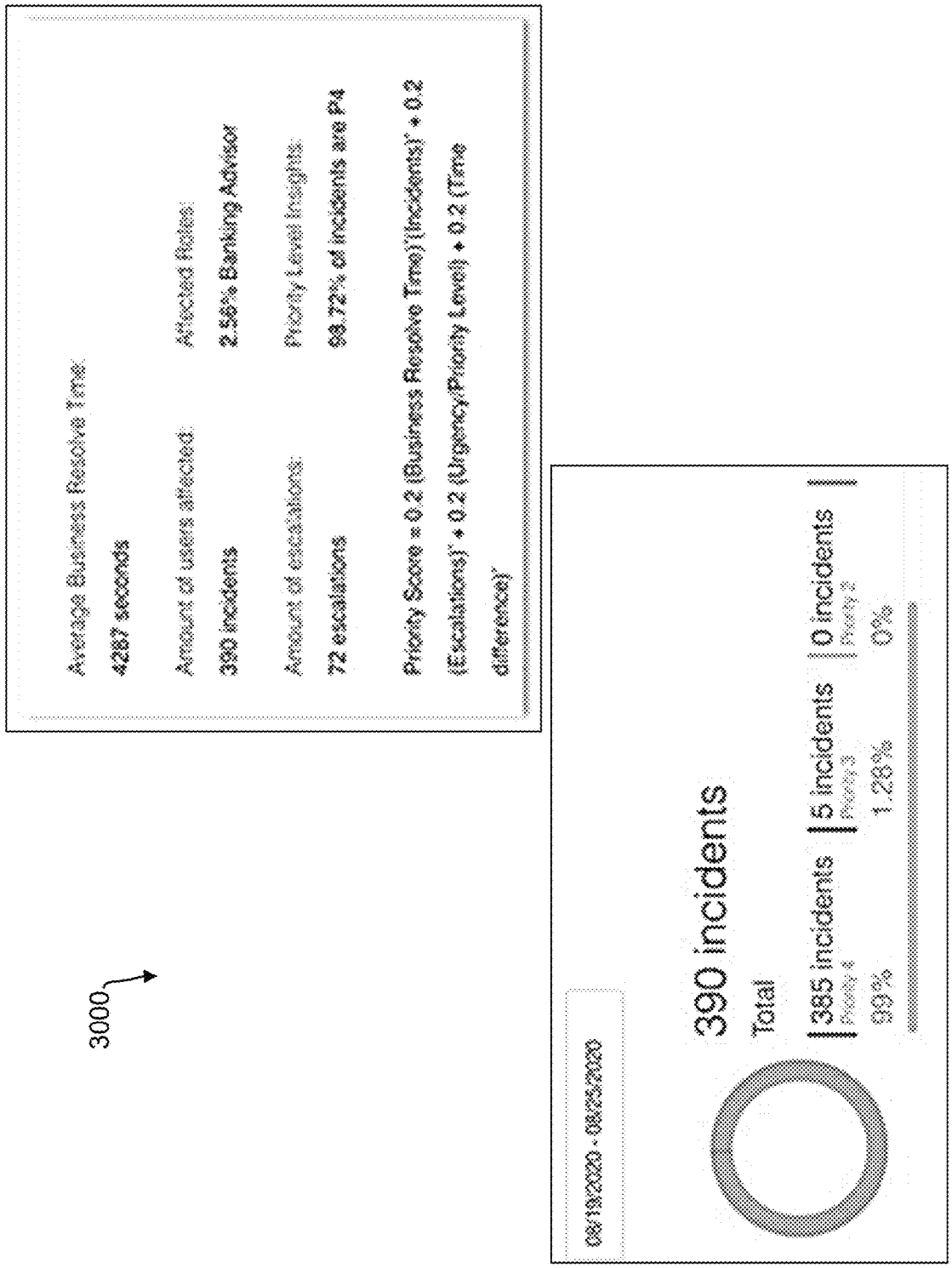
FIG. 30 shows a system level view of issues and incidents provided to a user of the GUI.

FIG. 30 shows a system level view 3000 of issues and incidents provided to a user of the GUI. This view shows aggregated metrics such as average business resolve time, number of incident escalations, affected users and priority levels.

FIG. 31 shows a GUI example 3100 of an issue and associated details. The user may also view which incidents belong to this issue category as well as how the issue has been tracked over time (incident count and mean time to resolve). As shown in FIG. 31, the incident ticket may be represented in a data set having data fields date, short description, description, cause, among others. Each of these data fields can include, for example, string data fields capable of storing character or string information that can, in some embodiments, be automatically generated (e.g., dates, times, error codes), and information that can also be human-written (e.g., description and short description).

Figure 32:
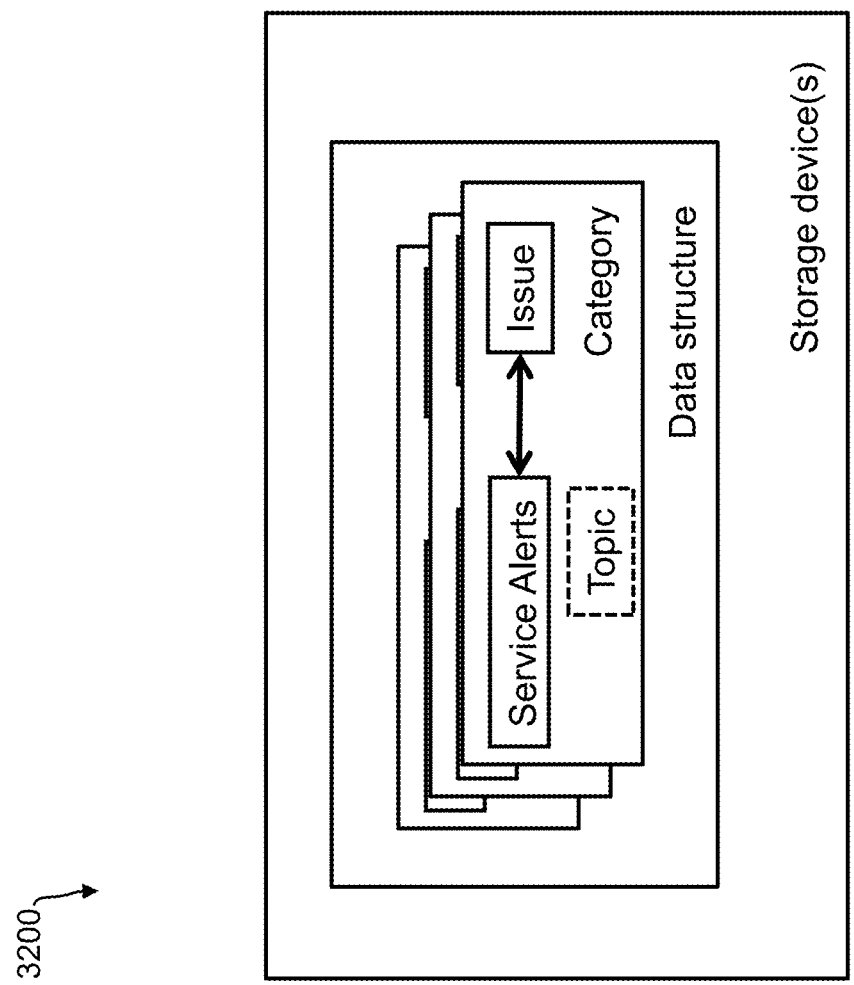
FIG. 32 schematically shows an exemplary data structure for storing issue-related information.
Figure 33:
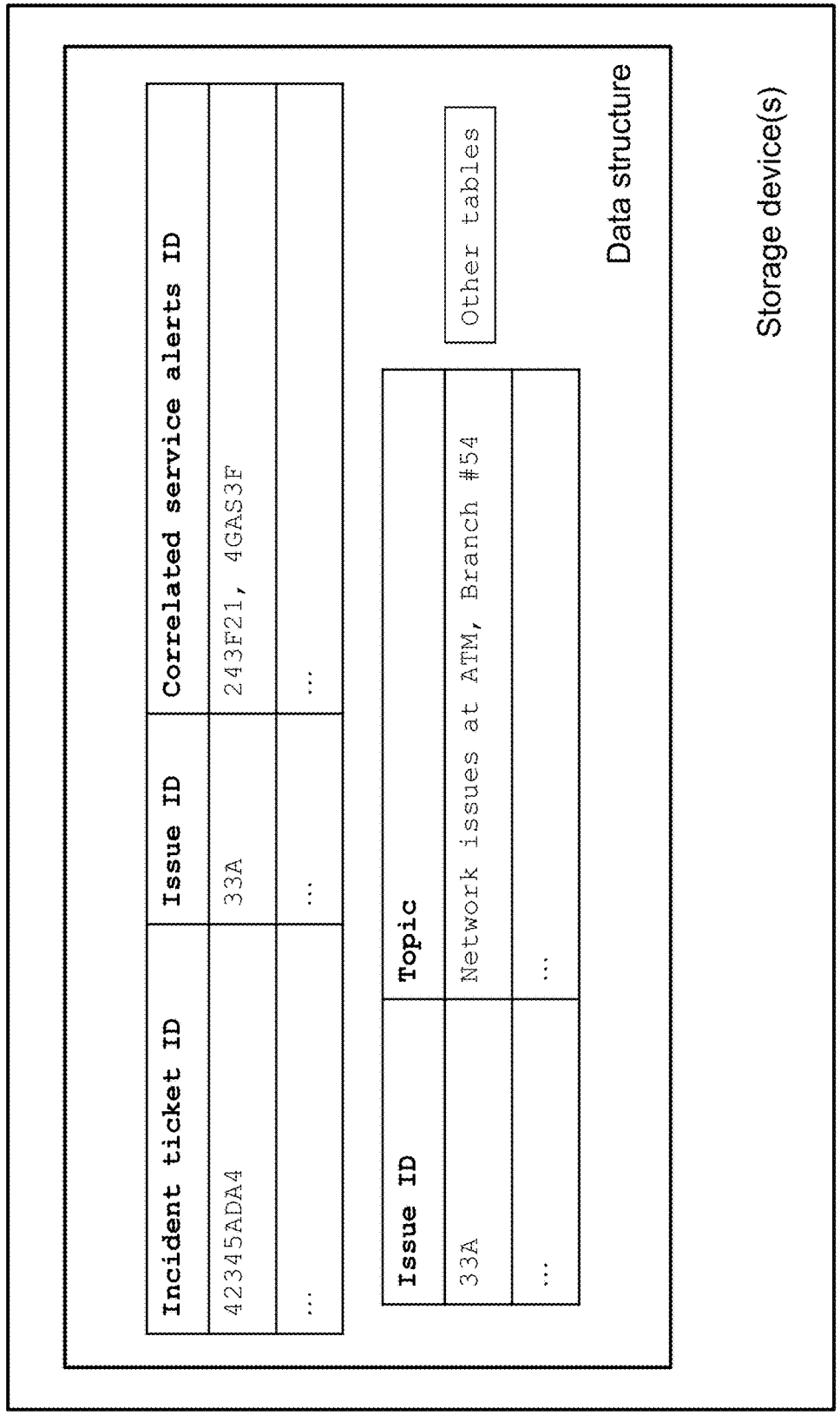
FIG. 33 is an exemplary data structure for storing issue-related information.

FIGS. 32-33 shows other embodiments of data structures stores on storage device(s).

FIG. 32 schematically shows an exemplary data structure 3200 for storing issue-related information. The data structure may include all the issues stored with associated incident tickets. The data structure may include service alerts, topics (e.g., auto-generated short descriptions) linked to issues, and correlations between incident ticket(s) and service alert(s), all stored separately.

FIG. 33 shows an exemplary data structure 3300 for storing issue-related information. For each incident ticket, a list of correlated service alerts may be provided and the ticket may be assigned an issue ID. For each issue ID, a topic may be generated describing the issue.

Figure 34:
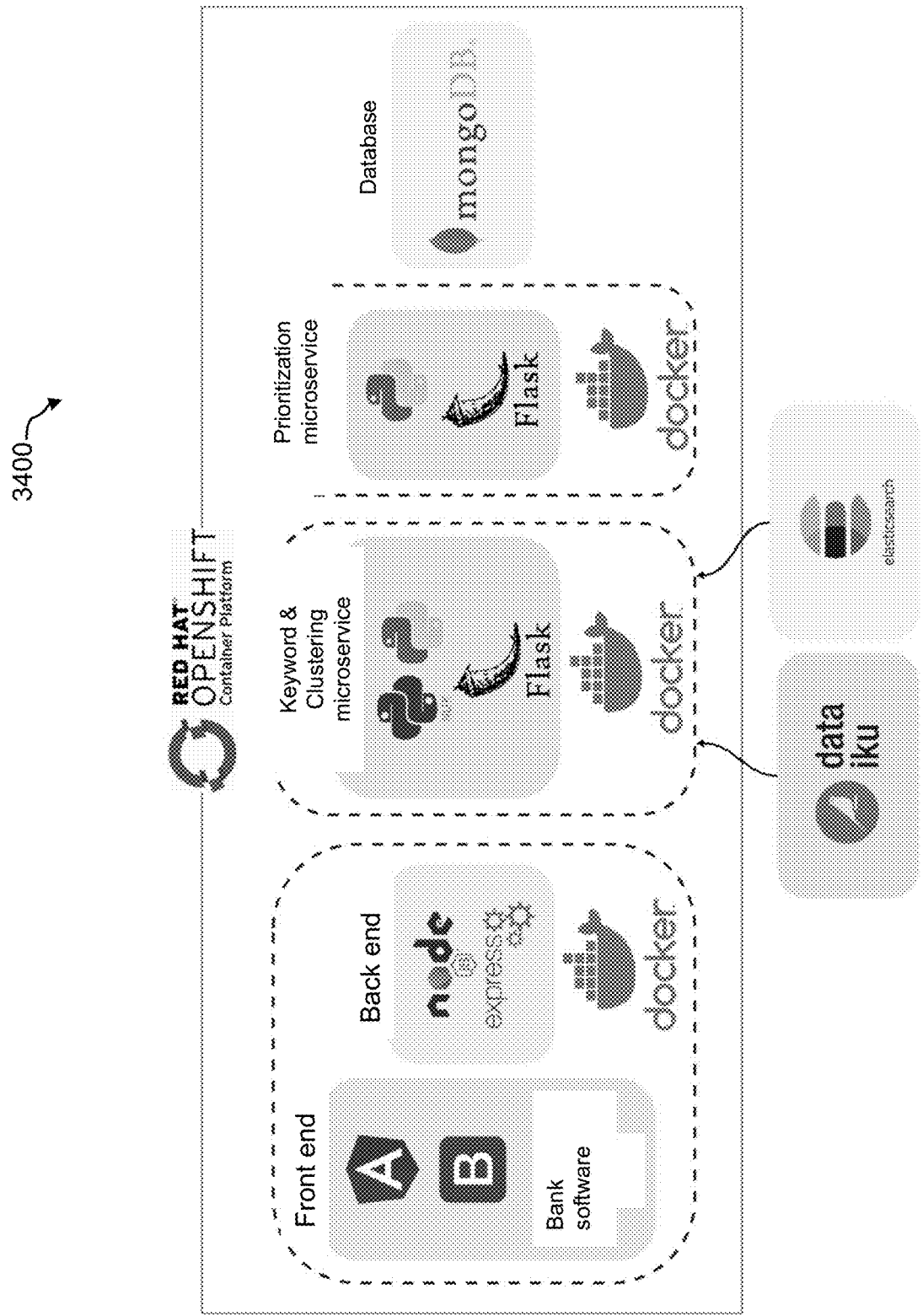
FIG. 34 is an exemplary software stack for the monitoring system.

FIG. 34 is an exemplary software stack 3400 for the monitoring system, and may be related to the layers shown in FIG. 9. In this example, a number of different services are utilized to provide the features of the automated system. In this example, a front-end set of services are utilized to generate graphical user interface renderings, and a backend set of services are utilized to persist and maintain rendering information for supporting the renderings. The keyword and clustering microservice is adapted to receive and process the input incident tickets and the generate clusters for supporting the rendering and visualizations, and in some embodiments, append metadata to incident tickets based on the clusters and sub-clusters identified, and/or attach label metadata based on the automatically generated keyword or label data. A prioritization microservice can be utilized to automatically append priority levels to specific incident tickets and/or clusters or sub-clusters for analysis.

Figure 35:
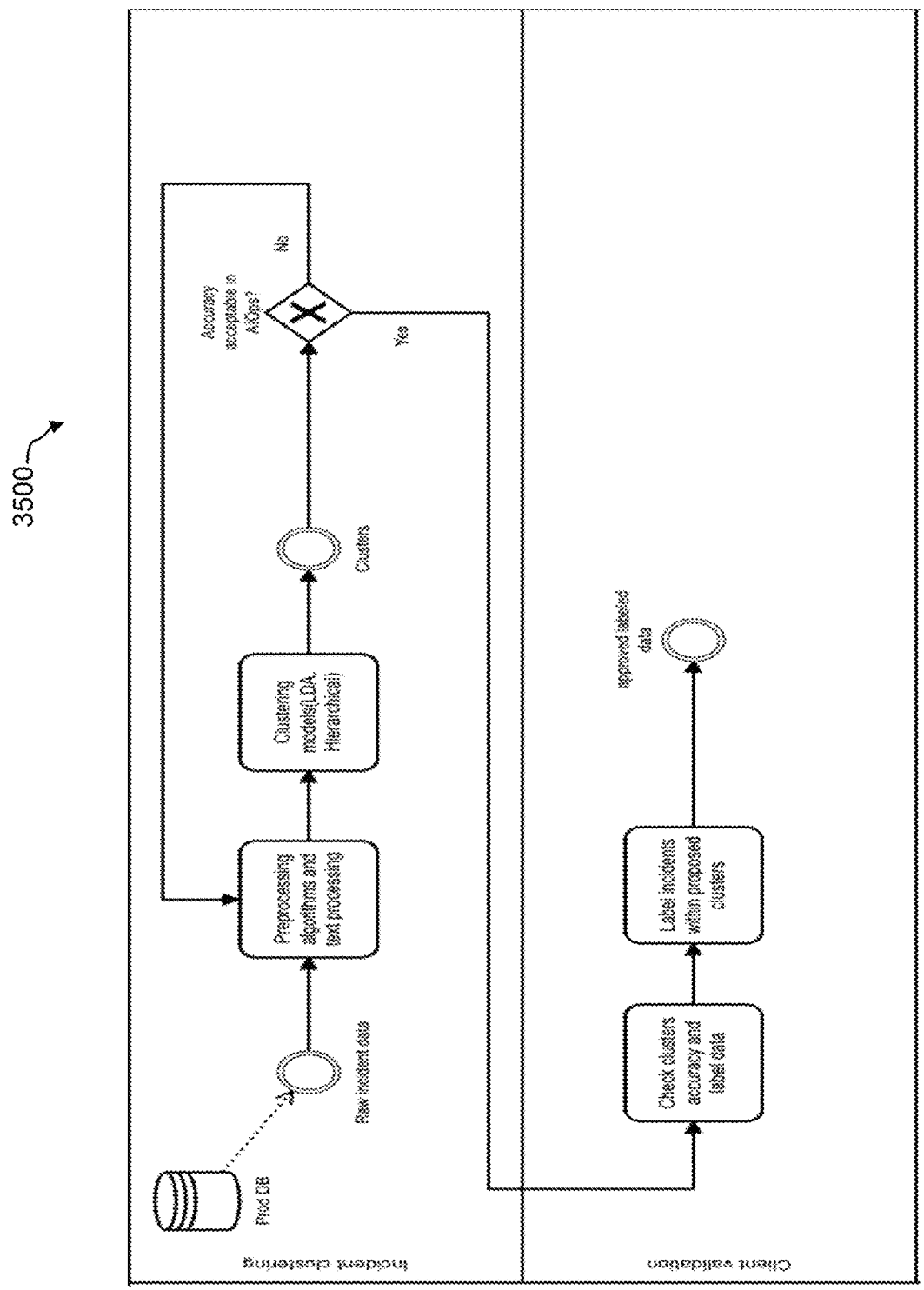
FIG. 35 is an example method diagram showing a process for conducting clustering, according to some embodiments.
Figure 36:
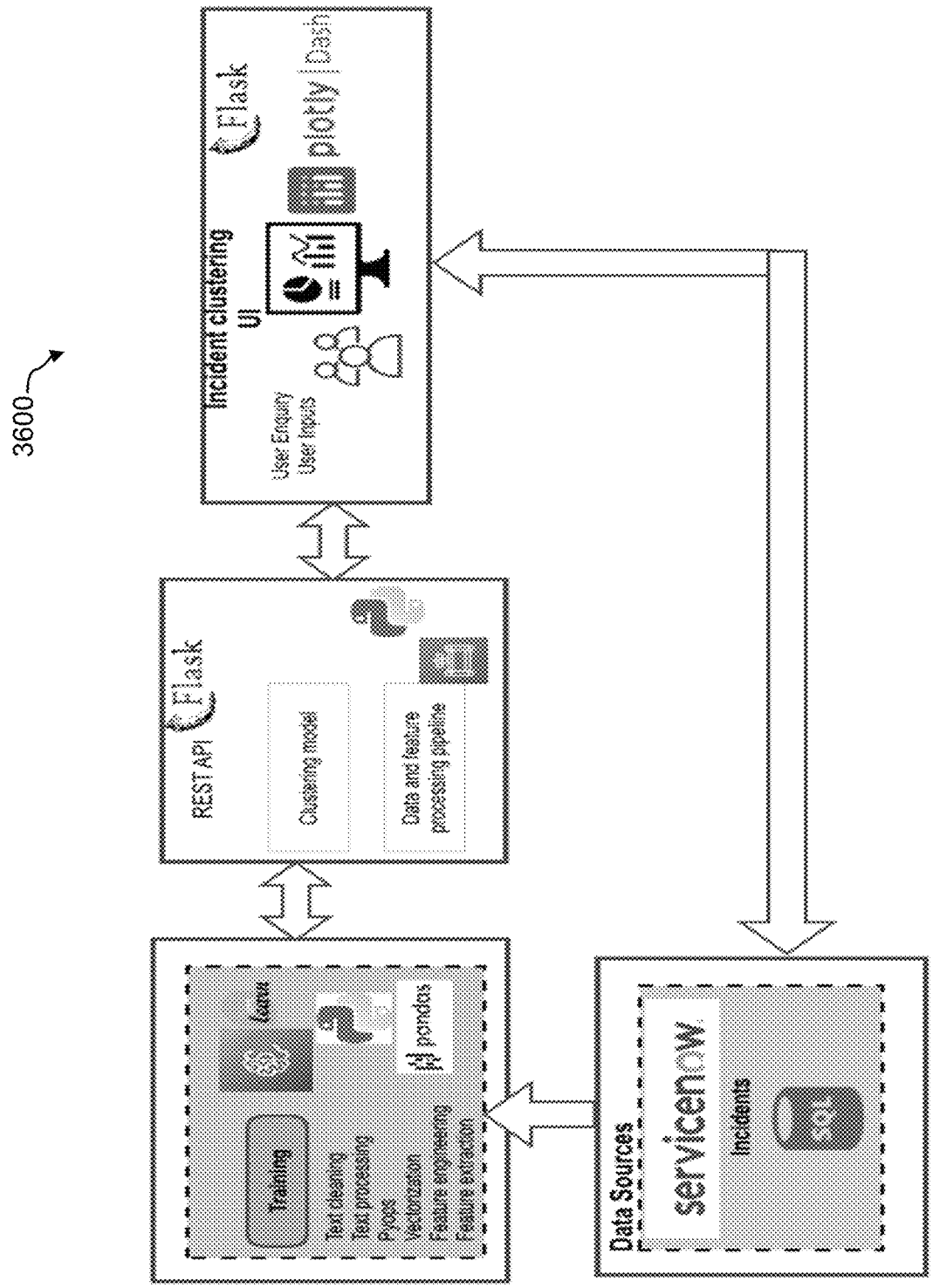
FIG. 36 shows a set of underlying software components that can be utilized for supporting the process of FIG. 35.

FIG. 35 is an example method diagram showing a process 3500 for conducting clustering, according to some embodiments. FIG. 36 shows a set of underlying software components that can be utilized for supporting the process 3500.

Based on a window of time provided by the user (for example last year), the system is configured to narrow down incidents for specific application (app code) within the provided window, and before applying any clustering, the system is configured to run text and cleaning mechanisms because the type of data usually relates to IT problems and it may need additional special text cleaning mechanisms to be utilized.

An example of running preprocessing modules on the data is described below:

Raw Data:
Checked the application \r\nError: Your account(s) were not able to be submitted because there was a technical issue that occurred. Please retry. If the problem persists, please contact DBI Help Desk at 1-800-665-2466. Error code: 500056\r\nTransaction: 78d1f3f1-9bd4-4c74-4194-0fa3d309a3c5\r\nTried clearing the cookies and cache from browser \r\nUser stated that it this specific account \r\n\r\nhence escalating\r\n\r\nContact no: *****\r\nOperating system: Citrix\r\nServer name: ***\r\nerror: Your account(s) were not able to be submitted because there was a technical issue that occurred. Please retry. If the problem persists, please contact DBI Help Desk at 1-800-665-2466. Error code: 500056\r\nscreenshot: attached After Running the Preprocessing Approaches:
check application account(s) submit technical occur retry problem persists contact dbi help desk 1-800-665-2466 code 500056 transaction 78d1f3f1-9b d4-4c74-4194-0fa3d309a3c try cleaning cookie cache browser user state specific account hence escalate ***** operating system citrix server name *** screenshot attach Mechanisms for cleaning include finding important words, remove redundant words, remove special characters, tokenization, keep information with special patterns like path, server names, etc. The cleaning process is a process that aids in the accuracy of the model and processing code can be coded in python, among other approaches.

Following cleaning, the approach includes the use of clustering. There are two clustering approaches that can be utilized, for example, where two levels of clustering are applied.

In the first level of clustering, the system is configured to process a "Short description" column/data field to obtain topics(issues) of the incidents. In the first level, the system is configured to obtain the set of entire incidents and try to cluster them to several groups with common issues.

For example, the system can receive 1000 incidents reports and cluster them to obtain 20 groups of topics(issues) from them. Grouping and labeling can be automatic to generate the clustering. The result outputs for first level are adapted to be based upon all the common issues of the application. Both number of clusters and labels are important considerations in how these outputs are generated.

Figure 37:
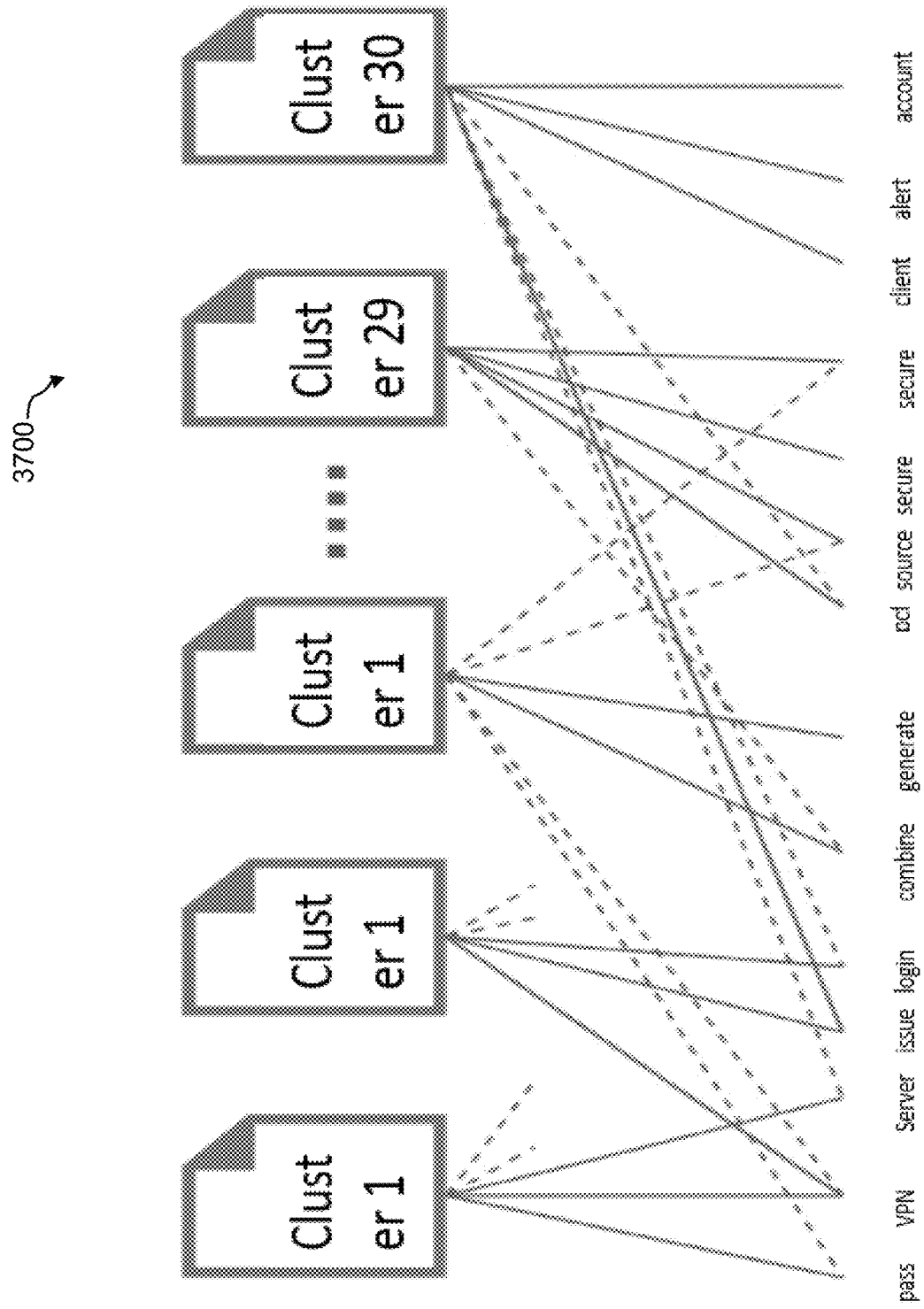
FIG. 37 shows an example LDA clustering illustration.

In a first embodiment, clustering in level 1 is done by applying a Latent Dirichlet Allocation (LDA) approach. Using LDA, the system is configured to provide the number of clusters (or topics) that are desired for the output. This information can be obtained from application owners or by performing model tuning. As using the LDA approach on cleaned data could be misleading, and in some embodiments, the approach applies LDA only on combination of the words in the context that are important. Techniques such as term frequency and document frequency can be applied on the data to obtain intermediate outputs. An example LDA clustering illustration 3700 is shown at FIG. 37.

The LDA approach allocates probability to each of the words belonging to these clusters, and also provides probability that sentences (i.e., incident short descriptions) belonging to these clusters. For example, there can be 30 clusters, and 1000 words, w1, w2, . . . , w1000, and 200 sentences, s1, s2, . . . , s200.

For each word, there will be 30 probabilities associated to them whose summation is 1. Each of these probabilities can be relating to a cluster. The approach can be adapted to indicate that a word belongs to cluster j, if the $j^{th}$ probability is the largest.

Similar approaches can be used for the sentences, that a sentence belongs to a cluster with the largest probability. That is, to cluster sentences (i.e., short descriptions), one could define that a sentence belongs to a cluster if its probability is the highest (among 30 probabilities). An example of this method can be provided below:

Sentence j belongs to cluster k iff:

$$P_{LDA}(S_j \text{ in } C_k) = \max(P_{LDA}(S_j \text{ in } C_1), P_{LDA}(S_j \text{ in } C_2), \ldots, P_{LDA}(S_j \text{ in } C_{30}))$$

For example, if there are have 200 sentences (incident short descriptions), and 30 clusters, this method looks at the probabilities that LDA method returns for each sentence. For example, say, cluster 12 has the largest probability that sentence 1 belongs to it, cluster 17 has the largest probability that sentence 2 belongs to it, and so forth.

| sentences | Cluster1 | Cluster2 | Cluster30 | Max probability | Sentence belongs to cluster? |
|---|---|---|---|---|---|
| s1 | $p1_{s1}$ | $p2_{s1}$ | $p30_{s1}$ | $p12_{s1}$ | 12 |
| S2 | $p1_{s2}$ | $p2_{s2}$ | $p30_{s2}$ | $p17_{s2}$ | 17 |
| S200 | $p1_{s200}$ | $p2_{s200}$ | $p30_{s200}$ | $p21_{s200}$ | 21 |

However, in an embodiment, the latter probabilities were ignored as they do not give satisfactory results; that is, sometime unrelated sentences end of being in the same cluster.

Rather, in a practical application of the system, the approach has used the first set of probabilities, and an alternate method (method 2) is proposed.

In this approach, the clustering approach adds the probability scores of the words within each sentence; and defines that a sentence will belong to a cluster with largest sum-probabilities. This type of cluster-membership is an innovative approach as Applicants have not observed this method being used in other approaches. In Applicants' experimental approaches, the cluster-membership has exhibited better results.

In this example approach, sentence j belongs to cluster k iff:

$$A_{LDA}(S_j \text{ in } C_k) = \max(A_{LDA}(S_j \text{ in } C_1), A_{LDA}(S_j \text{ in } C_2), \ldots, A_{LDA}(S_j \text{ in } C_{30}))$$

where $$A_{LDA}(S_i \text{ in } C_m) = \Sigma_{w_l \text{in } s_i} P_{LDA}(W_l \text{ in } C_m)$$

In the above example of 30 clusters and 200 sentences, the system do not observe at the LDA probabilities associated to the sentences, but rather, the system is instead configured to utilize the probabilities associated with words. The system sums the word-probabilities of a sentence and the system is configured to indicate that sentence belongs to cluster C, if this summation is largest for this cluster.

| Sentences | Cluster1 | Cluster2 | Cluster30 | Sentence belongs to cluster? | Max probability |
|---|---|---|---|---|---|
| s1 | $A1s1 = \sum_{wj\ in\ s1} P(wj\ in\ Cls1)$ | $A2s1 = \sum_{wj\ in\ s1} P(wj\ in\ Cls2)$ | $A30s1 = \sum_{wj\ in\ s1} P(wj\ in\ Cls30)$ | 5 | $A5_{s1}$ |
| S2 | $A1s2 = \sum_{wj\ in\ s2} P(wj\ in\ Cls1)$ | $A2s2 = \sum_{wj\ in\ s2} P(wj\ in\ Cls2)$ | $A30s2 = \sum_{wj\ in\ s2} P(wj\ in\ Cls30)$ | 23 | $A23_{s2}$ |
| S200 | $A1s200 = \sum_{wj\ in\ s200} P(wj\ in\ Cls1)$ | $A2s200 = \sum_{wj\ in\ s200} P(wj\ in\ Cls2)$ | $A30s200 = \sum_{wj\ in\ s200} P(wj\ in\ Cls30)$ | 24 | $A24_{s200}$ |

In the above two methods, one can observe that sentence j can belong to different clusters based on choosing one method over the other.

Through experimental analysis and qualitative considerations, Applicants found that that method 2 above gives more accurate results; that is, similar sentences belong to the same cluster more often than in method 1. Empirical evidence suggests that the summation of word-probabilities (that can be determined for each sentence) works better in practical clustering, although it is contemplated that method 1 could work. Applicant notes that method 2 appears to work better for clustering the incidents based on the short descriptions.

The system is also configured for generation of labels (e.g., names) of each cluster automatically, and in some embodiments, the system is configured to automatically generate short textual labels that represent the incident tickets that belong to a cluster.

An example formula for labelling can include the following:

Label for Cluster C=$W_{C,(1)}$, $W_{C,(2)}$, $W_{C,(3)}$, where subscript (i) means the order statistics for cluster C $W_{C,(1)} = \mathrm{argmax}(F_{wj}, w_j \in C)$ $W_{C,(2)} = \mathrm{argmax}(F_{wj}, w_j \in C - \{W_{C,(1)}\})$ $W_{C,(3)} = \mathrm{argmax}(F_{wj}, w_j \in C - \{_{C,(1)}, W_{C,(2)}\})$ Where $F_{w_j}$ is the frequency of $w_j$. The argmax means returns the word with max frequency in the specified cluster.

Many of the short descriptions of tickets that belong to a cluster may contain same or similar words, but also may contain unique and unrepeated words.

In an embodiment, the system is configured to represent each cluster with 3 most frequent words (topic of clusters) in the cluster. The system is adapted to obtain get topic of clusters by applying weights (coherence measures from LDA) to the most common words of the cluster. This labeling aims to give an insight about the short descriptions in a cluster and does not mean that all the short descriptions in the cluster necessarily contains one or more of these words.

In some embodiments, the system is configured such that the second level of clustering uses same approach of first level for find the top 3 words and applies text processing mechanisms to remove redundant words, such that the quality of each sentence improves with meaningful words and terms.

Now that the system has several clusters and their topics (3 words for each cluster) and within each topic, there can be categorized several incidents, and a second level of clustering can be applied. For example, assume that there are 1000 incidents from the an application is working on servers.

The system can observe from the incident data sets that the top common issues in this application are VPN(1), Access(2), Authentication(3) and Out or service(4).

Now by applying a first level of clustering on all incidents (from short description column), the system now has have 500 incidents in cluster 1, 200 in cluster 2, 170 in cluster 3 and 130 in cluster 4. Each cluster (1 to 4) have their top 3 words (labels) which ideally it should be related, such as VPN, Access, Authentication and Out of service. Now the first level of clustering in done.

Assume in cluster 1 (VPN issues), there are several clusters such as VPN is down, VPN access, VPN logging. The second level of clustering is utilized to fit 500 incident of cluster 1 to these 3 VPN issues clusters.

By clicking on the first cluster (in dashboard, a user can click on each cluster's slice of a pie), the API call second level of clustering algorithm on cluster 1 which includes only 500 of 1000 incidents. So, system can be configured to only read the description field (e.g., column) this time only from 500 incidents and runs hierarchical clustering and tries to put incidents to 3 clusters this time. The result for example can be 100 incidents for cluster 1-1, 150 for cluster 1-2 and 250 for 1-3 (total 500 incidents). Each cluster here can have top 3 words as well, similar to the first level.

The second level of clustering is adapted to give more visibility to the clusters from level 1, as it is possible that some of the incidents in one cluster have the same or similar short descriptions, but they are actually different incidents that happened to have similar short descriptions. The description of incidents can differentiate between incidents with the same or similar short descriptions. Thus, a second level clustering on the description of incidents belonging to each level-1 clusters is helpful.

In level 2, the system is configured to utilize hierarchical clustering, which can give the user or a system an option to have the number of clusters changed in real or near real time (e.g., an additional degree of freedom). By providing this capability, the user has an additional capability to modify the clustering conveniently without specifically indicating what aspects should appear in a particular cluster.

Hierarchical clustering and LDA are both clustering approaches. Hierarchical clustering, in some embodiments, is used as a second level bottom-up model.

This means that hierarchical clustering starts by slotting every incident in its own cluster (if there are 1000 incidents, it starts with 1000 clusters) and decides on how to iteratively merge clusters. The function to merge clusters is working based on similarity of the clusters. So, it tries to put words (incidents) with similar content in same cluster. For example, if there are words like VPN, Password, Authentication and server, in hierarchical clustering the system will start with 4 clusters, then for next step words like Password and authentication are closer and it merges them in a cluster. (now there are have 3 clusters). Then for next step, the hierarchical clustering mechanism then has the system attempt to have 2 clusters, and it merges VPN and Server in a cluster. So, now there are have 2 clusters. Then, at the end, it will merge remaining cluster in 1 to have a cluster including all the words.

The output of hierarchical clustering is a matrix of similarities and distances of all the steps explained in the example. So, if one has 1000 samples, the approach starts from 1000 clusters and automatically tries to merge clusters recursively based on similarities.

The main reason Applicants used Hierarchical clustering was to be able to have a full understanding of clusters from bottom to up, and also to provide the user the possibility of changing the number of clusters in real time.

Similarity can be defined based on cosine similarity between sentences which are converted to vectors. Cosine similarity is defined a:

$$\text{Similarity}(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}}$$

Where A and B are vectors that are obtained from TFIDF or word embedding for each sentence.

The output from hierarchical clustering can be as below:

| children1 | children2 | distance | number of sentences in this node |
|---|---|---|---|
| 0 | 4 | 0.28466767 | 2 |
| 1 | 7 | 0.56149903 | 2 |
| 3 | 9 | 0.60900991 | 3 |
| 5 | 6 | 1.2534311 | 2 |
| 8 | 10 | 1.35558836 | 5 |
| 2 | 11 | 1.4114896 | 3 |
| 12 | 13 | 1.49320095 | 8 |

(header spans: number of sentences in)

In above matrix, each row is a cluster in a hierarchical clustering graph.

This example has only 8 sentences. For example first cluster includes sentence 0 and 4 and their distance is 0.2. so cluster 1 only have 2 sentences in it. The third row shows sentence number 3 and sentence number 9 (there is no sentence number 9. So 9 means from the first row when one combines sentence 0 and 4 in same cluster. In this example, it can be established as sentence 9. In the last cluster, there are have 8 sentences which mean there is only 1 cluster and that includes all the examples. In any number of clusters the user is interested, one can find proper threshold and find out clusters and examples within them.

All the similarity values and distances in each step are stored in the matrix. This matrix can be saved in training data. Because it includes all possible number of clusters, the matrix can be called for use by the dashboard user interface for there is a trigger indicating a changing of the number of clusters dynamically by user.

This feature is implemented in second level of clustering. As mentioned before, the second level uses "description" column/data field which likely has more noise (whereas the first level of analysis using LDA can be applied to a brief description column/data field. So, defining a fixed number of cluster (as one has in LDA) cannot give user more flexibility to change number of clusters and get the optimized results. On the contrary, in LDA algorithm, one must define the number of clusters during training the model and the result of the model cannot be changed in future by the user unless user trains a new model which need resources and the process is expensive to run.

Figure 38:
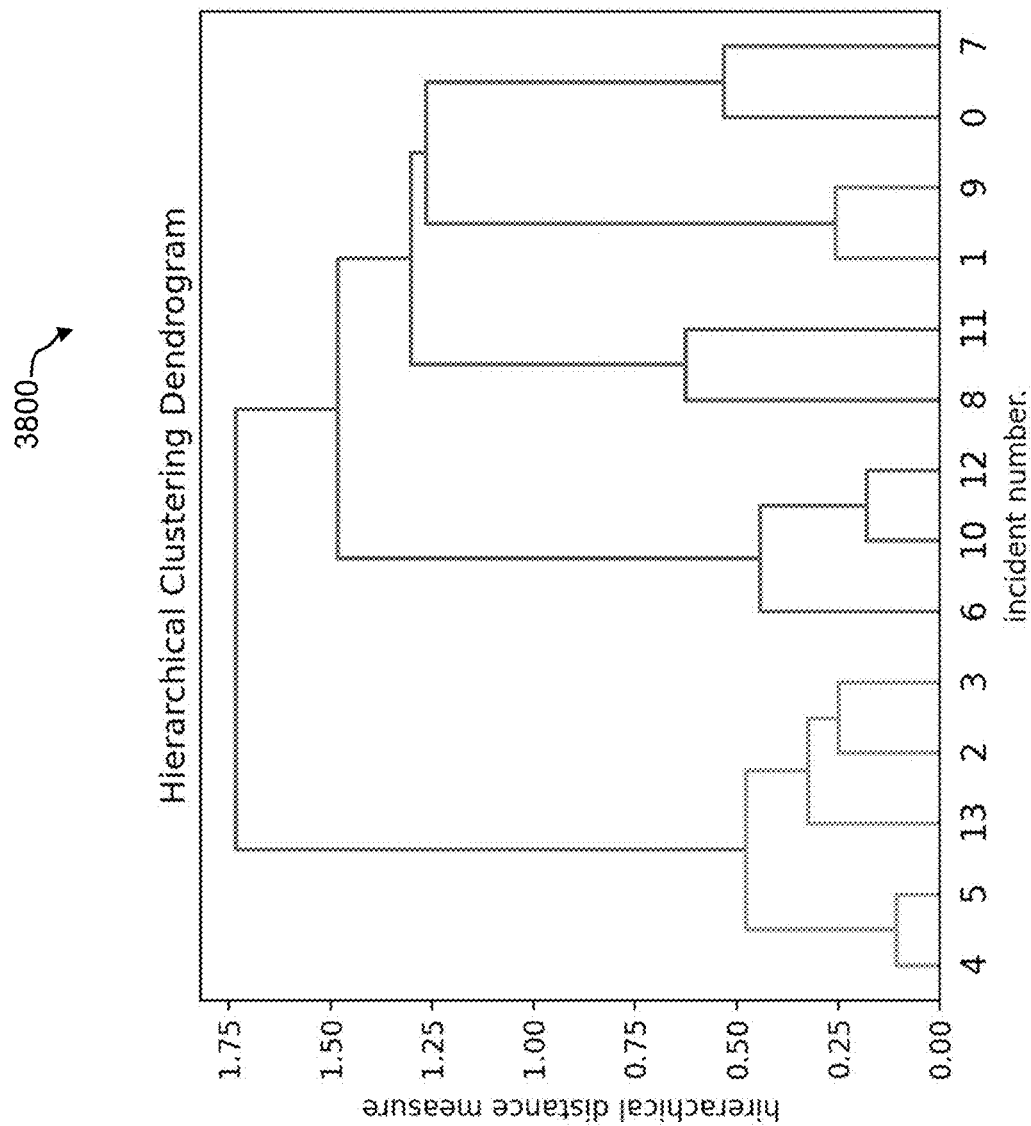
FIG. 38 is an example chart showing an example of hierarchical clustering. In this example, there are 14 incidents which the system has applied hierarchical clustering for grouping them into clusters.

FIG. 38 is an example chart 3800 of hierarchical clustering. In this example, there are 14 incidents which the system has applied hierarchical clustering for grouping them into clusters. As can be observed from this example, one can have different number of clusters if thresholds for distance are set.

Accordingly, Applicants found that the LDA algorithm would be practically difficult to implement a dynamically defined number of clusters. Rather, the user can use an input device to provide an input whereby the number of clusters is changed (e.g., by interacting using a cursor with a slider that can receive a drag and release input).

As the number of clusters changes, (e.g., from 3, 5, 10), the system automatically regenerates the second level of clusters as the incidents in a level-1 cluster (with similar short descriptions) could be actually 3 or 5 or 10 (or even more) different types of incidents that happened to have similar short descriptions. Accordingly, the user can determine the number of level-2 clusters for each level-1 clusters (such as, but not limited to, a number between 3 to 10). The output of the model overall are some labels for each individual incident to specify their first and second group name and also their topic (3 words).

After the output of the machine learning models is generated in respect of a multi-level clustering approach (e.g., two levels), the system can be configured to render a dashboard and associated graphical visualization whereby interactive controllable visual elements are rendered on a graphical user interface. In this example, the rendered dashboard is generated using a sectored pie graph whose sectors of a circle or ellipsoid are rendered having surface areas or angles of arc that are based at least in part by the proportion and percentages of incident tickets that have been probabilistically assigned to each cluster or sub-layer of clustering. Multiple layers can be stacked onto one another such that an outer diameter is associated with the second layer, and an inner diameter is associated with a first layer.

A stacked representation is shown in the example dashboards shown in 3900, 4000, 4100, 4200 of FIG. 39-42, where first level clustering results in sunburst view which shows each cluster and their topics in different colors and percentages.

When a user interacts with a cluster, by, for example, hovering or clicking on a cluster, the graphical user interface may be configured to visually highlight or zoom into the cluster such that on a sidebar interface, the user can be provided a rendered list of all of the incidents inside of the cluster, along with statistical information about the cluster and also second level clustering results on chosen cluster.

A user is able to provide an input, for example, through a slider or other bar or interactive visual control element, where the user has the option to change the number of clusters for second level clustering. When the user interacts with the slider or other interactive visual control element, the user is able to change the number of clusters in the second level clustering in real-time by dynamically modifying the parameters for the hierarchical clustering.

By clicking on the second level clustering result (in the new sunburst), the user is able to see new information of second level clustering.

Additional feedback approaches are possible using the dashboard, whereby the user is able to utilize textual input fields to manually enter feedback text fields that can be used for modifying or re-conducting preprocessing which is very important in the size of clusters and accuracy of the clusters. Based on the feedback provided from the user, the feedback files can be saved automatically as a JSON file, and used to retrain the model and tuning the previous model result. In some embodiments, the feedback may ultimately modify the labels being applied to the clusters by changing model weights in the model, and in other embodiments, the feedback also could modify the membership of incident tickets in clusters as the model changes the internal weighting for various words (to automatically emphasis the importance of the feedback words), and the probabilistically generated outputs may change as a result.

In the dashboard, a number (e.g., 2) of specific fields can be provided for the user to input example feedback which can be used to modify downstream text processing.

1—redundant words: Based on a particular application, there can be a lot of words that occur in normal text processing, where it can be a important word, but in content of the specific application it is not.

For example the term "BankName" in normal text processing is a noun and is important. However in this application it is not important because it doesn't contain any information about topic of incidents or actual cause of incident. In each application there are several words that are frequent, however they don't have specific meaning.

Application custodians are the ones who know these words the best. So, by providing this option, users can enter these words to have them removed to increase the system accuracy.

2—Important words: Conversely, there are several words in each application that by default and by their own, they don't have any meaning, however in application it make sense. For example "N100SR" is the name of server in the application which is very important. This input field is utilized to aid the mechanism to ensure that it doesn't remove these words. Also, because they are important, the system can assign weights to them to intentionally bias clusters toward these words. This kind of information can, for example come from application custodians as an input.

In the dashboard, users may be able to enter these words with comma separated format (e.g., CSV files). Then internally, in the dashboard, the system can be configured to transform them into a machine readable format, such as json, and they can be saved into a database with the name and access level of application custodian. The model will get trained based on new information provided and new model get replaced automatically.

Figure 39:
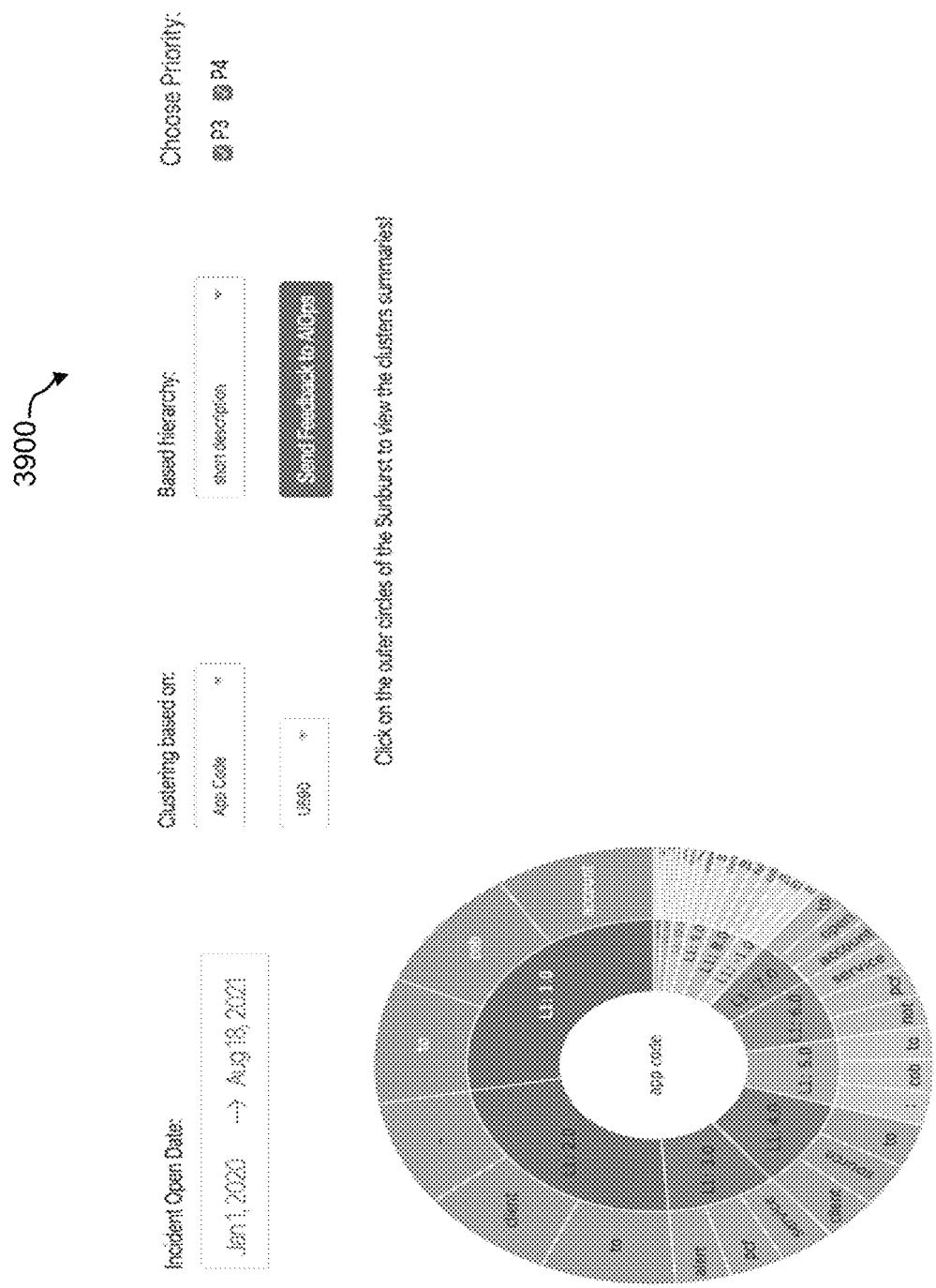
FIG. 39-42 are example screenshots of a dashboard.

FIG. 39-42 are example screenshots of a dashboard. In FIG. 39, a dashboard 3900 is shown before running any cleaning, text processing and steps explained before using pure LDA model, and it is important to note that the specific words being automatically generated as labels for the second layer of clustering are duplicative and do not appear to be particularly useful.

Figure 40:
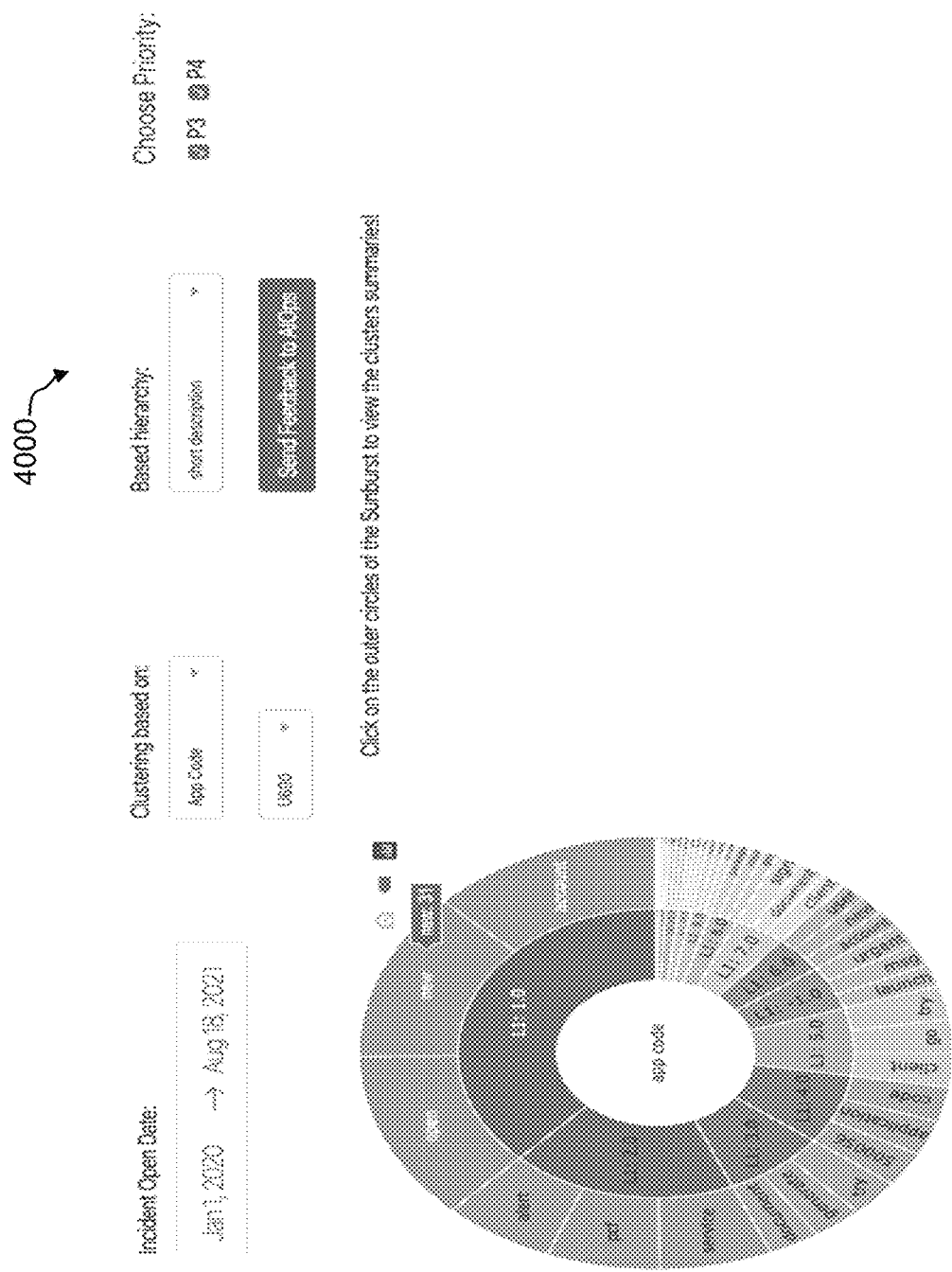

In FIG. 40, an improved dashboard 4000 is shown whereby the process is conducted after the cleaning, text processing, and one can observe that the clusters have changed and the words chosen for the automatic labels has improved. In FIG. 39, words such as PCF are duplicated, and connector words "to", "not", among others, are also inadvertently incorporated and used as labels.

Figure 41:
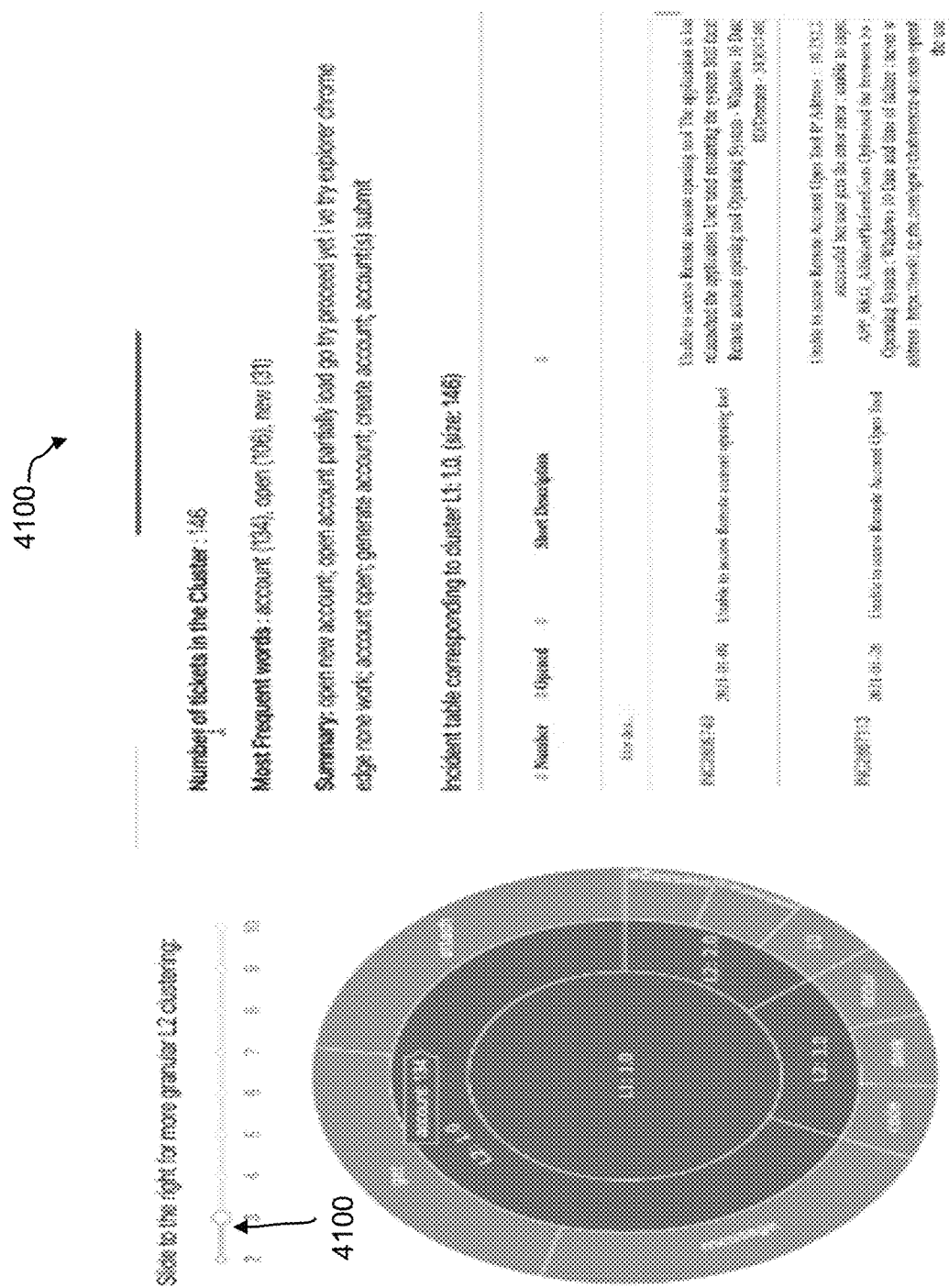

In FIG. 41, a two layer dashboard 4100 is shown whereby a slider element 4102 is provided that can be interacted with by the user to modify clustering granularity. In this example, as the slider is moved from left to right, it is able to transition between states having a granularity level of 2 to a granularity level of 10. As the granularity level increases, the numbers of layers in the second layer, represented as L2, can be increased.

Figure 42:
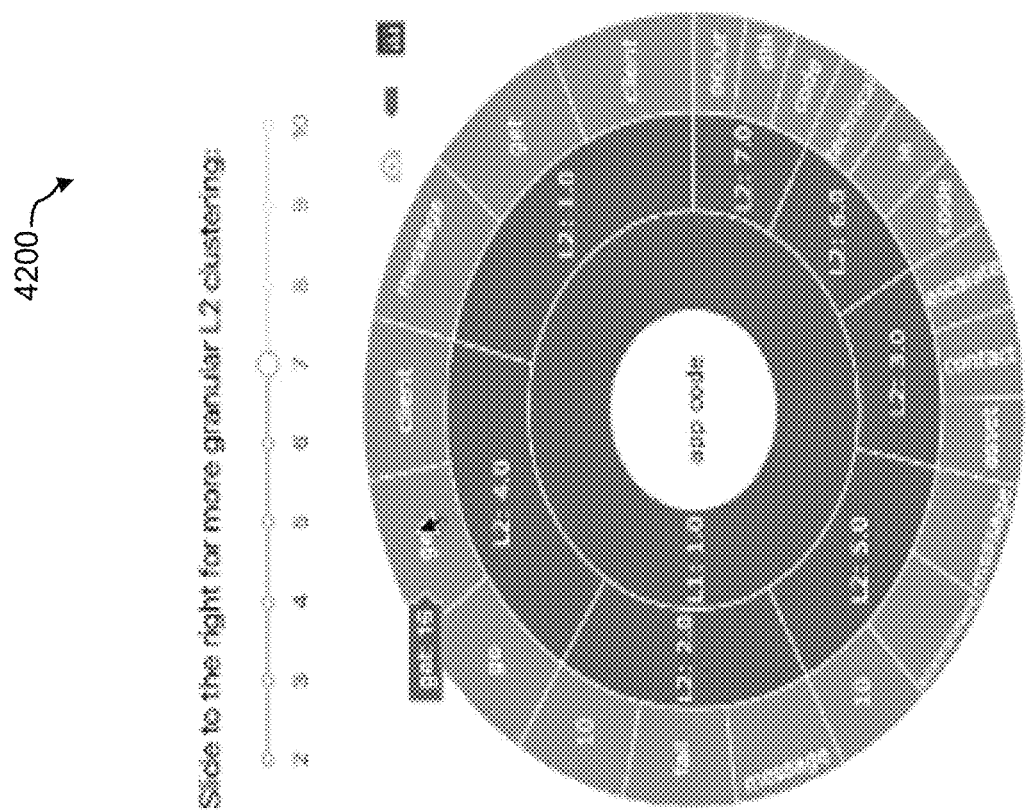

FIG. 42 is a two layer dashboard 4200 which has 7 sub-layers at the second level, with their corresponding numbering listed in the second concentric circle. The outer concentric circle shows the label words automatically generated for the particular sub-layer cluster. For example, cluster 1 (L2:1.0) has the label words message, get, and client.

Figure 43:
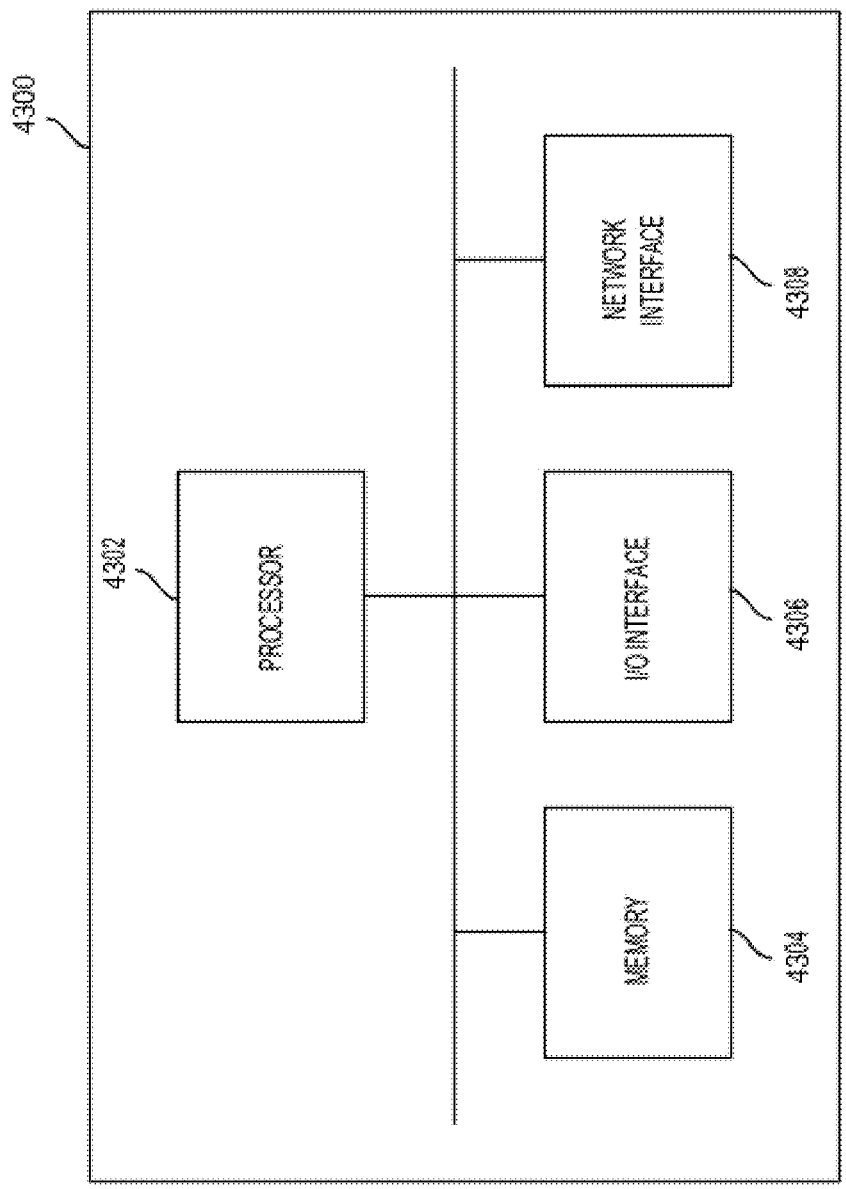
FIG. 43 is an example computer diagram showing components of an example computer system that can be used to implement the automated system described herein in various embodiments.

FIG. 43 is an example computer diagram showing components of an example computer system that can be used to implement the automated system 4300 described herein in various embodiments. The automated system 4300 can be implemented in the form of a special purpose computer or computing apparatus, such as a server or a rack mounted appliance that is configured to receive data sets representative of incident tickets and to generate control signals that are used for rendering of dashboards or other types of graphical user interfaces that can be displayed on a computing display. The system 4300 has a computer processor 4302, which can include hardware processors, such as microprocessors, field programmable gate arrays, among others. The processor 4302 operates in conjunction with computer memory 4304, which can be used to store computations and data values, and in some embodiments, maintain data model architectures that are updated through a computational training process. A user may be able to interact with the user interface and the rendered dashboard through input/output interface 4306, such as using a mouse cursor to move a slider or to trigger a modification of a number of clusters in a second level computation. Additionally, the user may also use a keyboard to input or otherwise enter feedback strings that can be used to exclude or bias the system towards weighting certain words higher. The incident data sets may be received through network interface 4308, and in some embodiments, the system 4300 connects through a message bus and returns output data sets indicative of identified clustering and appended metadata, or in some embodiments, control information for the rendering of graphical user interfaces (e.g., in some embodiments, the system generates the clusters and the labels to be sent as a data message to a downstream display rendering engine).

Methods disclosed herein are conceived to be stored as executable instructions on one or more non-transitory storage device(s) (machine-readable memory), which when executed on a monitory system cause one or more processor(s) of the monitoring system to execute the method(s) and facilitate monitoring of technology infrastructure.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As will be appreciated from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

The foregoing discussion provides many example embodiments of the example subject matter. Although each embodiment represents a single combination of elements, the subject matter is considered to include all possible combinations of the disclosed elements. Thus if one embodiment comprises elements A, B, and C, and a second embodiment comprises elements B and D, then the subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for generating a graphical user-interface based dashboard based on a set of received textual input data objects, the system comprising:
   a computer memory operating in conjunction with a data storage;
   a computer processor configured to:
   receive the textual input data objects, each textual input data object representing an incident ticket having at least a first brief description textual field and a second long description textual field;
   pre-process the textual input data objects to tokenize the textual input data objects into individual words and to remove stop words and punctuation;
   apply a first level of clustering of the textual input data objects by processing the first brief description textual field of the textual input data objects using an unsupervised Latent Dirichlet Allocation (LDA) topic model that generates a number of first level classifications based on automatically identified clusters, generates a set of probabilistic outputs indicative of a probability of membership for each of the textual input data objects in each of the automatically identified clusters, and assigns each of the textual input data objects to a corresponding automatically first level classification based on a highest probability of membership in the set of probabilistic outputs;
   apply a second level of clustering of the second long description textual field of the textual input data objects by processing the textual input data objects using a hierarchical clustering approach having a dynamically defined number of second-level clusters;
   label each cluster of the dynamically defined number of second-level clusters based on one or more identified topics of clusters that are identified by applying weights based on coherence measures obtained from the LDA topic model on individual words of the textual input data objects of the cluster being labelled; and
   control rendering of (i) an output dashboard interface rendering an interactive visual graphical object based on the first level of clustering, the second level of clustering, and the labels of the second-level clusters, and (ii) an interactive visual control having a visual element controllable to modify the dynamically defined number of second-level clusters such that when a modification of the dynamically defined number of second-level clusters is triggered, the second level of clustering is re-applied and the output dashboard is re-rendered.

2. The system of claim 1, wherein the output dashboard interface further includes a feedback text input field adapted to receive user-specified feedback label tokens, and the user-specified feedback label tokens are utilized to increase model weights of the LDA topic model on the individual words of the textual input data objects of the cluster corresponding user-specified feedback label tokens.

3. The system of claim 2, wherein upon receiving the user-specified feedback label tokens, the computer processor is configured to trigger re-labelling label of each cluster of the dynamically defined number of second-level clusters and re-rendering of the output dashboard interface.

4. The system of claim 1, wherein the textual input data object is appended with metadata indicative of the first level of clustering and the second level of clustering.

5. The system of claim 4, wherein the textual input data object is further appended with the labels of the second level of clustering.

6. The system of claim 1, wherein the highest probability of membership in the set of probabilistic outputs is obtained by summing probabilities of membership of each word token associated with the pre-processed textual input data object.

7. The system of claim 1, wherein the interactive visual control is a slider widget bar that is configured to receive a user input for modifying the dynamically defined number of second-level cluster, and when the slider widget bar receives the user input, the change In the dynamically defined number of second-level clusters is triggered.

8. The system of claim 1, wherein each of the textual input data objects relates to a service incident of a backend information technology system.

9. The system of claim 1, wherein the dynamically defined number of second-level clusters can vary from 2-10.

10. The system of claim 1, wherein the hierarchical clustering approach assigns each of a selected subset of textual input data objects corresponding to a cluster from the first level of clustering to an individual second-level cluster, and recursively merges the individual second-level clusters until the dynamically defined number of second-level clusters is reached.

11. A method for generating a graphical user-interface based dashboard based on a set of received textual input data objects, the method comprising:
receiving the textual input data objects, each textual input data object representing an incident ticket having at least a first brief description textual field and a second long description textual field;
pre-processing the textual input data objects to tokenize the textual input data objects into individual words and to remove stop words and punctuation;
applying a first level of clustering of the textual input data objects by processing the textual input data objects using an unsupervised Latent Dirichlet Allocation (LDA) topic model that generates a number of first level classifications based on automatically identified clusters, generates a set of probabilistic outputs indicative of a probability of membership for each of the textual input data objects in each of the automatically identified clusters, and assigns each of the textual input data objects to a corresponding automatically first level classification based on a highest probability of membership in the set of probabilistic outputs;
applying a second level of clustering of the textual input data objects by processing the textual input data objects using a hierarchical clustering approach having a dynamically defined number of second-level clusters;
labelling each cluster of the dynamically defined number of second-level clusters based on one or more identified topics of clusters that are identified by applying weights based on coherence measures obtained from the LDA topic model on individual words of the textual input data objects of the cluster being labelled; and
controlling rendering of (i) an output dashboard interface rendering an interactive visual graphical object based on the first level of clustering, the second level of clustering, and the labels of the second-level clusters, and (ii) an interactive visual control having a visual element controllable to modify the dynamically defined number of second-level clusters such that when a modification of the dynamically defined number of second-level clusters is triggered, the second level of clustering is re-applied and the output dashboard is re-rendered.

12. The method of claim 11, wherein the output dashboard interface further includes a feedback text input field adapted to receive user-specified feedback label tokens, and the user-specified feedback label tokens are utilized to increase model weights of the LDA topic model on the individual words of the textual input data objects of the cluster corresponding user-specified feedback label tokens.

13. The method of claim 12, wherein upon receiving the user-specified feedback label tokens, the method further comprises triggering re-labelling label of each cluster of the dynamically defined number of second-level clusters and re-rendering of the output dashboard interface.

14. The method of claim 11, wherein the textual input data object is appended with metadata indicative of the first level of clustering and the second level of clustering.

15. The method of claim 14, wherein the textual input data object is further appended with the labels of the second level of clustering.

16. The method of claim 11, wherein the highest probability of membership in the set of probabilistic outputs is obtained by summing probabilities of membership of each word token associated with the pre-processed textual input data object.

17. The method of claim 11, wherein the interactive visual control is a slider widget bar that is configured to receive a user input for modifying the dynamically defined number of second-level cluster, and when the slider widget bar receives the user input, the change In the dynamically defined number of second-level clusters is triggered.

18. The method of claim 11, wherein each of the textual input data objects relates to a service incident of a backend information technology system.

19. The method of claim 11, wherein the hierarchical clustering approach assigns each of a selected subset of textual input data objects corresponding to a cluster from the first level of clustering to an individual second-level cluster, and recursively merges the individual second-level clusters until the dynamically defined number of second-level clusters is reached.

20. A non-transitory computer readable medium, storing machine interpretable instructions, which when executed by a processor, cause the processor to perform a method for generating a graphical user-interface based dashboard based on a set of received textual input data objects, the method comprising:
receiving the textual input data objects, each textual input data object representing an incident ticket having at least a first brief description textual field and a second long description textual field;
pre-processing the textual input data objects to tokenize the textual input data objects into individual words and to remove stop words and punctuation;
applying a first level of clustering of the textual input data objects by processing the textual input data objects using an unsupervised Latent Dirichlet Allocation (LDA) topic model that generates a number of first level classifications based on automatically identified clusters, generates a set of probabilistic outputs indicative of a probability of membership for each of the textual input data objects in each of the automatically identified clusters, and assigns each of the textual input data objects to a corresponding automatically first level classification based on a highest probability of membership in the set of probabilistic outputs;
applying a second level of clustering of the textual input data objects by processing the textual input data objects using a hierarchical clustering approach having a dynamically defined number of second-level clusters;
labelling each cluster of the dynamically defined number of second-level clusters based on one or more identified topics of clusters that are identified by applying weights based on coherence measures obtained from the LDA topic model on individual words of the textual input data objects of the cluster being labelled; and
controlling rendering of (i) an output dashboard interface rendering an interactive visual graphical object based on the first level of clustering, the second level of clustering, and the labels of the second-level clusters, and (ii) an interactive visual control having a visual element controllable to modify the dynamically defined number of second-level clusters such that when a modification of the dynamically defined number of second-level clusters is triggered, the second level of clustering is re-applied and the output dashboard is re-rendered.

* * * * *